US010137363B2

(12) United States Patent
Parshionikar

(10) Patent No.: US 10,137,363 B2
(45) Date of Patent: Nov. 27, 2018

(54) GESTURE BASED USER INTERFACES, APPARATUSES AND CONTROL SYSTEMS

(71) Applicant: Uday Parshionikar, Mason, OH (US)

(72) Inventor: Uday Parshionikar, Mason, OH (US)

( * ) Notice: Subject to any disclaimer, the term of this patent is extended or adjusted under 35 U.S.C. 154(b) by 0 days.

(21) Appl. No.: 15/469,456

(22) Filed: Mar. 24, 2017

(65) Prior Publication Data

US 2017/0249009 A1    Aug. 31, 2017

Related U.S. Application Data

(63) Continuation-in-part of application No. 14/897,657, filed as application No. PCT/US2014/043529 on Jun. 20, 2014.

(60) Provisional application No. 61/837,215, filed on Jun. 20, 2013, provisional application No. 62/313,042, filed on Mar. 24, 2016, provisional application No. 62/427,006, filed on Nov. 28, 2016.

(51) Int. Cl.
| | |
|---|---|
| *G06F 3/01* | (2006.01) |
| *A63F 13/212* | (2014.01) |
| *G06F 3/0487* | (2013.01) |
| *G06F 3/0485* | (2013.01) |
| *G06K 9/00* | (2006.01) |

(52) U.S. Cl.
CPC ............ *A63F 13/212* (2014.09); *G06F 3/012* (2013.01); *G06F 3/013* (2013.01); *G06F 3/017* (2013.01); *G06F 3/0485* (2013.01); *G06F 3/0487* (2013.01); *G06K 9/0053* (2013.01); *G06K 9/00315* (2013.01); *A63F 2300/1012* (2013.01); *G06F 2203/04806* (2013.01)

(58) Field of Classification Search
CPC .......... G06F 3/013; G06F 3/011; G06F 3/017
See application file for complete search history.

(56) References Cited

U.S. PATENT DOCUMENTS

| | | | |
|---|---|---|---|
| 2006/0114522 A1 | 6/2006 | Audenaerde et al. | |
| 2008/0239189 A1* | 10/2008 | Hatta | .................. H01L 29/7869 349/46 |
| 2009/0052785 A1* | 2/2009 | Shamaie | ................. G06F 3/017 382/209 |
| 2010/0295782 A1* | 11/2010 | Binder | .................. G01S 3/7864 345/158 |
| 2012/0001189 A1* | 1/2012 | Matsubara | ........ G02F 1/136286 257/59 |
| 2012/0312956 A1 | 12/2012 | Chang et al. | |
| 2013/0066526 A1 | 3/2013 | Mondragon et al. | |

(Continued)

*Primary Examiner* — Christopher E Leiby
(74) *Attorney, Agent, or Firm* — Taft Stettinus & Hollister LLP; Anthony P. Filomore, II

(57) ABSTRACT

User interaction concepts, principles and algorithms for gestures involving facial expressions, mental activity, and other body actions are disclosed. User interaction concepts, principles and algorithms for enabling hands-free and voice-free interaction with electronic devices are disclosed. Apparatuses, systems, computer implementable methods, and non-transient computer storage media storing instructions, implementing the disclosed concepts, principles and algorithms are disclosed. Gestures for systems using eye gaze and head tracking that can be used with augmented, mixed or virtual reality, mobile or desktop computing are disclosed. Use of periods of limited activity and consecutive body actions in orthogonal axes is disclosed.

35 Claims, 15 Drawing Sheets

(56) References Cited

U.S. PATENT DOCUMENTS

2013/0263036 A1 10/2013 Berenson et al.
2013/0321265 A1 12/2013 Bychkov et al.
2018/0046851 A1* 2/2018 Kienzle .............. G06K 9/00248

* cited by examiner

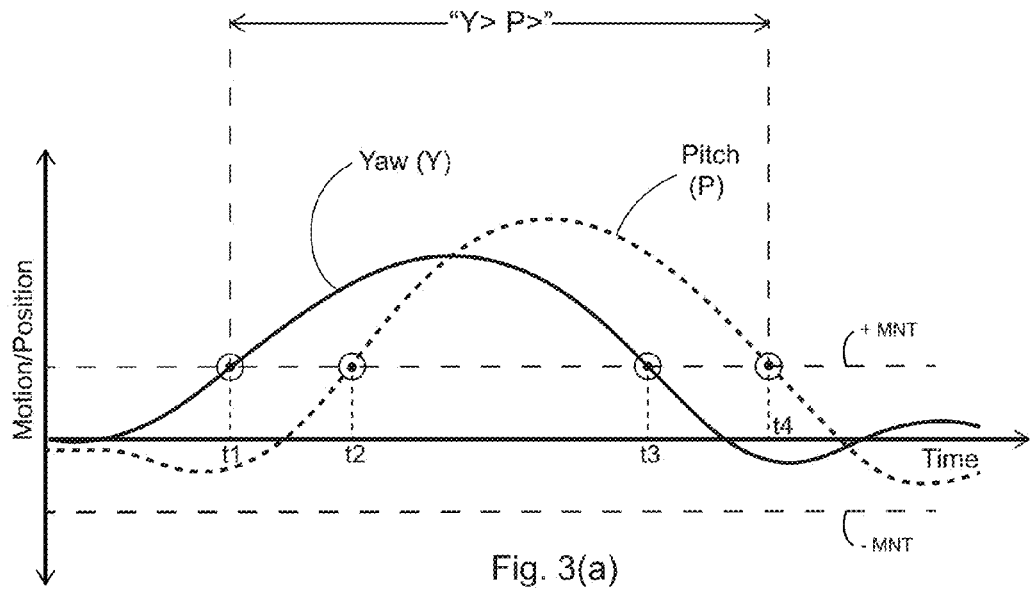
Fig. 3(a)
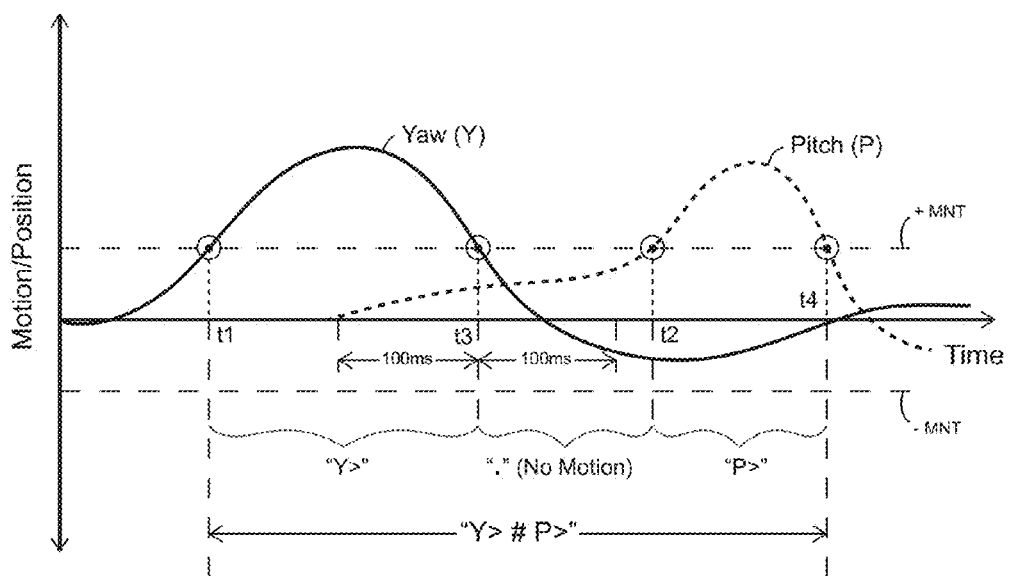
Fig. 3(b)
Fig. 3

Fig. 13
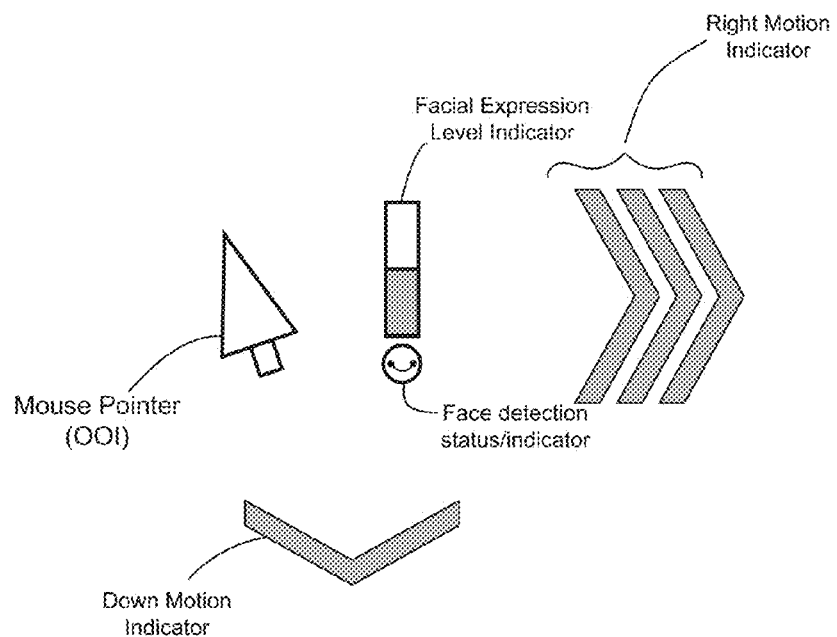
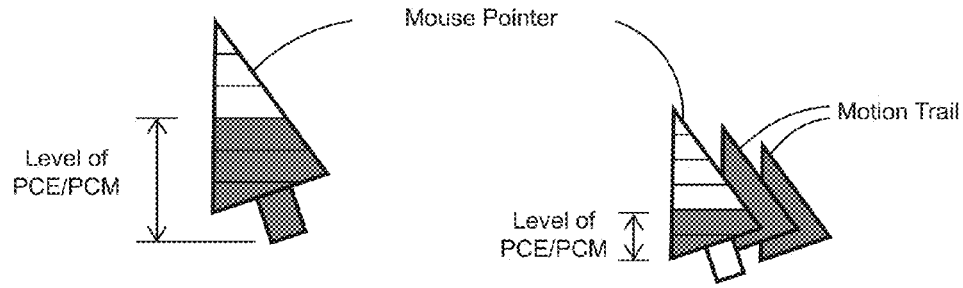
Fig. 14            Fig. 15

GESTURE BASED USER INTERFACES, APPARATUSES AND CONTROL SYSTEMS

This application is a continuation-in-part of U.S. patent application Ser. No. 14/897,657 filed Dec. 11, 2015 entitled "SYSTEMS, METHODS, APPARATUSES, COMPUTER READABLE MEDIUM FOR CONTROLLING ELECTRONIC DEVICES", which claims priority to PCT Application Serial No. PCT/US14/43529, filed Jun. 20, 2014 entitled "SYSTEMS, METHODS, APPARATUSES, COMPUTER READABLE MEDIUM FOR CONTROLLING ELECTRONIC DEVICES", which claims priority to U.S. Provisional Patent Application Ser. No. 61/837,215, filed Jun. 20, 2013 entitled "Multipurpose Controllers using Sensors, Heuristics for User Intent, Computer Vision, Multiple OMDs, ODEs and POLAs", the disclosures of which are all expressly incorporated herein by reference. This application also claims priority to U.S. Provisional Patent Application Ser. No. 62/313,042 filed on Mar. 24, 2016 entitled "Gestures Based User Interfaces, Apparatuses and Control Systems" and U.S. Provisional Patent Application Ser. No. 62/427,006 filed on Nov. 28, 2016 entitled "Gestures Based User Interfaces, Apparatuses and Control Systems", the disclosures of which are also expressly incorporated herein by reference.

This disclosure is related to U.S. patent application Ser. No. 13/418,331 filed Mar. 12, 2012 entitled "Multipurpose Controller for Electronic Devices, Facial Expressions Management and Drowsiness Detection", U.S. patent application Ser. No. 14/054,789 filed Oct. 15, 2013 entitled "Multipurpose Controllers and Methods", the disclosures of which is hereby incorporated by reference.

BACKGROUND

Efforts have been made for many years to provide diverse means of controlling/communicating with electronic devices. Some of the means of control involve use of controllers to control/communicate with electronic devices. Other means/methods seek to eliminate the need to hold and/or touch controllers to control electronic devices. They involve communicating intent by means of gestures performed using hands, arms, legs, face and other body parts. Voice commands can also be used to communicate with electronic devices. Communication via brain waves is also possible. Each of these methods have limitations, however, one of the common concerns can be communicating and/or confirming user intention behind actions performed by the user of the electronic device(s).

SUMMARY

This application includes disclosure of methods, systems, apparatuses as well as principles/algorithms that can be implemented on computer readable medium, for defining user gestures, performing user gestures, interpreting user actions, communicating and confirming user intent when communicating with electronic devices. A method of representation of user gestures via a symbolic language is also disclosed. Many of the disclosed principles can enable hands-free and/or voice-free control of devices including those used in the fields of accessibility, Augmented/Mixed/Virtual Reality, gaming, desktop and mobile computing, and others.

Concept of TMB (Time and Magnitude Bounded) body actions including motions, positions, expressions and other actions is disclosed. Use of TMB body actions for conveying and detecting user intent is disclosed.

Concept of Modifier Action is disclosed. A designated modifier action performed just prior to a user gesture can change the interpretation of that user gesture. For example, a user gesture for Left Click command when preceded by a specified "R" action, generates a Right Click instead. The designated Body motion or position in substantially one particular axis before a user gesture for one type of click causes a different type of click. Click gesture can comprise a TMB facial expression. Body motion can be head motion, possibly with time and magnitude bounds and possibly preceded by a POLA. The modifier action can be a body motion that is unidirectional or in form of a shape that can be open or closed or in shape of letter of alphabet and can be performed clockwise or anticlockwise.

A user gesture for a swipe command is disclosed. A user gesture for a swipe command can comprise a TMB motion or position of a body part, possibly followed by a period of No Motion (possibly of minimum duration) occurring within designated time period. The body part can be head. The direction of swipe can be in accordance to the direction of the motion or position of the body part.

Use of sequential TMB body actions (such as motions or positions) in orthogonal direction in user gestures is disclosed. Combination of TMB motion or position actions in orthogonal axes, performed sequentially, can lead to generation of command signals. These combinations can be followed by POLA. There can be a POLA between some of the consecutive TMB actions (that are performed along orthogonal axes). There can be VLWPs between some of the consecutive TMB actions (that are performed along orthogonal axes).

Moving back or forth in the X axis can cause a Zoom in or out command signals to be generated, if a designated body action is detected to be active during the translational motion. The designated body action can be a facial expression. Rotating the head can also generate Zoom in/out command signals, if a designated body action is detection to be active during the head rotations.

A generic user gesture for manipulations of an OOI is disclosed. A head rotation or translation performed by the user can cause rotation or translation of the OOI on the display screen, possibly when performed upon detection of a designated trigger body action. The designated trigger body action can be a facial expression, and can be followed by a FLBP and that can be further followed by a period of No Motion. The designated trigger body action can also be tensing of designated muscles.

Concept of Gesture Wake up Sequences (GWS) is disclosed. GWS can be used to activate the processing of certain designated target user gestures in a control system. These GWS's can be as simple as a period of No Motion, or a POLA, possibly combined with a VLWP (possibly with designated time bounds), or can be any suitable sequence of body actions. This VLWP can possibly wait for the first action of a previously defined target user gesture that needs to be processed by the system. GWS can be performed before a defined target user gesture that needs processing. After a target user gesture's processing is complete, the control system can stop processing other gestures that need a GWS, until another GWS is encountered. Some GWS can be composed of a TMB body action, optionally by a GWS and a POLA. Requirement to perform GWS before certain user gestures can be automatically imposed by the system based on ambient conditions, such as nature and pattern of motions experienced by the user or controller in conditions.

Concept of Session Wake up Sequences is disclosed. Certain user gestures can be used as Session Wake up Sequences (SWS) wherein there are used to start processing of other user gestures used to generate command signals. Once a SWS is performed, the control system can process user gestures for a designated amount of time from the time when the SWS was performed, and/or for at least designated amount of time from start/end of the SWS or start/end of the last user gesture processed once this SWS was performed.

Concept of Modes is disclosed. The command signals generated by the control system in response to performance of a particular user gesture can change based the active mode. Different sequences of body actions can be used to activate (start) or deactivate (end) a control system mode.

Use of a TMB motions performed with the head in Yaw, Pitch or Roll axis is disclosed for use of start of generating signals for modification of a an object of interest. User gestures using Roll action in start triggers disclosed. User gestures without Roll as part of start triggers also disclosed.

Use of POLAs in ascertaining user intent behind body actions is disclosed.

Use of "L" shaped gestures disclosed. Use of insertion of an orthogonal action to an existing user gesture or sequence of body actions is disclosed. Use of orthogonal actions to start definition of user gestures disclosed. Starting and ending user gestures with two or more actions that are in orthogonal axes is disclosed, possibly preceded or followed by a POLA. Embodiments that insert a POLA, FLBP, VLWP between the orthogonal actions are disclosed.

Use of user gestures comprising head position or motion along with eye gaze based control is disclosed. Use of facial expressions along with eye gaze based control system is disclosed. Activation of OOI Motion based on eye blink or wink in an eye gaze based control system is also disclosed.

Concept of Dwell Park and OOI Stickiness is disclosed. User feedback on Dwell Park and OOI Stickiness is disclosed. Use of POLAs as start as well as end triggers is disclosed.

Method for provision of user feedback related to performance of various body actions in a user gesture, including level of detected body action, status of POLA, detection status of various body parts being tracker, and level of PCE/PCM, is disclosed. This includes visual feedback around the OOI.

BRIEF DESCRIPTION OF THE DRAWINGS

FIG. 3(a) illustrates exemplary Body Actions Represented by Symbols including "Y>" (Right Yaw), "P>" (Down Pitch) and in particular shows an example of motion/position of a part of the user's body as experienced/detected by the sensors that can map to the "Y>P>" representation; FIG. 3(b) illustrates exemplary Body Actions Represented by Symbols including "Y>", "P>" and "#" (time periods of motion where the (absolute) magnitudes of specified motion types are continuously within corresponding specified motion thresholds/ranges) and in particular shows an observed motion pattern for a user gesture that can map to the "Y>#P>" representation;

FIG. 13 illustrates an exemplary embodiment of Visual Feedback Provided to User including Body Part Detection Status Indicator, PCE/PCM Level Indicator and Body Action Indicators when Monitored Body Part is in Motion;

FIG. 14 illustrates an exemplary embodiment of Visual Feedback Provided to User by Changing the OOI (for Indicating Level of PCE/PCM);

FIG. 15 illustrates an exemplary embodiment of Visual Feedback Provided to User by Changing the OOI (for Indicating Level of PCE/PCM and Body Motion);

LIST OF TABLES

Figure 1:
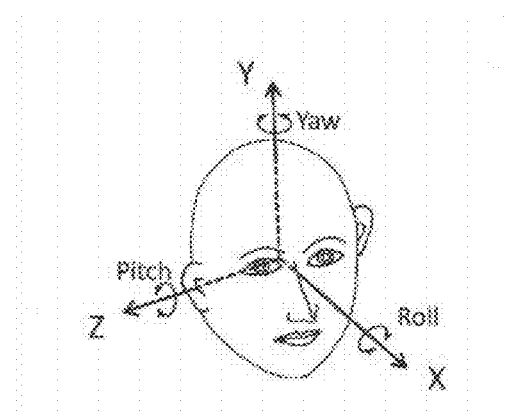
FIG. 1 illustrates a Head Coordinate System.

Table 1—An illustrative Embodiment of Gesture based User Interface (that can be used as part of a Control System).

Table 2—Illustration of Easy Motion Mode—First Embodiment.

Table 3—Illustration of Easy Motion Mode—Second Embodiment.

Table 4—Exemplary Embodiments of Start Trigger (that can be used to start generation of OOI Attribute Modification signals).

Table 5—An illustrative embodiment of gestures based User Interface that can be implemented without the use of a PCE or PCM.

Table 6—Embodiment of a User Interface using User Gestures with Prominence of Roll Motion/Position Actions.

Table 7—Embodiment of a User Interface using User Gestures that can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

While exemplary embodiments incorporating the principles of the present invention have been disclosed herein above, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

The term "electronic device" is used to designate any devices that can have a microprocessor and that can be communicated with. A microprocessor can include one or more processors, memory and programmable input/output peripherals. A controller can include one or more microprocessors and/or memory with instructions that can help control or communicate with electronic devices.

This document discloses user interface concepts, principles and techniques that can be translated into software algorithms to provide a rich functionality, convenience, flexibility and ease-of-use to users. Further, the disclosed concepts/principles/techniques can lead to easier implementation of the gesture recognition algorithms. Note that these concepts, techniques and principles can be used with controllers described in the above referenced US Patent Applications as well as any other devices that can track user's head/face/bodily motions, facial expressions and gestures to control or communicate with any electronic devices. Note that this document uses the term "Electronic Device" as defined in the above-mentioned Patent Applications. Further, the UI concepts described herein can be used to not only control an electronic device distinct from the controller, but also the controller and/or the controlling system itself. For the purpose of simplicity, the rest of the document will use the term "controller" to include "controlling systems" as well. Further, it is also understood that controllers themselves can be electronic device; therefore, any mention of "controlling/communicating with an electronic device" can also include controlling/communicating with the controller itself.

The principles disclosed can be used with hand held and body worn controllers as well as with control systems where the user's body or body part is used as part of the control system. Body parts used for user actions prescribed to perform user gestures can include, but are not limited to, head, facial muscles, part of the face, jaws, tongue, eyes, fingers, hands, arms, torso, chest, abdomen, shoulders, legs, feet, toes and muscles.

A user gesture can be defined as a combination of actions performed (by the user) with the intent of communicating with or controlling an electronic device. These actions can be bodily actions that can include motions of various body parts, facial expressions, actions to orient and hold various body parts in certain poses/positions/orientations, as well as other bodily actions. Holding the eye gaze steady or moving the eye gaze can also be considered a bodily action. Some embodiments can also use actions performed by the user such as speech/speaking, holding breath/inhaling/exhaling, tensing of muscles/body parts (that may or may not be detected externally, such as jaw muscles, abdominal muscles, arm and leg muscles, anal sphincter, etc.), and so on as bodily actions. User actions such as entering meditative or attentive state, consciously relaxing the body with or without meditation, (mentally) imagining, visualizing, remembering or intending particular actions (e.g. pushing or pulling, lifting or sinking imaginary, virtual or real objects), experiences or scenarios (which can be detected by analyzing brainwaves or other biometric information), deep breathing, inhaling, exhaling, holding breath, etc. can also be used as actions in defining user gestures. A user gesture can require some bodily actions to be performed in a specified sequence, and can require other bodily actions to be performed concurrently/simultaneously with each other. User gestures can be recognized and translated by the controller or control system into signals to communicate with and/or control an electronic device. Some user gestures can be recognized and translated into signals to control the controller/control system itself. Signals generated in response to some user gestures may be stored in the control system or controlled device for indefinite amount of time and that stored signal information can be retrieved when required. Bodily actions performed as part of a user gesture can serve various purposes in a specified user gesture. Following are some types of bodily actions based on the purpose they can fulfill in a user gesture.

a. Actions Enabling/Disabling Generation of Signals (AEGS)
 b. Actions Influencing Attributes of Generated Signals being or to be generated (AIAGS)
 c. Actions that Confirm User Intent (ACUI)
 d. Actions that are Demarcators (i.e. help demarcate one part of user gesture from another, or even help demarcate one user gesture from another)
 e. Actions with Multiple Purposes (AMP) (i.e. they can fulfill a combination of multiple purposes simultaneously)

Note: A particular bodily action can serve different purposes (and thereby can be viewed as having different types) when it is used in different types of user gestures. Further, a particular bodily action can occur multiple times within a user gesture and can be specified to have different purpose(s) (type/types) during different occurrences.

Note: Any particular heuristics (explained in this as well as the referenced applications) can be implemented in a controller/control system by means of multiple user gestures. For example, the selection heuristics can be implemented in one embodiment using a first user gesture that uses a smile facial expression as the Primary Control Expression (PCE) as well as another user gesture that uses an eyebrow raise facial expression as the PCE, and so on. Note that PCE's can be considered as AEGS.

Body actions such as motion of one or more body parts and/or placing/posing/orienting one or more body parts in certain positions (including motions & poses/positions of the entire head, eyeballs, arms, hands, fingers, legs, torso, and other body parts) or other body actions that have not been already designated as a Primary Control Motion (PCM) or PCE can be designated to be used for purpose of modifying/influencing designated attributes of an Object Of Interest (OOI). Body actions that may not lead to motion or position change of a body part, such as applying pressure on touch or pressure sensitive surface, or tensing of muscles, can also be detected and measured. The level of applied pressure can be measured and used to modify an attribute of an OOI. Any body actions intended to modify attributes of an OOI can be referred to as OOI Modification Drivers (OMD). An electronic device can then be controlled via use of combination of PCMs and/or PCEs and/or OMDs. A User Gesture then can be a specified combination of PCMs, PCEs and OMDs performed or held in succession and/or simultaneously with each other. Some embodiments can also use body actions such as speech/speaking, holding breath/inhaling/exhaling, tensing of muscles/body parts (that may or may not be observable), entering meditative or attentive state, mental imagination of specified activity, etc., which can be detected and measured, and therefore be designated as PCE/PCM or OMD. User gestures can be used to generate signals for communication with electronic devices, User gestures can also signify user intent and thereby used to decide if/when certain other user gestures can cause signals to be generated to communicate with the controlled device. Note that the term "positions" can include linear/translational positions as well as angular positions. Thereby the term positions can include angular orientations.

OMDs can also include motions and positions of objects that are not part of the body but that can be directly or indirectly moved by the user. For example, motion of a pencil can be used as an OMD, provided that the user is directly or indirectly causing the motion of the pencil and the controller/control system is able to sense the motion of the pencil. Though OMDs can be used as AIAGS such as for modifying signals for motion of OOI, some OMDs can be used as Demarcators, ACUIs as well as AMPS. For example, certain patterns of OMDs may be used as pre-requisites for recognition and processing of other user gestures.

The above referenced US Patent Applications define Head Coordinate System (HCS), which is reproduced here in FIG. 1, and will be used in this document to describe various motions that can be performed by the user. Note that other coordinate systems can also be used to track motion of head or other body parts, as well as the motion of the controller itself. This document elaborates on use of these motions, the expressions on the user's face and other body actions that could be used as a set of commands (User Interface) to control electronic devices. In some embodiments, a body worn or hand held controller can be used to sense user's bodily motions and/or expressions. It is possible to have systems that employ cameras, ultrasound, magnetic fields, electrical fields, electromagnetic fields, radar, sonar, Electromyography (EMG), Electroencephalography (EEG), and other sensing techniques to sense bodily motions and/or expressions and/or body actions. The user interface principles and embodiments described in this document do not depend on what methods were used to sense the motions, positions or expressions; they can be used regardless of the sensing methods and type of the controller or controlling system. For example, these principles/techniques can be used with head/body mounted hands-free controllers, hand-held controllers, or even in systems where no one particular device in the system can be identified as the controller. Further, in the definition/heuristics of a user gesture, one body action can be substituted by another body action.

Following sections provide definitions, concepts, techniques, symbolic representations (for body/head motions, facial expressions and other bodily actions), as well as principles for creating/designing user interfaces for using/operating such controllers/controlling systems. Embodiments of various user gestures and user gesture based User Interfaces are also described with the aid of symbolic representations.

A methodology of symbolic representation of type, direction and other properties of motions & expressions (as performed by the user or experienced by the controller or detected by the control system) is described below. These symbolic representations can be used for describing user gestures. These user gestures can be detected and recognized by the controller/control system to generate signals to communicate with an electronic device and/or to perform certain functions.

Types of Motion—
  Roll—This is rotational motion about the X-axis of a coordinate system, such as the HCS. It will be represented symbolically by the letter "R". For example, when the user rolls his/her head so that his/her left ear gets closer to the left shoulder, then that will be called the "Left Roll" and represented symbolically as "<R" or "R<". Then, "Right Roll" is the opposite of the "Left Roll" and will be symbolically represented as "R>" or ">R". The symbols "<" and ">" are called the direction specifiers and are used to denote left/up and right/down motion respectively (from the viewpoint of the user).

Yaw—This is rotational motion about the Y-axis of a coordinate system, such as the HCS. It will be represented symbolically by the letter "Y". For example, when the user rotates his/her head/body/part of body to his/her left, then that will be called the "Left Yaw" and represented symbolically as "<Y" or "Y<". Then, "Right Yaw" is the opposite of the "Left Yaw" and will be symbolically represented as "Y>" or ">Y".

Pitch—This is rotational motion about the Z-axis of a coordinate system, such as HCS. It will be represented symbolically by the letter "P". For example, when the user pitches his/her head/body/part of body upwards, then that will be called the "Up Pitch" and represented symbolically as "<P" or "P<". Then, "Down Pitch" is the opposite of the "Up Pitch" and will be symbolically represented as "P>" or ">P".

X Translation—This is translational motion along the X-axis, represented by "Tx". The front and back translation motions (i.e. along +X axis and −X axis) can be then represented by "Tx>" or ">Tx" and "<Tx" or "Tx<" respectively.

Y Translation—This is translational motion along the Y-axis, represented by "Ty". The up and down translation motions (i.e. along +Y axis and −Y axis) can be then represented by ">Ty" or "Ty>" and "<Ty" or "Ty<" respectively.

Z Translation—This is translational motion along the Z-axis, represented by "Tz". The translation motions along +Z axis and −Z axis can be then represented by ">Tz" or "Tz>" and "<Tz" or "Tz<" respectively.

In some embodiments, translational or rotational motions at any particular moment in time can be measured in terms of translational or rotational/angular velocity/speed. However, other embodiments can also use other measures of motion such as instantaneous position or positional change or acceleration, etc. Note that if no direction specifiers are specified, it is understood that the direction of the motion does not matter. Therefore, for example, "Y" can represent either "<Y" or "Y>" or both.

In some embodiments, instantaneous positions can be detected and monitored instead of motions. As an example, devices using the concept of joystick can generate command signals based on the position of the joystick (in relation to a neutral position) at a particular instant in time to affect an OOI, rather than relying on the speed of the joystick at that particular instant in time. Therefore, all of the above mentioned motion symbols can be used to represent position instead of motion, or some combination thereof. The heuristics/principles disclosed can be used for embodiments that detect/monitor either motions or positions or both. However, for reasons of simplicity, the illustrative embodiments discussed herein will primarily use the term "motion" rather than "motion and/or position" or "a combination of motion and position".

For reasons of brevity, two consecutive but opposite motions along the same axis may be represented by using only one letter. E.g. "<Y Y>" which stands for a Left Yaw followed by a right Yaw, may also be represented as "<Y>". Similarly, ">R<" is same as "R> <R", which represents a Right Roll followed by a Left Roll. In addition, same rule will apply to expressions (described later in the document.)

Periods of "No Motion"—User gestures can also have periods of time when there is limited or no motion. Note that a particular motion is termed as "limited" if its absolute magnitude is within a specified range or threshold during a time period. MOTION_NOISE_TH (Motion Noise Threshold, Parameter P#6, also referred to as MNT) as explained in the above-referenced US Patent Applications is an example of a motion threshold. Every type of motion (R/P/Y/etc.) can have its own MNT. Further, even for the same motion type, MNT values can be different for different user gestures. Time periods of motion where the (absolute) magnitudes of specified motion types are continuously within corresponding specified motion thresholds/range for at least specified time thresholds, can be called periods of "No Motion". Such time periods and are represented by the symbol "#" when there is only limited motion observed for at least a specified amount of time in a continuous fashion. Note: The symbol "." is used to represent a period of No Motion (instead of "#"), in some of the referenced applications.

Note that in embodiments that work based on position (versus velocity or acceleration), a period of "No Motion" can be defined as the time period where the detected/monitored position is within the specified MNT value for position. (The position being monitored can be translational position or angular position.) The readings from position sensors (just like readings from motion sensors) can be measured with respect to certain baseline(s), which may have been set or established during the initialization/calibration process (as per the referenced US Patent Applications). The MNT can also be measured from the baseline position that corresponds to the position of the body part being monitored.

Note that some embodiments can use Eye Gaze as the OMD. Note that Eye Gaze can be defined as a combination of Head Pose (based on angular position of the user's head) and Eye ball angular position (based on angular position of eye ball/eye balls of the user with respect to the user's head). In such cases even if the head angular position and eye ball angular position (when measured individually) are changing more than a specified threshold/range, the combined effect on the Eye Gaze as a whole may still be within the specified range/threshold, and therefore the user can be said to be in a period of "No Motion". Further note that Eye Gaze can also be defined in terms of a specific point or location the user may be looking at any particular instance of time. (The specified point/location can be in the plane of the display screen of the electronic device being controlled, or a 3D point in real or virtual space.) In this case, the change in location or the point (the user is looking at) can be monitored against a specified threshold of position change, to determine if a period of No Motion is being encountered with user's eye gaze.

Note that some embodiments can use a more generalized concept called the Periods of Limited Activity (POLA) instead of period of "No Motion". A POLA is a period of time within a user gesture when a particular motion, position or user action (that is being monitored) is within a specified range. This range may or may not be same as +/−MNT. The specified ranges for a POLA may not be even symmetrically defined. For example, a POLA may be defined as the time period when user's head is rotating between 30 degrees/sec to 40 degrees/sec in Yaw whereas a period of No Motion may be defined as when the user's head is rotating at less than +/−5 degrees/second. Therefore, it can be seen that periods of No Motion can be POLAs but not all POLAs are periods of No Motion.

Figure 2:
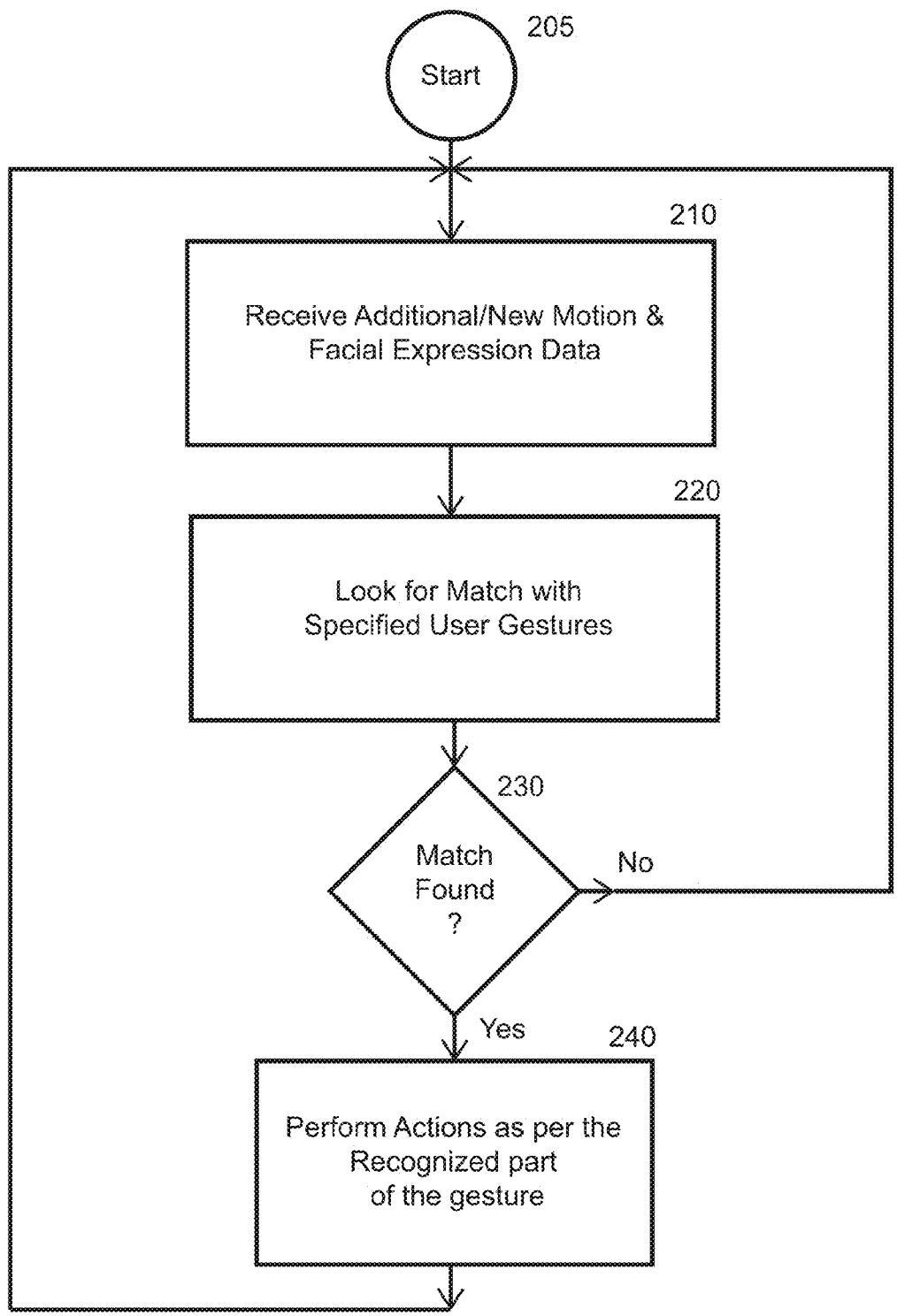
FIG. 2 illustrates an exemplary User Gesture Recognition Process Flowchart in one Embodiment.

Using the above defined convention, user gestures can be represented by strings of symbolic representation of various motions. For example, the symbolic representation "Y>P>" can represent a user gesture where the user performs a "Y>" motion (that is, a Right Yaw motion) followed by a "P>" motion (that is, a Down Pitch motion), in that order. Note that other motions that are not present in the symbolic representation of the user gesture can be ignored by the Control Software if it is looking for this particular user gesture. (See above referenced US Patent Applications for description of "Control Software".) Amongst other things, control software can also provide the algorithm for processing various sensor inputs, mapping various inputs to specified user gestures and generating various control signals/events/commands corresponding to the detected user gestures. Given this, the behavior of the controller/controller system can be influenced by the control software. See FIG. 2 for an overview of the process that the Control Software uses in one embodiment to detect if the user is performing one of the specified user gestures. Note that the user gesture body action pattern information can be stored in a file (or a database or an equivalent object) or can be embedded in the logic of the control software itself. (The illustrative flowchart in FIG. 2 assumes the logic of the control software has the predefined user gesture body action pattern information embedded in it.) The flow starts are step 205. At this point, the control software can start with a clean slate, meaning there is no information on motion or position of any body parts of the user or any facial expressions of the user. At step 210, the control software receives body motion/position and facial expression information sensed by various sensors at this point in time (or over a specified interval of time up to this point in time). This information can be stored in an information stack or list. At step 220, the system tries to match the received information so far (that is possibly stored in the information stack or list) with any of the predefined user gestures motion patterns (or parts thereof) that may be valid to be found as per the rules of the user interface. At step 230, the control software checks if a match is found (between received body motion/position and facial expression information and a (part of) predefined user gesture motion pattern). If no match was found, the control flow takes the "No" branch from step 230 and returns back to the top of the flow (step 210) and continues the process from step 210. If however a match was found at step 230, the control flow takes the "Yes" branch to Step 240 to start performing actions as per the matched (recognized) user gesture (or part thereof). These actions can include generating signals meant for communication with or for controlling the electronic device and/or any other appropriate action. If there are multiple matches found at step 230, the control software can take the most appropriate match. In some embodiments "most appropriate" match can be defined as the most elaborate user gesture (that is the user gesture with most complex representation) that is valid (as per the rules of the user interface) at that moment in time. Other embodiments can choose the least elaborate user gesture (that is the one with the simplest representation) that is valid at that moment in time. If at Step 240, it is determined that the matched user gesture is complete, the system can initialize the information stack or list, and can start looking for a new user gesture.

See FIGS. 3 (*a*) & (*b*) for further explanation and description of symbolic representation of motions (that are performed as part of a user gesture). The X-axis represents time and Y-axis represents Motion or Position. For example, the Y-axis could represent translational velocity or angular velocity or angular position or translational position as detected by the sensors. In FIGS. 3 (*a*) & (*b*), all motions are shown to use the same MNT value (for purposes of simplicity of explanation). FIG. 3(*a*) shows an example of motion/position of a part of the user's body as experienced/detected by the sensors that can map to the "Y>P>" representation. The representation "Y>P>" represents a user gesture where first a Right Yaw motion is performed, followed by a Down Pitch motion. Note that while some embodiments can require Pitch motion to start immediately after the end of the Yaw motion, this embodiment allows the Pitch motion to start even before the Yaw motion has ended. (Recall that a motion can be said to be started when its absolute magnitude is more than the MNT value for that type of motion for that user gesture, and motion can be considered to be ended when its absolute magnitude is less than the MNT.) The Y curve is shown to surpass the threshold value at time t1 and therefore can be considered to be started at that time. The Y value falls back to be within the threshold at time t3 and therefore can be considered to be ended at time t3. The P curve on the other hand can be considered to be started at time t2 and end at time t4. During time period t1-t4, it can be observed that Y motion is first initiated at time t1 and then before it is completed, P motion is started and later ended by time t4. In this embodiment, despite the overlap between P and Y motion (during period t2-t3), the control software can consider this motion pattern to be a match with the symbolic representation "Y>P>".

FIG. 3(*b*) shows observed motion pattern for the user gesture represented by the representation "Y>#P>". This representation translates to a motion pattern where Y motion is started and completed, followed by a period of No Motion, which then is followed by a P motion. This user gesture thereby ensures that the user cleanly completes the Y motion before initiating the P motion. Note that the length of "#" period can be specified on a per user gesture basis and can be set to be as low as zero, as per the preference of the designer of the control system or the user interface of the control system. Note that the length of the time threshold for "#" period is set to be 100 ms in this example, whereas the time gap between end of Y and start of P (t3:t2) is more than 100 ms. Therefore, this embodiment can recognize the motion pattern shown in FIG. 3(*b*) as a match to the symbolic representation "Y>#P>".

Indefinite periods of "motion"—Motion symbols enclosed in "{ }" represent a combination of (possibly overlapping) motions listed within the braces, for an indefinite amount of time, where at least one of the motions listed within the "{ }" is present at any given time during the period. Periods of No Motion ("#") can also be included in such combinations. As an illustrative example, the symbolic pattern "{YP}" stands for combination of motions where Yaw and Pitch motions can happen simultaneously or individually and possibly in a random order, for an indefinite amount of time. Note that for a user gesture to map to this pattern, at least one of the motions Yaw or Pitch should be present at all times during that period and it is not required that both must be present to map to this pattern. To represent a motion pattern where a particular motion type guaranteed to be present in the combination, that motion type is highlighted in the representation by an underscore. Therefore, the pattern {YPR} represents a combination of motions where Yaw and Pitch are potentially present, but Roll motion is required to be present for at least some finite amount of time during the {YPR} period. Similarly, {YPR} represents a combination where Pitch motion is potentially present, but Yaw and Roll are required to be present for at least some time for that motion sequence to match the symbolic pattern representation. As another illustration, the pattern "{YP#}" represents a combination of motions where Yaw, Pitch and "No Motion" occurring for an indefinite amount of time. Therefore, the symbolic representations "Y>#P>", "Y#P", "Y#Y#P", "Y", "#Y#", "P#P", etc. can all be simply be represented by "{YP#}" instead.

Note: User gestures that include indefinite periods that include "#" can have some other motion or expression specified (within the user gesture) following the indefinite period so that the control software can determine the termination point of the indefinite period. This will be evident from the examples of user gestures containing "{ }", given later in this document.

Note: As per above discussion, "{#}" represents indefinite period of No Motion, which is also the same as back-to-back occurrences of individual "#" periods repeated indefinitely. On the other hand, "{Y}" represents indefinite period of Yaw motion, which can also be simply be represented as "Y".

Various facial/body expressions can also be symbolically represented. For example, expression of Smile can be represented as "S", Eyebrow Raise as "E", Wink as "W", Raising a Hand as "H", Closing of hand into a first as "F", Manipulating opening of mouth as "M", and so on. Further, if the expression can be asymmetric, then a "l" or "r" could be attached as a prefix to the expression symbol to differentiate left versus right. Therefore, "lE" would represent Left Eyebrow raise and "rW" would represent right eye Wink. Further, "<" and ">" may also be used with facial expressions, where "<" would represent the initiation of an expression and ">" representing the ending of an expression. Therefore, "<S" can represent initiation of a Smile and "S>" represents ending of a Smile. Similarly, "<M" can represent opening the mouth and "M>" can represent closing the mouth. When an expression is initiated in a user gesture, it is assumed to be held until it is explicitly shown as terminated at a later point in the user gesture.

Figure 4:
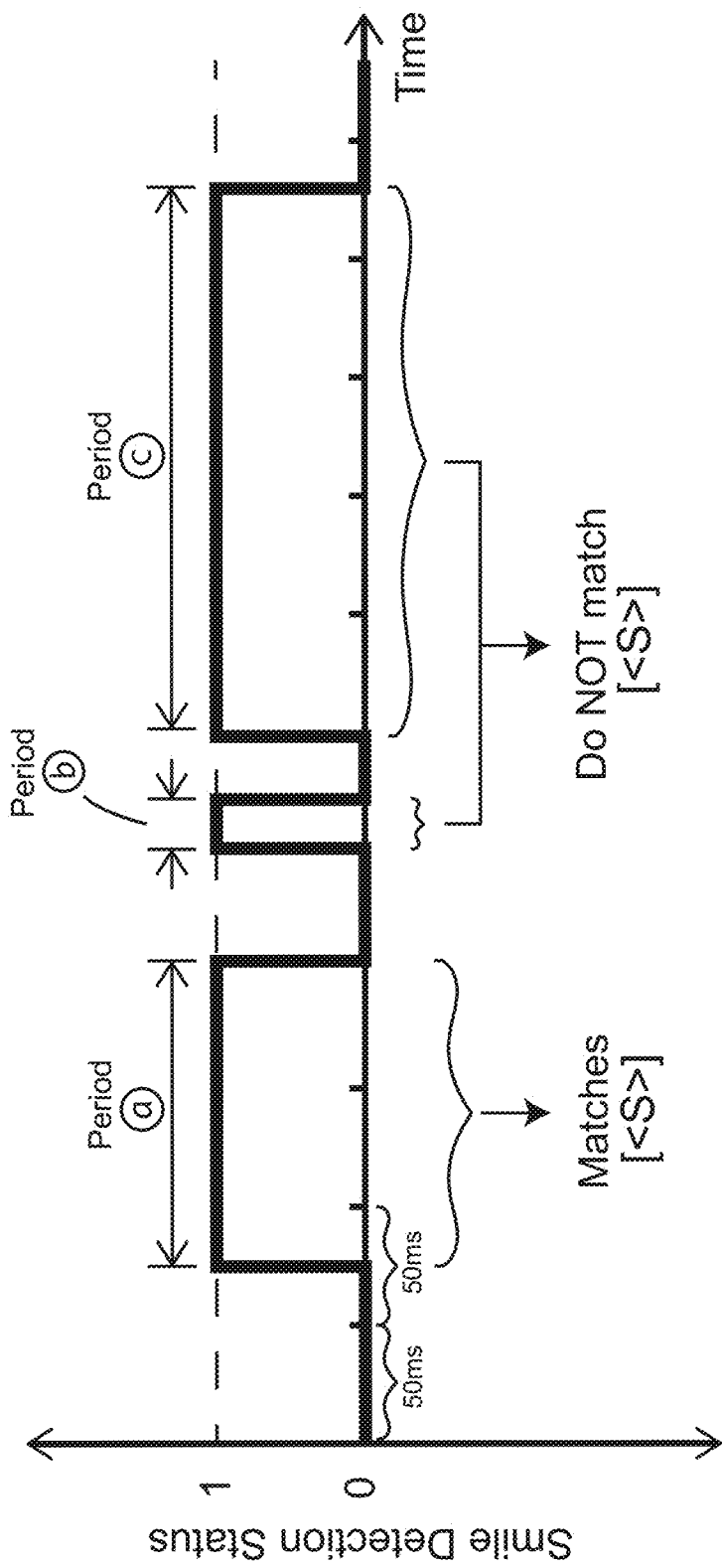
FIG. 4 illustrates exemplary Time Bound Body Actions Represented by Symbols Including "[<S>]"

Time Bounds—A motion or expression that is started, maintained and finished so that the total time duration (i.e. from start to finish) of that motion/expression is within a specified lower and upper bound of time, is symbolically represented by enclosing it within "[" and "]". For example, "[<R]" represents a Left Roll motion started, maintained and ended so that the total time duration of the Left Roll motion falls within a specified range of time duration. (Note that a motion can be said to be started when its absolute magnitude exceeds a specified Motion Noise Threshold (MNT); and a motion can be considered to be ended when its absolute magnitude falls below the same or another specified MNT. The act of holding a body part in a specified position can also be bounded in a similar fashion.) Similarly "[<S S>]" (also represented as "[<S>]" for short), indicates a Smile expression that was started, maintained/held and completed so that the total duration (from start to end) was within a specified range of time. See FIG. 4 for an illustration that shows variation of smile detection status over time. If the time bounds for a the representation "[<S>]" were 75 ms-200 ms for a particular user gesture, then period (a) wherein smile is detected continuously for 150 ms matches the representation "[<S>]". However, periods (b) or (c) do not since they are either too short or too long to be within the bounds specified for this representation.

Magnitude Bounds—A motion, position, expression (or any body action) that is performed so that the absolute maximum speed or magnitude or value attained during that body action (motion, position, expression, etc.) is within a specified lower and upper bound of magnitude, then that body action can be symbolically represented by specifying a numeral (or a numerical superscript) following the letter(s) that represent the body action. (As a convention, we can start the numerals from the number 2.) Therefore, for example, if the user performs a Left Roll motion so that the maximum absolute speed attained during the motion is within certain specified set of bounds, then it can be represented as "<R2". Similarly, for example, "<R3" can indicate a magnitude bounded Roll motion, albeit one with upper or lower speed bound that is different or greater than that of a Left Roll motion indicated by "<R2". Similarly, "<R4" can represents a motion that can be of higher magnitude than "<R3" and so on. Note that the concept of magnitude can be applied to other body actions certain expressions such as Smile, where a user could be said to be smiling mildly versus strongly, or even a Wink and other expressions where the speed and/or level of expression can be measured. Note that some embodiments can have the specified lower magnitude bound to be the same as the Motion Noise Threshold (MNT).

Time & Magnitude Bounded (TMB) Body Actions (including Motions, Positions, Expressions, and Other Actions)—A body action is called a TMB action if it is completed (from start to finish) within a specified range of time duration, and it reaches the maximum speed (or magnitude of speed or measured value) that is within the specified bounds for that TMB action, as specified for a particular user gesture. Therefore, for example, "[<R2]" can represent a TMB Left Roll that achieves a maximum speed that falls within a specified range as well as the complete motion (start to finish) is completed so that the total duration falls within the specified time bound. This concept of "TMBness" of action is usable with Motion, Positions, Expressions as well as other measurable body actions. For the purpose of simplicity, we will not include magnitude bounds of an expression for the illustrative embodiments described in this document (unless explicitly stated to be included), although many embodiments can easily incorporate the magnitude criterion in the criteria for "TMBness" of an expression. Therefore, for example, while we will use "[<S>]" (which only has a time bound) to represent a TMB Smile, other embodiments can use "[<S2>]" (which has time as well as magnitude bound) instead. Specification of time bounds on completion of expressions allows distinction of those expressions from regular expressions, thereby allowing differing interpretation. Again, the specific values of the time bounds (for any body actions) can be different based on user preferences, which user gesture the body action is being used in, the location of occurrence in the user gesture where it is used and any other criteria. The use of bounds on magnitude and/or total time duration of a motion/position/body action pattern can not only allow definition of richer set of user gestures, but can also help in distinguishing intentional/purposeful motions of the user from unintentional/purposeless actions. When the user is educated in these concepts, they are able to perform them in a fashion that the number of false negatives as well as false positives encountered by the control system are greatly reduced. This ultimately can enhance the utility and usability of the controller/control system.

Note: Some of the referenced documents refer to TMB actions as "Quick" actions, though the term "Quick" is meant to represent both time and magnitude bounds on the action, and not meant to impose any limitations to what the values of the time bound should be.

Figure 5:
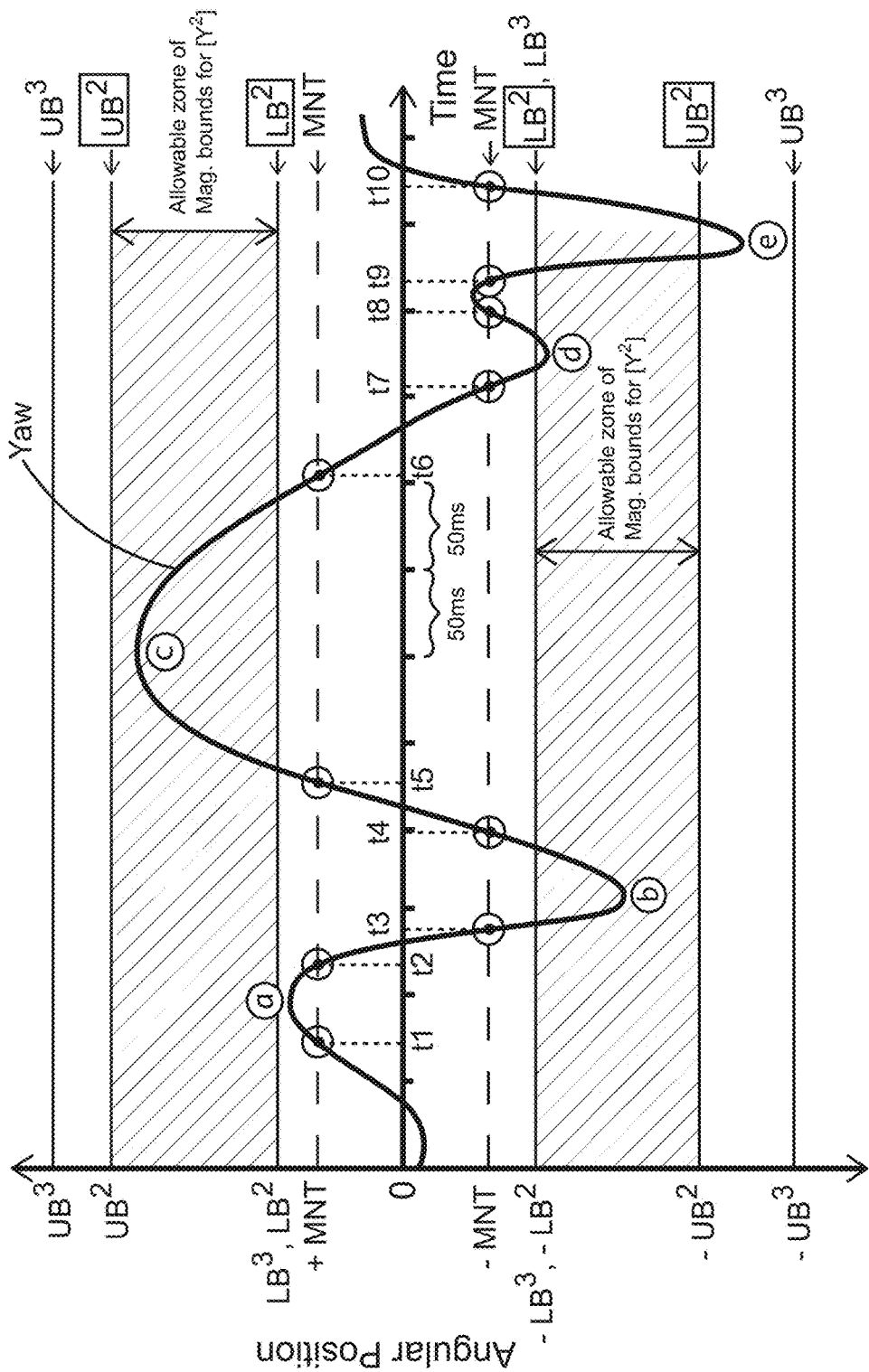
FIG. 5 illustrates exemplary "Quick" Body Actions.

FIG. 5 depicts an illustrative example of variation of monitored Yaw Angular Position "Y" (measured with respect to a baseline reading) plotted against time axis. The +/−MNT lines indicate the Motion Noise Threshold for Y angular position. The +/−LB2 lines lower magnitude bounds and the +/−UB2 lines indicate the upper bounds of an illustrative "[Y2]" representation (that represents a TMB Y angular position pattern). The regions +LB2 to +UB2 and −LB2 to −UB2 represent allowable zones within which the peak magnitude of a particular position pattern needs to fall within to be recognized as a potentially matching position pattern with the above representation. Let us assume that for this example, the time bounds are 50 ms-150 ms. (That is, the duration of the Y should be at least 50 ms and be no more than 150 ms to satisfy the time bound requirements.) Then the position pattern (a) that starts at time t1 and ends at time t2 falls within the time bounds of the "[Y2]" representation, but fails to fall within the magnitude bounds (since the max absolute magnitude between time t1:t2 is less than LB2). Pattern (b), on the other hand, starts at time t3 and lasts till time t4, has duration >=50 ms but <=150 ms and has the peak magnitude that falls in the allowable zone. Therefore, pattern (b) can be recognized as a match with the "[Y2]" representation. Pattern (c) from t5:t6 satisfies the magnitude bound but fails to satisfy the time bound since it lasts for longer than 150 ms. Pattern (d) satisfies the magnitude bound as well but fails to satisfy the time bound by being too short in duration. Pattern (e) satisfies the time bound but has peak magnitude that does not lie within the magnitude bounds and therefore does not match the "[Y2]" representation either. However, Pattern (e) does match with "[Y3]" representation assuming that that representation has the same time bounds as the "[Y2]" representation and LB3 is same as LB2 in value and UB3 is greater than UB2 (as shown in FIG. 5).

Note: In FIG. 5, pattern (b) also qualifies to be a match with "[Y3]" representation as the absolute peak value of (b) is within the magnitude bounds LB2:UB2 as well as LB3:UB3. Some embodiments can remove overlap between two magnitude bounds. In this example, overlap between "[Y2]" and "[Y3]" can be removed by setting lower bound LB3 to be equal to or greater than upper magnitude UB2.

Note: While the illustration in FIG. 5 uses Yaw Angular Position, the same principle can be used with any other body positions or motions, including rotational and translational positions of any body part. Furthermore, the same illustration can be used to demonstrate the TMB concept with other body actions by substituting "Angular Position" by other measures of body action such as level of a facial expression, amount of pressure applied to an input mechanism, level of brain waves, meditative or attentive levels (as measure by measuring brain waves), level of stress/tension or electrical activity detected in a particular set of muscles, or any other suitable measure.

Figure 6:
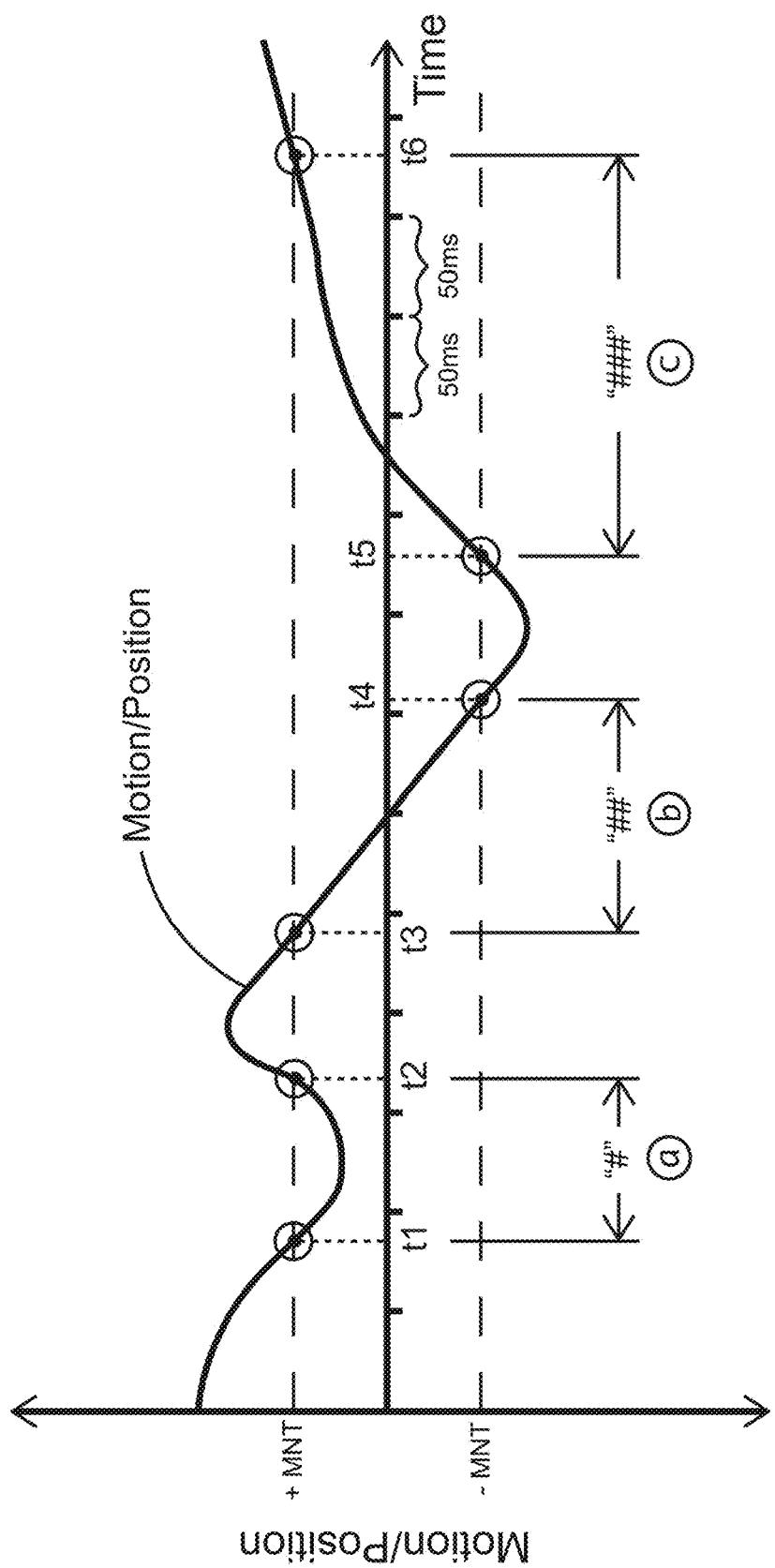
FIG. 6 illustrates exemplary Periods of No Motion.

As mentioned before, the symbol "#" represents a time period of No Motion for at least a first threshold amount of time within a specific user gesture. Further, the symbolic representation "##" indicates a period of No Motion where no significant motion is detected for at least a second threshold amount of time, wherein this second threshold can be larger than the first threshold amount. Similarly, time periods with No Motion for even higher amounts of time can be represented by "###", "####" and so on. Note that every user gesture may define its own values for these time thresholds; that means the time duration for "#" in one user gesture may not be the same as "#" in another user gesture and so on. See FIG. 6 for an illustrative example of various periods of No Motion, where "#" represents a period of No Motion with a (minimum) threshold time duration requirement of 45 ms, "##" with a threshold of 100 ms and "###" with a threshold of 125 ms. The Y-axis can represent either motion or position readings (measured relative to baseline) and X-axis represents time. Period (a) going between t1:t2 shows insignificant motion/position readings (i.e. below the MNT), and since t1:t2 is longer than 45 ms but less than 100 ms and 125 ms, it can map to only "#" period of No Motion. Similarly, period (b) (going from t3 to t4) can map to "##" and period (c) (going from t5 to t6) can map to "###". Some embodiments can match period (b) to "##" as well as "#", and period (c) to "###" as well as "##" and "#". Further, some embodiments may make the above mapping decisions based on user gesture by user gesture basis, user/system preferences, controlled device type or any other criteria.

Note: The value of MNTs can vary between various user gestures. Further, even within the same user gesture, MNTs can have different values for motions along different axes. Further, these MNTs can be different for motions of different parts of the body. Therefore, for example, the MNT for motion of a user's hand along the X-axis may be different from MNT for motion of the user's hand along the Y-axis even within the same user gesture. Similarly, the MNT for motion of hand along an axis may be different from MNT for motion of head along the same axis, even within the same user gesture.

Figure 7:
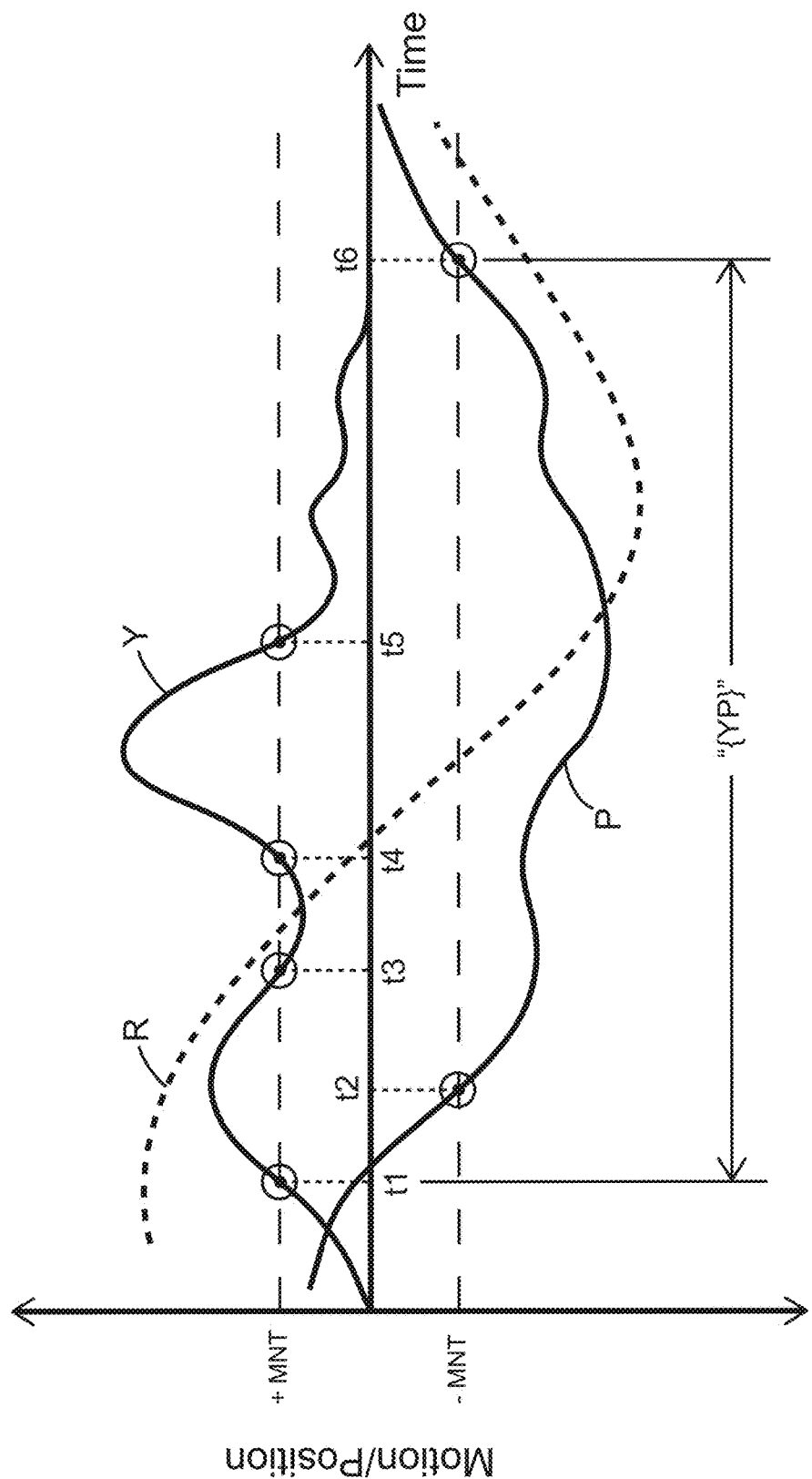
FIG. 7 illustrates an exemplary Body Action Pattern Matching "{YP}"

Some embodiments of the control software/control system can generally look for presence of constituents of motions and/or expressions that define a user gesture, and can ignore anything that is not explicitly present in the symbolic representation of that user gesture. Therefore, for example, if a control system is only looking for a user gesture represented by the representation "{YP}", then even when a combination of Y, P and R motions is detected (where Y and/or P are continuously detected but R is detected at least for some time during the period of Y/P), the system can still tag that time period as matching "{YP}" pattern; the system can thereby effectively ignore the R motion as superfluous or irrelevant for the purposes of detecting user gesture {YP}# (Needless to say that if the system was also looking for {YPR} user gesture at the same time then the above experienced motion/position pattern would be mapped to the {YPR} user gesture.) See FIG. 7 for an illustration of this behavior. The Y pattern (Yaw) is detected only in the time periods of t1:t3 and t4:t5. The P pattern (Pitch) has significant values only during time period t2:t6. However, together, Y&/or P are beyond the MNT thresholds (i.e. detected to be active) continuously from t1:t6, and hence that becomes the time period when the Y & P patterns considered together match the motion representation "{YP}". Note that R is present for significant portion of the time duration of the "{YP}" motion, but is effectively ignored in this embodiment for the purposes of monitoring for motion/position patterns that can match with the representation "{YP}". In a variation, some embodiments can require that no other superfluous motions or positions be present other than those explicitly stated in the representation of the user gestures. For example, in such embodiments, if the system is looking for a {YP}, then any presence of R during the Y or P motion can disqualify those segments of time when R is also active. The required absence of a particular motion/position/expression/action can be represented by a superscript of 0. Therefore a {YPR0} represents a duration of time when at least a Y or P is detected, but no R.

The types of motions/expressions that are monitored for matching the "#" pattern of motion within a user gesture can be based on what kind of motion types are specified in the complete representation of the user gesture. For example, if a user gesture is (completely) represented by the pattern "<S . {YP} S>", then the No Motion time period (that is one represented by "#") within that user gesture represents a period wherein there is no active Y or P motion is detected for at least a specified time threshold. Then, even if some amount of R motion is detected during the period of No Motion, since R motion is not part of this user gesture, it can be ignored by the system when matching this period of time to the "#" part of this user gesture.

Fixed Length Blackout Period—The symbol "*" indicates a time period of a specified fixed duration during which any motions/positions/expressions are ignored for purposes of gesture recognition. The duration of this time period can be set to a different amount based on the user gesture this time period occurs in and the location where it occurs within the definition of user gesture. This time period is called the Fixed Length Blackout Period (FLBP). FLBPs can provide convenience to user in performing the user gestures, and they can be optional based on skill level of the user. Their lengths (durations) can be changed based on user preference or even be set to zero.

Variable Length Waiting Period—The symbol "~" indicates an indefinite period of time where all motions/positions and/or expressions are ignored by the system with the exception of the one specified to terminate this period. This period could be interpreted as a waiting period where the system is looking for a specific motion/position/expression to be detected and can ignore everything else until that motion/position/expression is performed. This "~" will be called Variable Length Waiting Period (VLWP). The motion/position/expression that a VLWP waits to detect is specified right after the VLWP in the representation/definition of the user gesture. For example, the representation "~R" indicates a time period of indefinite duration where all motions/expressions are ignored until up to a point in time when a "R" motion (Roll) is encountered. In this example, "R" is the "terminating" action for the VLWP.

Figure 8:
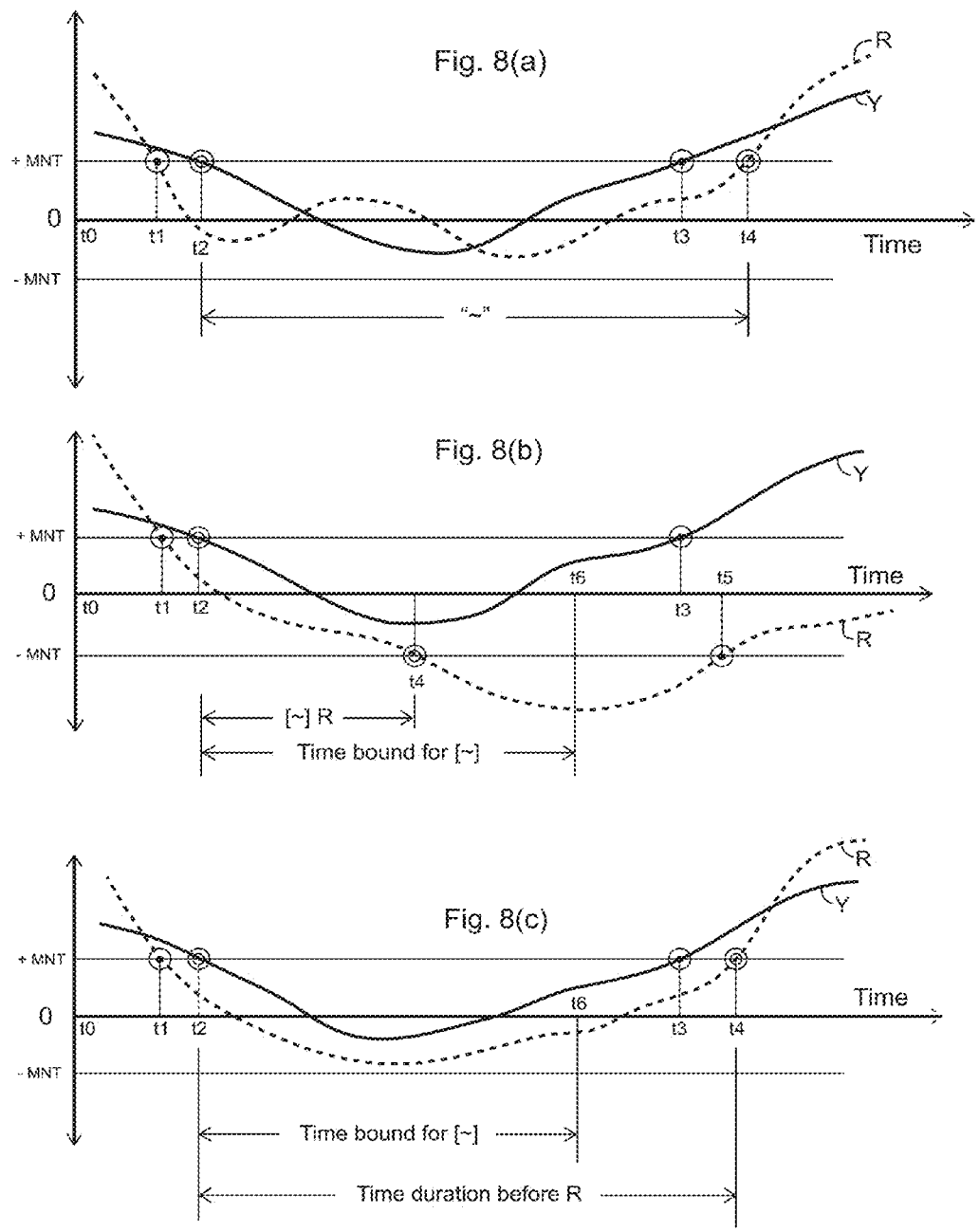
FIG. 8(a) illustrates exemplary Y (yaw) and R (roll) Body Action Patterns over time to illustrate how VLWP (represented by the symbol "~") works, and in particular shows a pictorial representation of a portion of "Y ~R" user gesture.
FIG. 8(b) illustrates exemplary Y and R Body Action Patterns over time to illustrate how VLWP works, and in particular shows a pictorial representation where the R value falls outside the MNT range within the time bounds for VLWP, "[~]"
FIG. 8(c) illustrates exemplary Y and R Body Action Patterns over time to illustrate how VLWP works, and in particular shows a pictorial representation where the R value does not fall outside the MNT range within the time bounds for VLWP, "[~]"

Refer to FIGS. 8(a), (b) and (c). These three figures show an illustrative example showing variation of Y and R motion/position with respect to time for purpose of illustrating how VLWP can work. For purpose of simplicity, both Y and P are shown to have the same MNT values. FIGS. 8(a), (b) and (c), all depict a pictorial representation of a portion of "Y ~R" user gesture. At time t0, the system is assumed to be in a state where it has already recognized "Y" part of the user gesture and is actively monitoring Y motion/position and ignoring other motion/position variations such as R. (Therefore when R drops to below MNT at time t1, the system ignores that event.) The Y motion/position falls to below the MNT at time t2 (that is, Y comes to an end at t2) and the system recognizes that and starts monitoring for the next part of the user gesture, which is a VLWP represented by the "~R" in the user gesture. Starting time t2, the control software/system can start ignoring all other motions/positions until it encounters R motion/position that is greater than the MNT (that is, to become active). Therefore, even if the Y restarts at time t3, that is ignored by the system, and the system continues to wait for R motion to be become active (i.e. to attain absolute value greater than the MNT). Finally, when R is started at time t4, that is when the time period between t2 to t4 is matched by the system with the "~" part of the "Y ~R" user gesture. After time t4, the system starts monitoring for the end of R motion (not shown in the figure) to determine the end of the user gesture "Y ~R". FIGS. 8(b) and (c) show how the system can behave when time bounds are used with VLWP, and are explained below.

Time Bound VLWP—The symbolic representation "[~]" represents a VLWP that cannot exceed specified maximum time duration and cannot be less than the specified minimum time duration. Note that the lower bound can be set to zero for a particular or even all user gestures. The representation "[~] R" can indicate a time period where all motions/expressions are ignored until up to the point in time when a "R" motion is encountered before or immediately after the specified maximum time limit is reached. Therefore, for example, if the upper bound on "[~] R" in a particular embodiment was 500 milliseconds (ms), then this VLWP will be said to be terminated if an R motion was encountered at 200 ms (from the beginning of the VLWP). However, if no R motion was detected for the entire duration of 500 ms or immediately after the end of 500 ms, the system can stop looking for the VLWP and determine that the specified VLWP (i.e. the "[~] R") was not encountered. Therefore, even if an "R" motion is detected after more than 500 ms, that pattern of motion may not be recognized as one matching with the representation "[~] R". Refer to FIGS. 8(b) & (c) for illustration of how one embodiment system can match a motion/position pattern with a "Y [~]R" gesture. Monitoring for a VLWP is kicked off at t2 (as explained in previous section) however with a difference that in FIGS. 8(b) & (c), the system is looking for R within a time limit of "Time bound for [~]" as illustrated in the figures. In FIG. 8(b), the R value does fall outside the MNT range (meaning that R is started/detected to be active) at time t4, which is within the time bounds of the "[~]" part of the user gesture (indicated by time period t2:t6). The system therefore can match the time period t2:t4 as a successful match with the time bound VLWP in the user gesture. In contrast, in FIG. 8(c), R is started at t4, which does not fall in the expected time bound range (that is during the period t2:t6). Therefore, the motion/position pattern of FIG. 8(c) does not match with the user gesture "Y [~]R". In this case, the system can restart looking for the user gesture, all over again from the beginning of the user gesture (i.e. the "Y" part of the user gesture). This can include clearing the motion/position/expression information stack or list.

Following is description of illustrative embodiments detailing definition/specification of various user gestures and their mapping into commands for the controlling an Electronic Device (See Table 1). Further, as part of the explanations of specific user gestures, general purpose principles and techniques are also discussed that can also be used with other embodiments and/or create newer embodiments of control systems or user gestures. Although Smile is used as the Primary Control Expression (PCE) in many embodiments, other expressions may also be used as the PCE. Further, as discussed before, PCMs (Primary Control Motions) as well as other bodily actions can be used as or in place of PCEs in any or all situations, including disclosed concepts/principles, heuristics, embodiments, etc. Also note that while the following details various body part motions in the exemplary definition of user gestures, they can be substituted by positions of body parts instead. E.g. Yaw motion head can be substituted by Yaw position of the head in a user gesture, and so on.

Further note that any PCE/expression in a user gesture can be substituted by another input mechanism(s). For example, instead of smiling as part of a user gestures, the user could instead press or touch a button or a key or touch sensitive surface or switch or even use their hands/other body parts to make gestures (such as waving/swiping hands/arm, kicking, punching, raising a hand, opening or closing of a palm/hand, finger pointing, lifting or pointing a combination of fingers and/or thumb, etc.). Therefore, for example, Smile initiation could be replaced by button/key press/change in touch status and/or Smile termination could be replaced by button/key release/another change in touch status. In other embodiments, the Smile action can be replaced by a PCM such as Raising a Hand, etc. Even with such substitutions, the principles disclosed in this application are still valid and can be used in design of user interfaces for controllers and control systems and other electronic devices.

TABLE 1

| An illustrative Embodiment of Gesture based User Interface (that can be used as part of a Control System) | |
|---|---|
| Command to be Invoked (on the Controlled Electronic Device and/or Controller/ Controlling System) | User Gesture to Invoke the Command (Symbolic Representation and Explanation) |
| Move/Modify Cursor or OOI (Object of Interest) | <S * {YP} {YP#} S> Description of Symbolic representation: Initiation of a Smile followed by FLBP (where all motions are ignored for a specified duration of time), followed by indefinite period of Yaw and/or Pitch motions only, followed by another (indefinite) period of Yaw, Pitch as well as "No Motion", followed by termination of the Smile. Explanation & Discussion: This user gesture begins with user initiating a Smile. For a certain specified time period immediately after the initiation of the smile all motions are ignored (FLBP). This FLBP can thereby give the user a chance to settle down and not cause any unintentional cursor/OOI motions. Immediately after the FLBP, the user is expected to have at least some period of Yaw and/or Pitch motion (which is important to distinguish this gesture from the "Window Scroll/Pan" and "Click and Drag" gesture; explained later) followed by indefinite period of Yaw/Pitch/No motion. During these last two periods, the events for cursor/OOI motion can be sent in accordance with the Yaw and Pitch motion (subject to heuristics explained in the above referenced Patent Applications). The motion events stop when Smile terminates indicating the end of the user gesture. Note: This process is as explained in the first referenced US Patent Applications above. See the patent application for more details of impact of other heuristics on the motion of OOI. Note: As mentioned previously, since this user gesture lists only S, Y, P and "#" in its definition, all other motion types (such as R, Tx, Ty, Tz) as well as expressions can be ignored during this user-gesture. Similar approach can be taken for other user gestures as well, where motions and expressions not specified in the user gesture definition can be ignored for purpose of recognizing that user gesture. Note: The duration of the FLBP represented by "*" is a matter of user preference, and could be set to zero time duration. Note: It is not necessary for the user to complete a user gesture for the system to recognize it and to start processing it. This command is just one example of such a situation. In this case, the system can start generating events (such as motion events) right after a part (e.g. "<S * {YP}" or "<S *") of the complete user gesture is recognized |
| Click or Select | [<S>] Description of Symbolic representation: An expression of a Smile is initiated and terminated in a TMB fashion (that is the total duration of the smile falls within a specified range of time duration.) Explanation & Discussion: When the user completes a Smile within a specified range of time duration, a Click or Selection command can be issued to the Electronic Device. On certain Electronic Devices (such as computers) a "Click"/Selection results in a "Left Mouse Button Press" signal, however, other embodiments and/or devices can have other signals generated, such as touch signals, accessibility switch signals, other button press and/or release signals, keyboard key press and/or release signals, etc. Note: Presence or absence of motion before, during or after the smile can be ignored as long as the smile is completed in the specified time duration, for that smile to be mapped (translated) to a click/selection command on the electronic device. Note: Additional details are included in the above referenced US Patent Applications. |
| Scroll/Pan a Window or Screen | <S * ## {YP} {YP#} S> Description of Symbolic representation: A Smile is initiated, followed by a FLBP, followed by period of No Motion (whose duration is equal to or greater than a specified |

TABLE 1-continued

An illustrative Embodiment of Gesture based User Interface
(that can be used as part of a Control System)

| Command to be Invoked (on the Controlled Electronic Device and/or Controller/ Controlling System) | User Gesture to Invoke the Command (Symbolic Representation and Explanation) |
|---|---|
| | threshold corresponding to "##"), followed by an indefinite period of Yaw &/or Pitch, followed by another indefinite period of Yaw/Pitch/No Motion, followed by termination of the Smile.<br>Explanation & Discussion:<br>This user gesture starts with user starting to Smile. Once the Smile is started, a FLBP gives the user a chance to settle down by ignoring their motions for certain fixed time duration. After that point, the user is expected to hold their head/body/part of body still (for a minimum specified amount of time which is the specified duration for "##") so that there is a period of No Motion as far as Yaw and Pitch motions are concerned. At the end of this No Motion period, a period of combination of Yaw and Pitch motions is started. At this time, the system recognizes the gesture as one for Scroll/Pan and thereby starts sending scroll/pan or equivalent events through the remainder of the user gesture, until the point in time when the user terminates the Smile.<br>One embodiment sends Up and Down Scroll/Pan events (or equivalent) corresponding to the Pitch motions and Left and Right Scroll/Pan events (or equivalent) corresponding to the Yaw motions. Other embodiments can map events to motions differently.<br>Note: The specified threshold time for No Motion for this user gesture (i.e. "##") in this embodiment can be less than the one specified for Click and Drag defined below (which uses "###" as the specified threshold for No Motion). Further, the maximum allowed duration of the No Motion action in this user gesture can be less than "###" threshold for Click and Drag. However, other embodiments can use "###" for Scroll/Pan gesture and "##" for Click and Drag gesture. |
| Click and Drag | <S * ### {YP#} S><br>Or<br><S * ###{YP}{YP#} S><br>Description of Symbolic representation:<br>A Smile is initiated, followed by a FLBP, followed by period of No motion (whose duration is equal to a specified threshold), followed by an indefinite period of combination of Yaw, Pitch and No Motion, which is then followed by termination of the Smile.<br>Alternatively, a Smile is initiated, followed by a FLBP, followed by a period of No Motion (whose duration is equal to a specified threshold), followed by an indefinite period of Yaw, Pitch; followed by yet another period of Yaw/Pitch/No Motion, which is then followed by termination of the Smile.<br>Explanation & Discussion:<br>This user gesture starts with user starting to Smile. Once the Smile is started, a FLBP can allow the user to settle down (by ignoring motions for specified amount of time) and for them to hold their head/body/part of body/controller still so that there is a period of No Motion as far as Yaw and Pitch motions are concerned. (Note that in this embodiment, the period of No Motion is larger than the one for "Window Scroll/Pan" explained above.) At the end of this period, a Left Mouse Button (LMB) Press event (or some other event) can be generated. Following this point, the cursor/OOI can become eligible to start moving in accordance to the Y and P motions (and subject to other heuristics as explained in the above referenced Patent Applications) until the point in time when the Smile is ended. At that point, a LMB Release event (or some other event) can be generated.<br>Note: If there are no Yaw or Pitch motions observed throughout this user gesture, then this motion/position/expression pattern can result in a LMB Press event followed by a time lag which is followed by a LMB Release event without any motion of the cursor/OOI. This user gesture hence can be used to generate a slow prolonged Click/Select (Long Press or Click or Touch, etc) on certain Electronic Devices and possibly have a different interpretation (that is a different set of events/commands generated) than a regular Click/Select.<br>Note: The alternative definition (the second one provided above) provides flexibility to define additional user gestures similar to this user gesture albeit with even longer initial periods of No Motion.<br>Note: The specified threshold time for No Motion for this user gesture in this embodiment is more than the one specified for Pan and Scroll. However, other embodiments may have that reversed. |

TABLE 1-continued

An illustrative Embodiment of Gesture based User Interface
(that can be used as part of a Control System)

| Command to be Invoked (on the Controlled Electronic Device and/or Controller/ Controlling System) | User Gesture to Invoke the Command (Symbolic Representation and Explanation) |
|---|---|
| | Note: As mentioned above, FLBP time duration can be varied for this user gesture (and all the others as well) as per user preference, and can even be reduced to zero. |
| Right Click or Right Select or Secondary Menu | {R>} [~] [<S>] Description of Symbolic representation: A Right Roll motion (of indefinite length) starts this user gesture; followed by a time bound VLWP that waits for a TMB Smile Explanation & Discussion: The user gesture begins with a Right Roll motion; this motion does not have a time bound but other embodiments may have it to be time bound. The system starts looking for start of the Smile right after the initiation of the R> motion, however, the countdown associated with the VLWP does not start until R> motion is ended. If a Smile is not already initiated, the system starts a VLWP looking for a Smile to be initiated (within the time bound as specified for the VLWP). Regardless of when the Smile is initiated, it has to be completed within the bounds defined for the TMB Smile for this user gesture, for the user gesture to be recognized. Note: Presence or absence of motion during the Smile is irrelevant if the smile is completed in the specified time duration (of a TMB Smile). Note: A different threshold (other than the MNT) can be defined for the R> motion to detect if the R> motion has in fact started. This R Threshold can be greater than the MNT to make the user be more deliberate in initiating this user gesture (thereby reducing unintentional triggering of this user gesture/command). This approach can be taken for any user gestures to force the users to make their motions a bit more exaggerated during certain user gestures to avoid unintentional triggering. Note: Time and magnitude bounds can be specified on the "R>" motion. Note: Another variation of the user gesture for this command can be "{R>} [<S>]", which can allow the user to start the Smile even before the {R>} has ended. Meaning, there can be overlap between the R and S actions. Note: Effectively, a designated action performed just prior to a user gesture can change the interpretation of that gesture. In this case, a user gesture for Left Click command generates a Right Click instead, when preceded by a specified "R" action. This designated action can be called "Modifier Action". |
| Right Click and Drag | {R>} [~] <S* ## {YP#} S> Or {R>} [~] <S* ## {YP}{YP#} S> Description of Symbolic representation: This user gesture starts with Right Roll motion (of indefinite length), followed by a time bound VLWP that waits for a Smile. The Smile is followed by a FLBP after which a period of No Motion is expected. This is followed by either a combination of Yaw/Pitch/No Motion or a first a combination of Yaw/Pitch motion and then followed by a combination of Yaw/Pitch/No Motion. The user gesture ends with end of the Smile. Explanation & Discussion: The user gesture begins with a Right Roll motion; this motion does not have a time bound (though other embodiments can have it be time bound). The system starts looking for start of the Smile right after the initiation of the R> motion, however, the countdown associated with the VLWP does not start until R> motion is ended. If a Smile is not already initiated, the system starts a VLWP looking for a Smile to be initiated (within the time bound as specified for the VLWP). Regardless of when the Smile is initiated, a FLBP follows (wherein all motions are ignored for the specified time period). Immediately after this FLBP, the system expects a period of No Motion (where no significant Yaw/Pitch/Roll motions are expected). At the end of this No Motion period a Right Mouse Button (RMB) Press event (or an equivalent event or some other desired event) can be generated. Following this point, the cursor/OOI is eligible to start moving in accordance to the Y and P motions (and subject to other heuristics as explained the above referenced patent applications) till the point in time when the Smile is ended. At that point, a RMB Release event (or equivalent or other desired event) can be generated. |

TABLE 1-continued

An illustrative Embodiment of Gesture based User Interface
(that can be used as part of a Control System)

| Command to be Invoked (on the Controlled Electronic Device and/or Controller/ Controlling System) | User Gesture to Invoke the Command (Symbolic Representation and Explanation) |
|---|---|
| | Note: The "R" action that is started before the beginning of the facial expression ("<S"), can be viewed as a Modifier Action that modifies the interpretation of previously defined Left Click and Drag user gesture.<br>Note: If there is no Yaw or Pitch motion observed throughout this user gesture, then this gesture results in a RMB Press event followed by a time lag that is followed by a RMB Release event without any motion of the cursor/OOI. This user gesture hence can be used to generate a slow prolonged Right Click/Secondary Menu commands on certain Electronic Devices. Such prolonged patterns without any significant motions could also be used to generate other commands/events in other embodiments.<br>Note: The alternative version requires a period of Yaw/Pitch right after the period of No Motion, which is then followed by a combination of Yaw/Pitch/No Motion. This version allows for additional user gestures be defined (resulting in different commands being issued) where the period of No Motion is longer than the one in this user gesture.<br>Note: Further variations are also possible by eliminating the VLWP from the user gesture completely by thereby allowing the user to start the Smile part of the user gesture even before the R part has ended. |
| Go Back<br>Or<br>Swipe Left | [<Y2] [~].<br>Or<br>#[<Y2] [~] # Or<br>[<Y2] * # Or<br>[<Y2]<br>Description of Symbolic representation:<br>A TMB Left Yaw motion (that is a Left Yaw which has both a time and magnitude bound) is followed by a time bound VLWP period where any motions are ignored until No Motion is encountered. Alternatively, the above pattern could also be preceded by a period of No Motion. In a further variation, the first pattern can have the VLWP replaced by a FLBP. In another variation, no POLA may be required at the end of the user gesture.<br>Explanation & Discussion:<br>This first version of the user gesture starts with a TMB Left Yaw motion, followed by a VLWP that terminates upon specified time limit or upon detecting a period of No Motion. A "Go Back" or "Swipe Left" or an equivalent command is issued upon encountering the period of No Motion of specified minimal duration. For example, when using Internet Browser, this user gesture may lead to a "Alt + Left" event and/or a "Backspace" on a Windows based device.<br>Note: The second version of the pattern listed above includes a period of No Motion at the beginning (compared to the first version). This can allow further distinction of intentional motions from unintentional motions when the system performs gesture recognition. This approach can be used to have periods of No Motion preceding a user gesture's pattern or ending a user gesture with a period of No Motion can be used for some of the other user gestures in this or other embodiments. In fact, some embodiments of the User Interface can instruct the users to possibly start every user gesture with a period of No Motion and possibly end every user gesture with a period of No Motion as well. This approach can lead to simplification of the gesture recognition algorithm as well as lead to lower incidence of cases where commands are triggered by the system without the full intent of the user.<br>Note: The VLWP allows for ease of use for users as it allows them to come back to a more comfortable position after the TMB Yaw motion.<br>Note: The third version listed above has a FLBP instead of a VLWP as in the first version.<br>Note: An alternative version of this user gesture can be simply "[<Y2]" which is simply a TMB Left Yaw. Though simpler, this version can be more prone to be triggered unintentionally. It will be obvious to a person in the field that several more combinations are possible using FLBP, VLWP and period of No Motion before or after the "[<Y2]" motion. Further, the time durations/bounds of the FLBP, VLWP, and No Motion can be increased or decreased (up to substantially equal to zero) as per user or developer preference, for this user gesture or any other user gesture. |

TABLE 1-continued

An illustrative Embodiment of Gesture based User Interface
(that can be used as part of a Control System)

| Command to be Invoked (on the Controlled Electronic Device and/or Controller/ Controlling System) | User Gesture to Invoke the Command (Symbolic Representation and Explanation) |
|---|---|
| Go Forward<br>Or<br>Swipe Right | [Y2>] [~] #<br>Or<br>#[Y2>] [~] #<br>Or<br>[Y2>] * #<br>Or<br>[Y2>]<br>Description of Symbolic representation:<br>A TMB Right Yaw motion followed by a time bound VLWP period where any motions are ignored until period of No Motion is encountered. Alternatively, the above pattern could also be preceded by a period of No Motion. In a further variation, the first pattern can have the VLWP replaced by a FLBP. In another variation, no POLA may be required at the end of the user gesture.<br>Explanation & Discussion:<br>The first version of this user gesture starts with a TMB Right Yaw motion, followed by a VLWP that terminates upon specified time limit or upon detecting a period of No Motion. A "Go Forward" or "Swipe Right" or an equivalent command is issued upon encountering the period of No Motion of specified minimum duration. For example, when using Internet Browser, this user gesture can lead to generation of a "Alt + Right" event/signal on a Windows based device.<br>Note: The VLWP allows for ease of use for users as it allows them to come back to a more comfortable position after the TMB Yaw motion. It also allows for discriminating between intentional and unintentional gestures. However, this VLWP (and the following period of No Motion) could be treated as an optional part of the user gesture and removed. The same approach (of treating VLWP as optional) could be taken with other commands as well to simplify their user gestures but at the risk of increasing unintentional triggers.<br>Note: Periods of No Motion could be inserted at the beginning and/or VLWP be replaced by FLWP and time bounds/durations can be increased or decreased (to up to zero), as per earlier discussion, for this or any other user gesture. |
| Window<br>Minimize | [Y2>] [~] [P2>] [~}#<br>Or<br>[Y>] [~] [P>] [~}#<br>Description of Symbolic representation:<br>A TMB Right Yaw motion followed by a time bound VLWP that waits for a TMB Down Pitch motion, followed by another time bound VLWP that waits for No Motion.<br>Alternatively, a time bound Right Yaw motion (without bounds on the speed/magnitude) followed by a VLWP (with a time bound) which waits for a Down Pitch motion (which is also time bound), which is followed by another time bound VLWP that waits for No Motion.<br>Explanation & Discussion:<br>This user gesture starts with a TMB Right Yaw motion followed by a time bound VLWP that waits for a TMB Down Pitch motion. The VLWP between the two motions allows for user friendliness/ convenience by permitting some irrelevant motions between them (that may be unintentionally triggered). Given that this VLWP is time bound, the upper limit of the time bound could be made very small or bit large based on user preference, or even set to zero (effectively removing it from the definition of the user gesture). The following time bound VLWP allows for better discrimination between intentional and unintentional gestures, however, it may be treated as optional and removed based on user preferences or other criteria.<br>Alternatively, as described the second representation, the TMB motions (which have both a time as well as speed bound) may be substituted by motions with only a time bound. This allows for user convenience whereby they do not have to be precise when gesturing the TMB motions. However, a tradeoff has to be made since motions that are more forgiving may lead to higher number of unintentional gestures.<br>Other alternative representation could also be had by mixing and matching TMB versus only time bounded Yaw and Pitch motions.<br>A Window Minimize command or equivalent command or any other desired event is issued at the end of the user gesture. |

TABLE 1-continued

An illustrative Embodiment of Gesture based User Interface
(that can be used as part of a Control System)

| Command to be Invoked (on the Controlled Electronic Device and/or Controller/ Controlling System) | User Gesture to Invoke the Command (Symbolic Representation and Explanation) |
|---|---|
| Window Maximize | Note: Further variations are possible by eliminating the VLWP from the user gesture to allow P motion to start even before Y motion is completed.<br>Note: Further variations can be obtained by substituting VLWPs by POLAs or periods of No Motion, or by adding POLAs or "#" action immediately after the VLWPs.<br>[Y2>] [~] [<P2] [~}#<br>Or<br>[Y>] [~] [<P] [~}#<br>Or<br>[Y>] [~] [<P2] [~}#<br>Description of Symbolic representation:<br>A TMB Right Yaw motion followed by a VLWP (with a time bound) which waits for a TMB Up Pitch motion, followed by another time bound VLWP that waits for No Motion.<br>Alternatively, a time bound Right Yaw motion (without bounds on the speed) followed by a VLWP (with a time bound) which waits for an Up Pitch motion (which is also time bound), which is followed by another time bound VLWP that waits for No Motion.<br>Explanation & Discussion:<br>This user gesture starts with a TMB Right Yaw motion followed by a time bound VLWP that waits for a TMB Up Pitch motion. The VLWP between the two motions allows for user friendliness/ convenience by permitting/ignoring some irrelevant motions between them. Given that this VLWP is time bound, the upper limit of the time bound could be made very small or bit large based on user preference, or even set to zero (effectively removing it from the definition of the user gesture). The following time bound VLWP allows for better discrimination between intentional and unintentional gestures, however, it may be treated as optional and removed based on user preferences or other criteria.<br>Alternatively, as described the second representation, the TMB motions (which have both a time as well as speed bound) may be substituted by motions with only a time bound. This allows for user convenience whereby they do not have to be precise when gesturing the TMB motions. However, a tradeoff has to be made since motions that are more forgiving may lead to higher number of unintentional gestures.<br>In a further variation (as shown in the third version), a combination of TMB motion with time bound motion can also be used. Here the Y motion has only a time bound but the P motion is TMB (that is has both time and magnitude bound). It will be obvious that the Y motion can be made TMB and P motion can be made time bound only instead in yet another variation.<br>A Maximize Window (or equivalent or other desired) command is issued at the end of the gesture.<br>Note: Further variations are possible by eliminating the VLWP from the user gesture to allow P motion to start even before Y motion is completed.<br>Note: Further variations can be obtained by substituting VLWPs by POLAs or periods of No Motion, or by adding POLAs or "#" action immediately after the VLWPs. |
| Enter/OK/Return | [P2>] [~] [<Y2] [~}#<br>Or<br>[P>] [~] [<Y] [~}#<br>Description of Symbolic representation:<br>A TMB Down Pitch motion followed by a time bound VLWP that waits for a TMB Left Yaw motion, followed by another time bound VLWP that waits for No Motion.<br>Alternatively, a time bound Down Pitch motion (without bounds on the speed) followed by a VLWP (with a time bound) which waits for a Left Yaw motion (which is also time bound), which is followed by another time bound VLWP that waits for No Motion.<br>Explanation & Discussion:<br>This user gesture starts with a TMB Down Pitch motion followed by a time bound VLWP that waits for a TMB Left Yaw motion. The VLWP between the two motions allows for user friendliness/ convenience by permitting some irrelevant motions between them (that may be unintentionally triggered). Given that this VLWP is time bound, the upper limit of the time bound could be made very small or large based on user preference, or even set to zero (effectively removing it from the definition of the user gesture). The |

TABLE 1-continued

An illustrative Embodiment of Gesture based User Interface
(that can be used as part of a Control System)

| Command to be Invoked (on the Controlled Electronic Device and/or Controller/ Controlling System) | User Gesture to Invoke the Command (Symbolic Representation and Explanation) |
|---|---|
| | following time bound VLWP can allow for better discrimination between intentional and unintentional gestures, however, it may be treated as optional as well and removed based on user preferences or other criteria.<br>Alternatively, as described the second representation, the TMB motions (which have both a time as well as speed bound) can be substituted by motions with only a time bound. This allows for user convenience whereby they do not have to be precise when gesturing the TMB motions.<br>Note: Further variations are possible by eliminating the VLWP from the user gesture to allow Y motion to start even before P motion is completed.<br>Other alternative representation could also be had by mixing and matching TMB versus only time bounded Yaw and Pitch motions.<br>A "Return"/"Enter" key press event (command signal) or an "OK" button press signal on a window or equivalent command signal or any other desired event/signal can be issued at the end of the user gesture. |
| Cancel or Undo | [P2>] [~] [Y2>] [~]#<br>Or<br>[P>] [~] [Y>] [~]#<br>Description of Symbolic representation:<br>A TMB Down Pitch motion followed by a time bound VLWP that waits for a TMB Right Yaw motion, followed by another time bound VLWP that waits for No Motion.<br>Alternatively, a time bound Down Pitch motion (without bounds on the speed) followed by a VLWP (with a time bound) which waits for a Right Yaw motion (which is also time bound but without bounds on speed), which is followed by another time bound VLWP that waits for No Motion.<br>Explanation & Discussion:<br>This user gesture starts with a TMB Down Pitch motion followed by a time bound VLWP that waits for a TMB Right Yaw motion. The VLWP between the two motions allows for user friendliness/ convenience by permitting some irrelevant motions between them (that may be unintentionally triggered). Given that this VLWP is time bound, the upper limit of the time bound could be made very small or large based on user preference, or even set to zero (effectively removing it from the definition of the user gesture). The following time bound VLWP allows for better discrimination between intentional and unintentional gestures, however, it may be treated as optional as well and removed based on user preferences or other criteria.<br>Alternatively, as described the second representation, the TMB motions (which have both a time as well as speed bound) may be substituted by motions with only a time bound. This allows for user convenience whereby they do not have to be precise when gesturing the TMB motions.<br>Other alternative representation could also be had by mixing and matching TMB versus only time bounded Yaw and Pitch motions.<br>A "Cancel" event can be generated on a window and/or an "Undo" command or equivalent command or any other desired event can be issued at the end of the user gesture.<br>Note: Further variations are possible by eliminating the VLWP from the user gesture to allow Y motion to start even before P motion is completed. |
| Desktop Show/Hide | [<Y2] [Y2>] [<Y2] [~]#<br>Or<br>[Y2>] [<Y2] [Y2>] [~]#<br>Or<br>[Y2>] [<Y2] [Y2>]<br>Or<br>[Y>] [<Y] [Y>]<br>Or<br>[<Y] [Y>] [<Y]<br>Description of Symbolic representation:<br>A first TMB yaw motion followed by second TMB Yaw motion in opposite direction (to the first motion), which in turn is followed by a third TMB Yaw motion in opposite direction to the second one. The last TMB Yaw motion is followed by a time bound VLWP waiting for No Motion. The Yaw motions can be with or without speed bounds. The VLWP and No Motion periods can be optional. |

TABLE 1-continued

An illustrative Embodiment of Gesture based User Interface
(that can be used as part of a Control System)

| Command to be Invoked (on the Controlled Electronic Device and/or Controller/ Controlling System) | User Gesture to Invoke the Command (Symbolic Representation and Explanation) |
|---|---|
| | Explanation & Discussion: This user gesture has multiple alternatives as explained above. At the end of the user gesture, if all windows are not already minimized, a Windows Minimize (or equivalent) command can be issued; otherwise, a Windows Maximize (or equivalent) command can be issued. Note: It is possible to set different bounds (of time and speed) on each of the Yaw motions. These bounds could be varied based on user preference or desired feel of the system (that is, a system that is very particular about how motions are performed versus being forgiving). Note: In further variations, any of the magnitude bounds could be dropped, based on the user or developer preference. Further, as mentioned previously, the period of No Motion can be introduced at the beginning in the definition of any of the user gesture. |
| Zoom Or Rotate (Simple Version) | <S * {R} {R #} S> Description of Symbolic representation: A Smile initiation followed by a FLBP, followed by a Roll Motion (in either direction), followed by combination of Roll Motion and No Motion for indefinite amount of time, and followed by termination of the Smile. Explanation & Discussion: If Smile initiation is followed by a FLBP where all motions are ignored followed by a Roll Motion. Roll motions are translated into Zoom commands and sent to the appropriate Electronic Device/ Controller/Controlling system in real time at regular intervals. The direction of the Roll Motion can be used to determine if the command being sent is Zoom in or Zoom out. (In other embodiments, Rotation command signals could be sent instead of Zoom command signalss.) This process continues until the Smile terminates. Note: As discussed before, as per user preferences and/or preference of the system designer, the length of the FLBP can be made very small or even zero. Note: FLBP could also be replaced by a VLWP such as "[~]R". Note: The Zoom command can be combined with other commands as explained below. |
| Zoom Or Rotate (Simple Version with Translation instead of Roll) | <S * {Tx} {Tx #} S> Description of Symbolic representation: A Smile initiation followed by a FLBP, followed by a Translational Motion along X axis (in either direction), followed by combination of Translational Motion in X axis and No Motion for indefinite amount of time, and followed by termination of the Smile. Explanation & Discussion: If Smile initiation is followed by a FLBP where all motions are ignored followed by a X Translation. X Translation motions are translated into Zoom command signals and sent to the appropriate Electronic Device/Controller/Controlling system in real time at regular intervals. The direction of the Translational motion can be used to determine if the command being sent is Zoom in or Zoom out. (In other embodiments, Rotation command signals could be sent instead of Zoom command signals.) This process continues until the Smile terminates. Note: As discussed before, as per user preferences and/or preference of the system designer, the length of the FLBP can be made very small or even zero. Note: FLBP could also be replaced by a VLWP such as "[~]Tx". Note: This version of the Zoom/Rotate command can also be combined with other commands as explained below. |
| Zoom/Rotate (Combined with other commands) | (1) <S * {RYP} {RYP#} S> or (2) <S * ## {RYP} {RYP#} S> or (3) <S * ### {RYP#} {RYP#} S> Description of Symbolic representations: (1) A Smile initiation followed by a FLBP, followed by a combination of Roll, Yaw and Pitch Motions, followed by another period of Roll/Pitch/Yaw/No Motion (wherein Roll is guaranteed to be present in the combination) followed by termination of the Smile. This is very similar to user gesture for Cursor/OOI |

TABLE 1-continued

An illustrative Embodiment of Gesture based User Interface
(that can be used as part of a Control System)

| Command to be Invoked (on the Controlled Electronic Device and/or Controller/ Controlling System) | User Gesture to Invoke the Command (Symbolic Representation and Explanation) |
|---|---|
| | motion; the difference being Roll Motion is added to the user gesture. |
| | (2) A Smile initiation followed by a FLBP, followed by period of No Motion of specified duration. This is followed by a combination of Roll, Yaw and Pitch Motions, followed by another period of Roll/Pitch/Yaw/No Motion (wherein Roll is guaranteed to be present in the combination) followed by termination of the Smile. This is very similar to user gesture for Scroll/Pan command; the difference being Roll Motion is added to the user gesture. |
| | (3) A Smile initiation followed by a FLBP, followed by period of No Motion of specified duration (different than one from #2 above). This is followed by a combination of Roll, Yaw and Pitch Motions, followed by another period of Roll/Pitch/Yaw/No Motion (wherein Roll is guaranteed to be present in the combination) followed by termination of the Smile. This is very similar to user gesture for Click & Drag command; the difference being Roll Motion is added to the user gesture. |
| | Explanation & Discussion: |
| | This is an illustration of how different commands can be combined in one user gesture. In this case, the Zoom command is combined with a Cursor/OOI move command by adding R Motion to the user gesture (as in representation #1 above), or with Window Scroll/Pan command by adding R Motion to the user gesture (as in representation #2 above), or with Click & Drag command by adding R Motion to the user gesture (as in representation #3 above). Each of these user gestures with R motions work almost exactly as their counterparts (that do not have the Roll motions) with the difference that these user gestures also cause Zoom events (or equivalent) to be sent (in accordance to the "R" motion) along with the other events (such as cursor/OOI motion, scroll/pan or click & drag events sent in the original user gestures). |
| | Note: Further variations of the embodiment can be had by substituting "R" by "Tx", "Ty" or "Tz" in these three user gestures. |
| | Note: Similar to combining Zoom functionality with other three commands mentioned here, other functionality could also be readily combined. For example, "Tx" could be included in the motion combinations to cause rotation (of the image or 3D model on the screen) about X-axis, "Ty" for rotation about Y-axis and "Tz" for rotation about the Z-axis. Such functionality can be very helpful for any applications that use 3D models or images. |
| | Note: Other embodiments can substitute {RYP} with {TxTyTz} and vice versa. |
| | Note: The FLBP ("*") and the period of No Motion ("#") are optional. As noted elsewhere, the "S" can be substituted by any other body action (that may or may not be a facial expression, in this or any other user gesture.) |
| Generic OOI Manipulation command | (1) <S * (RYPTxTyTz #} S> or |
| | (2) {RYPTxTyTz} <S * {RYPTxTyTz #} S> {RYPTxTyTz} Or |
| | (3) <M * {RYPTxTyTz #} M> Or |
| | (4) <S * {RYPTxTyTz #} S> <M * {RYPTxTyTz #} M> |
| | Description of Symbolic representations: |
| | (1) A Smile initiation followed by a FLBP. This is followed by a combination of Angular or Translational Motions/Positions of a designated body part (along any of the 3 axes), followed by termination of the Smile. |
| | (2) This representation is an expansion of variation (1) above, but with additional blocks of motion/positions performed by the user along all 3 axes before and after the part that represents variation (1). |
| | (3) An opening of mouth is initiated followed by a FLBP. This is followed by a combination of Angular or Translational Motions/Positions of a designated body part (along any of the 3 axes), followed by termination of the mouth open facial expression (that is, closing of the mouth). |
| | (4) This variation is simply a combination of variations (1) and (3) |
| | Explanation & Discussion: |
| | This user gesture is an illustration of how all different motions and positions of a designated body part or designated set of body parts can be used to manipulate an OOI and/or its view on a display screen. |

TABLE 1-continued

An illustrative Embodiment of Gesture based User Interface
(that can be used as part of a Control System)

| Command to be Invoked (on the Controlled Electronic Device and/or Controller/ Controlling System) | User Gesture to Invoke the Command (Symbolic Representation and Explanation) |
|---|---|
| | OMD Used: Head motion or position.<br>Body Action To Command Signals mapping:<br>    Roll, Yaw, Pitch motion/position of head -<br>    Commands to affect Roll, Yaw, Pitch (motion/ orientation of OOI)<br>    Translation motion/position of head along X axis -<br>    Command signals to move the OOI in X direction (of the head coordinate system)<br>    Translation motion/position of head along Y and Z axis- Command signals to translate/pan the OOI along the vertical or horizontal axis of the display screen<br>Use of the User Gesture - variation (1):<br>    After the user starts a smile, after a possibly brief FLBP, the control software start generating signals to modify the OOI as per the command mapping described above. When the user rotates the head along one of the 3 axes, the control software can generate command signals to rotate/manipulate the OOI in corresponding axes, in the virtual space. (Virtual display screen refers to situations when there is no physical display screen, but when images can be directly projected on the retina of the user's eye.) When the user starts performing translational motions in the X axis, the control system can generate command signals to translate the OOI along the X axis in virtual space (closer or farther based on the direction of the user's motion). Whereas, when the user performs translation actions in the Y or Z axes (in Head Coordinate System), the control software can generate signals to translate the OOI in the vertical and/or horizontal axes on the physical or virtual display screen. If the OOI is a 3D virtual object, this user gesture can basically manipulate the OOI in 6 degrees of freedom.<br>Use of the User Gesture - variation (2):<br>    This user gesture can represent a system when the control software is always monitoring and acting upon any motion/position variation of the user's head is detected. However, this embodiment can manipulate the actual motion/position of the OOI in the virtual or real space (based on motion/position of the user's head) only when a smile is active. On the other hand, the embodiment can manipulate only the camera/view angles when no active smile is detected.<br>Use of the User Gesture - variation (3):<br>    When a mouth open is detected to be active, the control software can change the display of the OOI on the display screen in accordance to the monitored motion/position of the users head. (This is different from variation (1) where the coordinates of the OOI can be changed in the virtual space.) This is analogous to manipulating only the view/camera angle from whose perspective the OOI is displayed on the display screen (again without actually changing the coordinates or the orientation of the OOI in the virtual space). Therefore, the X translation of user's body part can simply enlarge or reduce the size of the OOI on the display screen (similar to zoom in or out command), possibly accompanied by display of additional or lesser number of details and information about the OOI. (For example, if the OOI was a 3D solid model of a part being designed in a CAD system, when the user zooms in, that can not only show the model bigger in size, but it could also expose additional information (some of it textual), such as dimensions, material properties, tolerance information, manufacturing information, etc. In another example, if the OOI was a map being displayed on the display screen, zooming out could not only make things look smaller but also hide finer level details such as smaller streets, house numbers, |

TABLE 1-continued

An illustrative Embodiment of Gesture based User Interface
(that can be used as part of a Control System)

| Command to be Invoked (on the Controlled Electronic Device and/or Controller/ Controlling System) | User Gesture to Invoke the Command (Symbolic Representation and Explanation) |
|---|---|
| | interesting locations, etc., and zooming in would do the reverse.) Similarly, in response to Y and Z motions of the user, the control software can simply pan the camera/view angle in corresponding directions on the display screen, without actually changing the coordinates of the OOI in the virtual space. Similarly, by performing rotational motions, the camera/view angle can be changed to show the OOI in correspondingly rotated views (without changing the angular position/orientation vector of the OOI in the virtual space). In this case, it can be said that the camera/view angle (rather than the real or virtual object) is the real OOI.<br>Use of the User Gesture - variation (4):<br>This variation is simply a combination of variations (1) and (3). Therefore, the system can generate signals to modify the camera/view angles to manipulate the display of virtual objects on the display screen when open mouth facial expression is active. On the other hand, system can generate signals to modify an object in real or virtual space (by possibly changing the object of interest's coordinates or other attributes in real or virtual space) when a smile facial expression is detected to be active. If both expressions are active at the same time, the control software can generate signals to modify one or both of the OOIs (Camera/view angle and real/virtual object), possibly based on user preferences.<br>Note: The FLBP ("*") and the period of No Motion ("#") are optional. As noted elsewhere, the "S" can be substituted by any other body action (that may or may not be a facial expression, in this or any other user gesture.) |
| Initialize/Recalibrate Controller/Control System | [P2>] [<P2>] [P2>] [<P2] [~] [<Y2] [Y2>] [~}#<br>Description of Symbolic representation:<br>A sequence of TMB Down Pitch followed by Up Pitch, repeated twice, followed by a VLWP waiting for a TMB Left Yaw followed by TMB Right Yaw, followed by another VLWP waiting for a period of No Motion.<br>Explanation & Discussion:<br>The user gesture is designed to reduce risk of unintentionally triggering this command, without making it unduly hard to execute it intentionally. After the last period of this user gesture (that is the period of No Motion) the Initialize/Recalibrate command is issued to the Controller/Control System itself. This last period of No Motion is helpful to allow the user to settle down and get ready for the initialize/recalibration process since typically that requires the user to hold steady (that is have minimal motion).<br>Note: Other embodiments can replace any of the P2 or Y2 motions with P or Y respectively. Also, the VLWPs can be dropped from the user gesture in other embodiments. |

Note: The above table was just one collection of embodiments illustrating the principles of this invention. Many different other embodiments are possible using the principles above. Further, different embodiments are possible by simply substituting a PCE (Primary Control Expression) in a user gesture with another PCE or with a PCM or with combination of PCEs and PCMs. For example, one could simply substitute expression of Smile by other PCE such as Jaw drop or move side to side, Eyebrow Raise or Lowering, Puff/Suck action, Eye Squint, Eye Close, Eye Blink, Mouth Open/Close, Frowning, Pulling a corner of the lips, Puckering lips, etc. or by PCMs (Primary Control Motions) performed using other body parts such as Raising/Moving Shoulder(s), Raising Arms, Raising Hands, Waving Hands, Rotating Arms/Hands, Kicking, Punching, Moving out Elbows, Leaning/Twisting/Swaying Torso, Tilting Head up or down for a certain amount of time, etc., or their combination(s). Similarly, OOI Modification Drivers (OMDs) can also be varied to derive further variations. As an example, some user gestures can use motions of the head versus others user gestures can use motions/positions of the eyeball(s) (which can comprise eye gaze) as OMD. Motions/expressions/actions that are neither PCEs, PCMs or OMDs, can also be varied across different embodiments of the same user gesture. For example, motion type (e.g. rotation versus translation, X-axis versus Y-axis, velocity versus acceleration, velocity versus position, etc.), direction, speed, time bounds, magnitude bounds can be varied. Further, parts of any of the described or derived embodiments can be used independently and/or in combination with parts of other embodiments.

Variations are possible by inserting/prefixing a specific sequence of motions or expressions or actions called the Gesture Wakeup Sequence (GWS) at the start of some or all user gestures to help with recognition of those particular user gestures. For example, a period of No Motion (i.e. "#") can be used as a GWS and be inserted/prefixed at the start of any/all of the above user gestures. Accordingly, user gesture for Select command can be said to be changed from being "[<S>]" to "# [<S>]", user gesture for Go Forward command can be said to be changed from "[Y2>] [~] #" to "# [Y2>] [~] #", and so on. In other words, in variations that use the "#" GWS, any user gesture (including some/all of the ones defined in Table 1 above) can be recognized by the system only if they are immediately preceded by a GWS (which in this case is a POLA which happens to be a period of No Motion of a certain minimum duration). This requirement (of a user gesture being preceded by period of GWS such as No Motion) can provide the further assurance to the control system that the motion/body action pattern sensed has a high probability that it was performed intentionally by the user. Further, it can also provide a convenient method to the user of conveying their intent in achieving particular response from the system (such as generating certain signals) when a certain set of bodily actions are performed. One example of this situation is when the user is watching their computer, smart TV, smart glasses, etc. while exercising; there is a possibility that they may wince or grin while exercising leading to the system interpret that as a Smile performed by the user in order to execute a user gesture such as Select. However, if a GWS of "#" is required by the system, the user will be required to hold their head/body parts/eye gaze/head pose/etc. (i.e. whatever is the provider of the OMD) steady/within a specified range of motion or position for just a brief moment (i.e. minimum time duration) before their smile action is recognized as part of a user gesture meant to evoke a response from the system. In this fashion, requiring a GWS before the actual user gesture can thereby reduce the chance of false positives without requiring too much of effort from the user.

In another variation, the bodily actions sequence of "#[~]" can be used as a GWS. Here, an addition of a time bounded VLWP of a specified maximum length right after the period of No Motion can provide additional convenience to some users. For example, user gesture for Select command can be said to be changed from being "[<S>]" to "#[~] [<S>]". If for illustrative purposes we say that the time bound on the VLWP was 200 milliseconds, and the minimum time period for "#" was 50 milliseconds, then for the system to recognize the user gesture of "<S>", it would have to be immediately preceded by a period of No Motion of at least 50 milliseconds in duration, followed immediately by an intermediate period (i.e. the VLWP where all motions and bodily actions other than Smile are ignored) before initiation of a Smile, and wherein the duration of this intermediate period (i.e. the VLWP) is no more than 200 milliseconds. The insertion of a VLWP can help certain users to prepare for the next action in the user gestures. For example, users with Cerebral Palsy may have smiles on their faces unintentionally or as a by product of another body action that they may be trying to achieve. They may have trouble starting a smile immediately after a period of No Motion. Having a "#" as well as a VLWP in the GWS can help them with conveying intention as well as convenience in performance of user gestures that have actions such as smiling.

In another variation, the motion sequence "[P2>] [~]#" can be used as the GWS; in this case, the complete user gesture for Select command can be said to be changed from being "[<S>]" to "[P2>] [~]# [<S>]", user gesture for Go Forward can be changed from "[Y2>] [~] #" to "[P2>] [~]# [Y2>] [~]#", and so on. As seen above, a GWS can be very short and simple or be longer and more elaborate. Different types of GWSs can be used for different user gestures and can be required to be performed or not, based on user preference and various modes or states of the system. The use of GWS can help with reducing the chance of unintentionally performed motions from being interpreted as deliberately performed user gestures.

Note that some variations can require GWS for any or all user gestures, whereas other variations can require GWSs for only select few user gestures. Further, different GWSs can be required for different user gestures and multiple GWS's can be used for the same user gesture(s) as well. GWSs can be temporarily enabled or disabled automatically by the system, or based on user request. For example, when the system senses certain patterns of ambient motions and positions (say when the user is running or exercising, in an inclined posture on an exercise bike, on a stepping or elliptical machine, skiing or biking outdoors while wearing an electronic device such as smart glasses, smart helmet, etc.), the system can automatically activate the requirement of having GWS be performed before some or all user gestures. Conversely, when the user motions seem to have subsided, the system can automatically disable the requirement of GWS. The user can also explicitly invoke an "Exercise Mode" (i.e. turn on or off the requirement of GWS) before/after undertaking certain activities.

In other embodiments, concept of Session Wakeup Sequence (SWS) can be used. SWS is a mechanism (a motion/expression sequence, physical or virtual input mechanism) that can be used to kick off a Signal Generation Session (SGS) which is a time period when the system can generate signals in response to recognized user gestures. In other words, SWS can be used as an activation "switch" for activating the generation of control signals (in response to performance of user gestures). This SGS (started by the control system after the occurrence of a SWS) can be of fixed duration or a variable duration in length. For example, a fixed length SGS can last for 30 seconds after a SWS (wherein control signals are generated in response to gestures started by the user within those 30 seconds); and no control signals are generated after the expiration last user gesture that was started within those 30 seconds. However, in another example, if a SWS can be specified to start control signal generation session of variable length and different rules can be used to specify the end of the SGS. In one variation, once started, the SGS can continue to extend a designated amount of time period (say 10 seconds in this example) beyond the completion of the last user gesture started within the SGS. This can allow the SGS to last indefinitely (beyond the first 30 seconds) as long as some user gesture is started within the 10 seconds from the end of a previous user gesture that was part of the SGS. If the SGS has lasted for at least the initial duration of 30 seconds, and no new user gestures were performed within 10 seconds from the end of the last user gesture that was part of the SGS, the SGS comes to an end. (After the end of an SGS, control signals will not be generated even if user performs valid user gestures until the point another SWS is performed.) It will be obvious to persons skilled in the art that the lengths of time and the rules for definition of the duration of a SGS can be easily changed to different amounts and different logic/rules could be used to extend the duration of a SGS (or to terminate a SGS). In some embodiments, SWS can be a specified sequence of motions or expressions; for example, "[<P2]", "#[<P2][~}#[<S>][~}#", etc. In other embodiments users can trigger a SWS or even a GWS, using a physical/virtual input mechanism rather than using bodily motions or expressions. For example, the user could use an input mechanism (or combination of input mechanisms) including a push button, a key on the keyboard, a touch activated switch, a voice command, a foot pedal, a sip-and-puff switch, a brain-wave/ECG based switching mechanism, EMG based switch, etc., or even click/select an icon/graphical image on the display of the control system/control system/controlled device or use other virtual or programmatic mechanisms to start generation of command signals instead of using a gesture based SWS or GWS.

Different embodiments are also possible by using the current position of the head/body part being tracked or of the controller with respect to the HCS instead of using the current speed/velocity (of the head/body part/controller). For example, in case of the Cursor/OOI Motion user gesture, instead of using the current Pitch (angular) speed to drive the motion of the cursor (in Y direction of the display screen), the current (angular) position along the Pitch axis (Z-axis) could be used instead. This substitution could be done based on motion type or user gesture or any combination of motion type and user gesture or for all motion types and user gestures. Therefore, in this example, the Y position of the cursor/OOI could be driven by the angular position about the Z-axis (in the Head Coordinate System) but the X position of OOI could be driven by the angular speed about the Y-axis. Thus, one can create a multitude of embodiments by mixing and matching the use of speed versus positions in any or all user gestures and for any or all motion types. It will also be obvious to people skilled in the art that, for purposes of monitoring motions which are neither PCM or OMD, (such as the ones used in non-OOI motion commands Go Back, Go Forward, Window Max/Min, and others), the same approach of using position instead of speed in definition and recognition of gestures can be taken.

Note that the recognition of a user gesture and generation of commands/events/signals corresponding to a recognized user gesture can be done in two or more separate processes or processors. For example, when a user performs the "Cancel" user gesture, one part of the control system can recognize that user gesture and map it to the Cancel user gesture, however, rather than generating a "Cancel" event right away, it can pass information about the recognized user gesture to a process running on another part of the control system or the controlled device itself to process the information and generate appropriate control signals at the right time. For example, if the controller was a head based controller and the controlled device was a computer, the controller would send a signal to the computer to indicate that a Cancel gesture was recognized, and then the computer (or its operating system or a program/process running on the operating system), based on which window was active would interpret/convert that signal into either a "Cancel" button press event (if for example the current window had a "Cancel" button) or an "Undo" command (if for example the current window was a word processing/spreadsheet application).

Concept of Modes—Various user gestures in a gesture based user interface can be interpreted differently based on concept of Mode. A Mode is the state that a controller/controlling system or the controlled electronic device at a given instant of time. Mode determines how the controller/controlling system will interpret a particular user action or a user gesture. In other words, the same user action/gesture can be interpreted and translated (into command signals for a controlled electronic device) differently based on what Mode the controller/controlling system/controlled device is in at the time when the user gesture is performed. It is not required that a Mode be applicable to (that is, change interpretation of) all user gestures; a Mode can be defined to change the interpretation/translation of only specific set of user gestures.

Note: When no mode has been previously activated by the user, the system is said to be in Normal Mode. The embodiment in Table 1 can be said to show the user gestures and their interpretations in the Normal Mode for that embodiment.

A Mode can be initiated by either using an input mechanism (such as button press, configuration setting, touch, etc.) on the controller or the controlling system, or via a user gesture specifically designed to start/trigger a Mode. These input mechanisms or the user gestures that initiate a Mode are called the Mode Start Triggers for that Mode. Once initiated, certain user gestures (as specified in the definition of that particular Mode) can be interpreted/translated differently until the point in time when the Mode is terminated. A Mode can be terminated by an input mechanism or a user gesture designed to terminate the Mode or by starting a user gesture that is specified to end a particular existing Mode as well as possibly performing additional actions. These input mechanisms and user gestures that terminate a Mode are called Mode End Triggers. Note that every Mode is required to have at least one start and end trigger. It is also possible to have the same user gesture be specified as the start as well as the end trigger.

Following is an illustrative example of a Mode. The example builds on the embodiment user interface detailed in the Table 1. This Mode is called Easy Motion Mode.

Easy Motion mode can allow user to move the cursor/OOI without requiring the user to Smile (which part of the user gesture for cursor/OOI movement as in Table 1). The user can initiate the Easy Motion Mode when he/she wants to move the cursor/OOI continuously for a long time. Easy Motion Mode provides additional user convenience in such situations. Please see the following for definition of the Easy Motion Mode.

TABLE 2

Illustration of Easy Motion Mode - First Embodiment

| Easy Motion Mode | |
|---|---|
| Purpose | Allow user to move cursor/OOI without having to use Smile or any other facial expression continuously. This can allow for additional ease of use in certain user scenarios. |
| Possible Start Triggers | user gesture: [P2>] [~] [<S>]<br>TMB Down Pitch followed by a time bound VLWP waiting for a TMB Smile, followed by a TMB Smile.<br>2. Input Mechanism:<br>A physical or virtual input mechanism (such as a button, icon, switch, slider, etc.) on the controller or the controlling system can be used.<br>Voice based command could also be used as a start trigger. |

TABLE 2-continued

Illustration of Easy Motion Mode - First Embodiment

Easy Motion Mode

|  |  |
|---|---|
|  | 3. Extraneous Motions: Hand Wave<br>Assuming that motion of hands are not being tracked by the controller/controller system to be part of a user gesture, extraneous motions such as a Wave of a hand could be used as a Start trigger. (Other body action involving hands, arms, legs, torso, or tensing certain muscles, performing mental activity, etc. can also be used as start triggers.)<br>Note: Any combination of the above triggers can be used to create further variations of the embodiment. |
| User gestures Affected | <S * {YPR} {YPR#} S><br>This user gesture causes Cursor/OOI motion in Normal mode. However, when Easy Motion Mode is active, this user gesture does the opposite; it stops Cursor/OOI motion when the user starts this user gesture (right after the "<S"). Further, no Zoom (or Rotate or equivalent) command signals are generated.<br>2. {YPR}<br>When Easy Motion Mode is in effect, the user gesture for Cursor/OOI motion will simply be "{YPR}". This means that once the Easy Motion Mode is started, the cursor can move in accordance to the Yaw and/or Pitch motion (without need to hold the Smile) and the display in the active Window can Zoom in accordance with the Roll motion.<br>3. <S * ## {YPR#} S><br>The systems stops cursor movement right after "<S". After the "<S * ##" part of the user gesture is completed, the system starts rotating the image or 3D model or any selected object/OOI in the window/on screen along the X, Y and Z axes in accordance to R, Y, P motions respectively. (Note that in Normal Mode, this user gesture may have caused a Windows Scroll/Pan or Click and Drag based on the length of the "No Motion" period.) Such functionality can be very helpful for any applications that use 3D models or images or objects.<br>Note: Any combination of the above gestures can be used to create further variations of the embodiment. |
| Possible End Triggers | User gesture: [P2>] [~] [<S>]<br>TMB Down Pitch followed by a time bound VLWP waiting for a TMB Smile.<br>2. Input Mechanism:<br>A physical or virtual input mechanism (such as a button, icon, switch, slider, etc.) on the controller or the controlling system.<br>3. user gesture: <S * [~] [P2>] ~ S><br>A Smile followed by a FLBP, followed by a VLWP waiting for a TMB Down Pitch. The TMB Down Pitch then is followed by VLWP (without any time bound) waiting for end of Smile to terminate the Easy Motion Mode.<br>Note: It is desirable, though not necessary, for the specified maximum total time duration allowed between start of Smile to start of the TMB Down Pitch in this user gesture to be less than or equal to the specified maximum total time duration allowed between start of Smile to start of Yaw/Pitch in user gestures for Scroll/Pan and Click & Drag. This allows for easier distinction of this user gesture.<br>Note: Any combination of the above triggers can be used to create further variations of the embodiment |

TABLE 3

Illustration of Easy Motion Mode - Second Embodiment

Easy Motion Mode

|  |  |
|---|---|
| Purpose | Allow user to move cursor/OOI without having to use Smile expression continuously. This can allow for additional ease of use in certain user scenarios. |
| Possible Start Trigger(s) | User gesture: [P2>] [~] [<S>]<br>TMB Down Pitch followed by a time bound VLWP waiting for a TMB Smile. Easy Motion Mode is started at the end of the TMB Smile.<br>2. Input Mechanism:<br>A physical or virtual input mechanism (such as a button, icon, switch, slider, etc.) on the controller or the controlling system can be used to start this mode. Voice based command input can also be used as a start trigger.<br>3. Extraneous Motions: Hand Wave<br>Assuming that motion of hands are not being tracked by the controller/controller system to be part of a user gesture, extraneous motions such |

TABLE 3-continued

Illustration of Easy Motion Mode - Second Embodiment

Easy Motion Mode

| | |
|---|---|
| | as a Wave of a hand could be used as a Start trigger. (Other body gestures involving hands, arms, legs, torso, etc. can also be used as Start triggers.)<br>Note: Any combination of the above triggers can be used to create further variations of the embodiment. |
| Commands (user gestures) Affected | {YPR}<br>When Easy Motion Mode is in effect, the user gesture for Cursor/OOI motion combined with Zoom will simply be "{YPR}". This means that once the Easy Motion Mode is started, the cursor will move in accordance to the Yaw and/or Pitch motion. (Note that without the Easy Motion Mode, the user gesture for this command is "<S * {YPR} {YPR#} S>" as in Table 1.)<br>Note: In this embodiment, none of the other commands that begin with "<S" are not listed as affected. That allows user gestures for commands such as Click/Select, Scroll/Pan, Click and Drag to remain the same, thereby alleviating the need for the user to remember the modified user gesture for those commands in Easy Motion Mode. Further, the original user gesture for cursor/OOI motion is not listed here either; it is listed under End Triggers instead.<br>Note: Other gestures could be added to this list to create further variations of the embodiment. |
| Possible End Trigger(s) | User gesture: [P2>] [~] [<S>]<br>TMB Down Pitch followed by a time bound VLWP waiting for a TMB Smile.<br>2. Input Mechanism:<br>A physical or virtual input mechanism (such as a button, icon, switch, slider, etc.) on the controller or the controlling system.<br>3. user gesture: <S * {YPR} {YPR#} S><br>This user gesture causes Cursor/OOI motion combined with Zoom in Normal mode. In this embodiment, when Easy Motion Mode is active, this user gesture still works the way it works in the Normal mode (i.e. causes cursor/OOI motion in accordance to Y & P motions and Zoom according to R motions), however, with the difference that at the end of this user gesture, it also terminates the Easy Motion Mode. This allows the user to terminate the Easy Motion Mode while leaving the cursor/OOI precisely at the desired location.<br>Note: Any combination of the above triggers can be used to create further variations of the embodiment. |

Note: Ease of use can also be enhanced by providing some clues to the user regarding progress of the periods of No Motion via any output mechanism available. For example, an audio signal can be sounded after reaching the end of each period of No Motion. E.g. for a user gesture containing "###" an audio signal could be sounded not only at the end of the "###" period but also at the end of "##" period. Visual clues such as progress meters, changing colors, graphical animations can also be used. Tactile feedback and other mechanisms can also be employed.

Modes can also be defined such that the same user gesture may result in different commands based on what mode the system is in. For example, the user gesture for cursor motion in Normal Mode can lead to panning of the view in a 3D Modeling mode; a click and drag user gesture from Normal Mode can be made to cause rotations in 3D Modeling mode; the zoom gesture from Normal Mode can be made to cause the camera position in relation to the 3D model and so on.

Some embodiments can define user gestures that do not rely on any PCEs for purpose of performing user gestures. For example, a head or a hand worn device can allow the user to perform user gestures without use of any facial expression. Some embodiments can use certain head motions/positions (including tilting/pitching of the head up or down, rolling the head, yaw rotation left/right or any combination), actions involving input mechanisms (such as touching, tapping, touching and holding on a touch sensitive surface on the controller or controlled device or any other suitable device, pressing a button or a switch, etc.), touching/pressing a touch and/or pressure sensitive surface, voice based commands, or a combination of such user actions as user gestures specified to start generating command signals for OOI modification/motion, selection, scroll or pan, navigation, etc. In such embodiments, operations that can continue over a period of time (such as those involving OOI motion, Click and Drag, Scroll/Pan, etc.) can be terminated based on occurrence of POLAs (such as period of No Motion) or any specified user gesture. Some head worn devices can also use concept of Modes described above for purpose of control (of themselves or acting as controllers of other devices).

Some embodiments can use specified combination of actions as the starting trigger for starting OOI Motion (or OOI Attribute Modification) instead of a PCE or PCM. For example, they can use combination of head nod (up/down), head shake (side to side), rotation, roll or tilt in specified direction(s), possibly within specified limits of magnitude and possibly to be performed within certain limits of time, as triggers to be used to start modification of an OOI. Following Table 4, is an illustration of some combinations possible using Pitch head motion (nod) as the primarily ingredient for the trigger. (Note that Pitch action can be substituted by other actions.)

TABLE 4

Exemplary Embodiments of Start Trigger (that can be used to start generation of OOI Attribute Modification signals)

| # | Trigger Action that can start generation of Signals such as OOI Modification Signals | Description |
|---|---|---|
| 1 | <P | A pitch motion of the head upwards. This can also be described as a tilting the head up. |
| 2 | <P> | An upward pitch followed by a downward pitch. This can also be described as an up and down head nod. |
| 3 | <P2> | A upward pitch followed by a downward pitch, both of whom fall within specified magnitude bounds. |
| 4 | [<P2>] | A upward pitch followed by a downward pitch, both of whom fall within specified magnitude bounds and the whole action is performed within specified time bounds. |
| 5 | {#}[<P2>] | Same as (4) above, but wherein the pitch motion is also immediately preceded by a period of No Motion, possibly of a specified minimal length. |
| 6 | {#}[<P2>]{#} | Same as (5) above, but wherein the pitch motions are also followed by a period of No Motion, possibly of specified minimum length. |
| 7 | {#}[<P2>][~][#] | Same as (5) above, but wherein the pitch motions are also followed by a variable length waiting period (with a specified limit on its maximum duration) followed by a period of No Motion which possibly has a specified minimum length and/or maximum length. |

As mentioned before, the "P" motion can be substituted by Y or R, or can be replaced by any combination of P, Y and R motions. Further the head motions can be replaced by motions of any other body part, including but not limited to hand/arm motions and eye motions/eye gaze. The "P" action can even be substituted by an audio signal such as the user making a sound of increasing or decreasing frequency or even simply issuing a vocal command such as by saying "Move Object". As mentioned above, triggers can be made of combination of actions in any of the 3 axes (translational or rotational) rather than just P motion/position. In some embodiments, for example, the user may be required to trace a specified shape by using head motion. For example, the user may require to move their head so that their nose roughly follows a circular, square, rectangular, elliptical, triangular, heart shaped, or linear trajectory (or some combination), possibly within specified bounds of time. Trajectories can be of any shape and size and can be open or closed (loop). In variations, as long as the user starts (a set of body actions) and reaches back to the same approximate position and/or orientation (upon completing the body actions), possibly within specified (minimum and/or maximum) time bound, that can be considered to be a trigger. A trajectory started or performed in a clockwise motion can be considered to be different from one started or performed in an anti-clockwise direction, even though the shapes of the trajectories may be the same. (Thereby every shape can lead to at least two different types of triggers, used for different purposes.)

Similar to variation (7) in Table 4 (where the user's head/nose can come back to roughly the same position at the end of the trigger compared to at the start of the trigger), one trigger action can be where the user is instructed to move their head in space such that their nose follows a trajectory that can trace a closed loop (within a specified tolerance zone) such that the entire motion is possibly finished in specified amount of minimum and maximum time limits, wherein the magnitude of head motion can also be within specified amount of magnitude bounds, and the head motion can be immediately preceded by a period of No Motion with specified time bound, and can be followed by a variable length waiting period (VLWP) with a time bound, wherein the VLWP can be terminated upon a period of No Motion (possibly of a specified minimum and/or maximum duration). To an external observer, the user may seem to be performing a loop motion with their face/head followed by additional motion of the head to get ready to begin OOI motion/modification with their head.

OOI Modification/Motion initiated without use of PCE/PCM can be also terminated by other specified actions that may not involve PCE/PCM; such actions can include POLAs including dwelling action possibly performed for specified minimum duration of time. As an example, following table (Table 5) illustrates an embodiment where some of the commands are invoked without use of PCE or PCM.

TABLE 5

An illustrative embodiment of gestures based User Interface that can be implemented without the use of a PCE or PCM.

| Command to be Invoked (on the Controlled Electronic Device and/or Controller/Controlling System) | User Gesture to Invoke the Command (Symbolic Representation and Explanation) |
|---|---|
| Modify an OOI (Object of Interest) | {#}[<P2>][~]{YP}# The initial action sequence of "{#}[<P2>][~][#]" can be considered as a start trigger. OOI modification signals can be |

TABLE 5-continued

An illustrative embodiment of gestures based User Interface
that can be implemented without the use of a PCE or PCM.

| Command to be Invoked (on the Controlled Electronic Device and/or Controller/Controlling System) | User Gesture to Invoke the Command (Symbolic Representation and Explanation) |
| --- | --- |
| | generated in accordance to the "{YP}" motion/actions, wherein the generation is stopped when a period of No Motion "#" (possibly of minimum specified length) is encountered. Further variations of this gesture can be as below, where a Roll motion can serve as a start as well as end trigger. (Using Roll motion can be advantageous in some situations as those motions/positions are orthogonal to and distinct from Pitch and Yaw, which can be more intuitive to some users as OMD actions.)<br>{#}[R]{YP}[R] or<br>{#}[R][#]{YP}[R]<br>In the last variation, note the [#] inserted after the first [R] in order to ascertain the user holds their position right after the first [R] for at least a certain minimum amount of time. (Note that in this case the trigger action consists of motion R which is orthogonal to motions Y & P that affect the attributes of the OOI.) Similarly, a "#" could be added right after the second [R]. This variation can also be made more specific by specifying direction of R, for example as follows-<br>{#}[<R][#]{YP}[R>] or<br>{#}[R>][#]{YP}[R>] or<br>{#}[R>][#]{YP}[<R] |
| Left Click/Select/Tap (on a touch surface) | [>P<] or<br>[P>]<br>The first variation can be viewed as opposite to the "<P>" used as the start of OOI Motion trigger.<br>The second variation is a simplified version of the first version and requires just a Down Pitch action.<br>A requirement for a period of No Motion "#" (of minimum specified length) can be added to the beginning of each of the user gesture definitions above.<br>Note: Some embodiments can generate a designated key/button press/release, touch start/end signals instead of mouse button press/release signal(s). |
| Right Click Or Long Press | Y> [>P<] or<br>[Y>] [>P<] or<br>Y> [P>]<br>First variation can require a right yaw motion followed by a Down and Up Pitch motion/action. The Pitch action can have time and magnitude bounds. The Right Click, Long Press (or equivalent) signals can be generated at the end of the Pitch.<br>The second variation is similar to the first one, with the difference that the first action (Yaw) can be required to have time and/or magnitude bounds.<br>The third variation is a simplified version when a Right Yaw action is followed by a Down Pitch action, where in the Pitch motion can have time and magnitude bounds. |
| Click and Hold/ Left Mouse Button Press and Hold | <Y [>P<] or<br>[<Y][>P<]<br>The first variation shows a Left Yaw action/motion followed by a time and magnitude bounded sequence of Down Pitch followed by an Up Pitch. (When the actions are performed with the head, this can look like a left yaw motion of the head followed by a TMB downward nod of the head.) The Left Mouse Press signal (or equivalent) can be generated at the end of the Pitch action.<br>The second variation is similar to the first variation with the difference that the first action (left Yaw) also can have a time and/or magnitude bound.<br>Y, P, R actions following either of the above variations can be interpreted as OOI modification actions, possibly terminated by an ODE such as a POLA, at which point additional signal (such as a mouse button release) can be generated to match the button press signal. E.g. In the below gesture,<br>[<Y][>P<] {YPR} {#}<br>the release signals can be generated when the {#} POLA is detected, probably right after it attains the minimum required time duration. |
| Swipe Left | [<Y>] or<br>[<Y] Y><br>Both variations above show a Left Yaw followed by a Right Yaw action. The Swipe Left signal is generated after the Right |

TABLE 5-continued

An illustrative embodiment of gestures based User Interface
that can be implemented without the use of a PCE or PCM.

| Command to be Invoked (on the Controlled Electronic Device and/or Controller/Controlling System) | User Gesture to Invoke the Command (Symbolic Representation and Explanation) |
| --- | --- |
| | Yaw action is complete. The Right Yaw action in the second variation can impose a minimal bound on the time duration of the Right Yaw action, and the swipe signal can be generated right after that minimal time duration condition is satisfied (rather than waiting for the Right Yaw motion/action to complete). |
| Swipe Right | [>Y<] or<br>[Y>] <Y<br>These user gestures are similar to the Swipe Left user gesture with the difference that Left Yaw is substituted by Right Yaw and vice a versa. |
| Scroll/Pan | <R [#] {YP}# or<br>{#}<R> [#] {YP}# or<br>[<R>] [#] {YP}# or<br>#[<R>] [#] {YP}#<br>The above variations show some roll motion (with or without time and magnitude bounds, possibly sandwiched in between periods of No Motion (with or without time bounds) followed by Yaw and Pitch motions, terminated by period of No Motion, where in the scrolling/panning command signals are generated in accordance to the direction and/or magnitude of the Yaw and Pitch motions. The generation of the signals can end as soon as a period of No Motion of minimum specified duration is encountered ("#"). |

Note: Actions such as [<P>] can look like a regular up and down head nod to a casual observer; however, it is not because they have to be completed in precise time and magnitude bounds, thereby raising the awareness of the user while performing them and thereby bringing in a high degree of user intent. This awareness and communication of user intent can be further enhanced by adding a requirement of a POLA (such as "#") before or after such actions.

Note: In the above table as well as any other variations of user gestures (anywhere else in this or referenced documents) where two orthogonal motions follow each other, periods of No Motion, POLAs or FLBPs or VLWP can be inserted between them for user convenience. E.g., "[<Y] [>P<]" can be substituted by "[<Y]{#}[>P<]" or "[<Y][#] [>P<]" or "[<Y]{~}[>P<]", or "[<Y][~][>P<]", and so on. Further, such insertions can be made in specification of any user gestures where the prescribed trajectory of body motion comprises roughly linear segments of motion following each other, wherein the insertions can be made between any two consecutive linear segments, regardless of the angle between them. Therefore, for example, the action sequence "P>Y>" can be replaced by "P>[#] Y>" or "P>[~] Y>" and so on, but even "P> P>" can be replaced by "P>[#] P>" or "P>[~] P>", and so on. This principle can be further applied to non-linear segments of motions in a user gesture. For example, if a user gestures includes of a motion in the shape of an arc (or any non-linear shape), followed by motion in shape of another arc (or any other non-linear shape), then a "#", "~" and/or "*" can be introduced between them (possibly with specified minimum and/or maximum time limits). These introductions can not only make it easier for the user to perform those motion/position actions, but can also help with ascertaining user intent (intentionality of the user) behind those actions.

TABLE 6

An embodiment of a User Interface using User Gestures
with prominence of Roll Motion/Position actions.

| Command to be Invoked | User Gesture to Invoke the Command |
| --- | --- |
| Move/Modify an OOI (Object of Interest) | {#}[<R][~][#]{YP}#<br>The start trigger is performance of a roll motion to the left, preceded by an optional period of No Motion and followed by a VLWP that looks for another period of No Motion. The {YP} motions after that are used for generation of the OOI modification signals, which can end upon encountering a POLA such as a period of No Motion.<br>{#}[<R][#]*{YP}#<br>In this variation, the bounded VLWP is replaced by a FLBP. Here the user can be required to hold their position steady (to perform the [#]) right after the Roll motion to confirm the OOI Modification start trigger, then given some time (via the * FLBP) to get into a position to start modifying the OOI in accordance to the {YP} motion. The signal generation for OOI modification continues until when the YP motions are brought to be within specified limits for at least a minimum amount of specified time. |

TABLE 6-continued

An embodiment of a User Interface using User Gestures
with prominence of Roll Motion/Position actions.

| Command to be Invoked | User Gesture to Invoke the Command |
|---|---|
| | {#}[<R>][<R>][#]*{YP}#<br>In this variation, the system requires an additional [<R>] action in the start trigger. This can help with confirmation of user intent. (This approach of requiring additional actions can be used in any user gestures.)<br><P {YP}<br>or<br>{#}<P {YP}{#}<br>The last two variations above are simpler versions of the previous variations, with optional periods of No Motion, possibly with specified minimum and maximum time duration requirements. |
| Scroll/Pan | {#}[R>][~][#]{YP}# or<br>[#][R>][#]*{YP}#<br>This gesture is very similar to the ones for OOI Motion/Modification, with the exception of the direction of the Roll Motion (right versus left). The right roll can be used to move contents of a window (on the display of the controlled electronic device) as opposed to a mouse cursor/pointer or other graphical icon or input mechanism. The window in focus performs a scroll action in accordance to the {YP} motion until a POLA is encountered.<br>Note: These variations can be simplified similar to the simplification of the variations for OOI Modification gesture. |
| Click and Drag | {#}[<R][~][##]{YP}#<br>{#}[<R][##]*{YP}#<br>{#}[<R>][<R][##]*{YP}#<br>These variations are very similar to the OOI Motion gestures described above with the difference that the second period of No Motion is longer. This is indicated by "[##]" with two dots (versus only one dot in "[#]"). Here, the user can be required to hold steady for a longer period to indicate they want to cause a Left Mouse Button Press signal (or a touch and hold signal on a touch sensitive surface or any other equivalent signal) to be generated upon performance of the [##]. The following {YP} then can generated OOI motion/modification signals until the ODE "#" (period of No Motion) is encountered, when a Left Mouse Button Release signal (or signal signifying termination of touch of a touch/pressure sensitive surface or equivalent signal) is generated, in effect bringing the Click and Drag command to an end.<br>Note that if the user does not perform the {YP} action, but performs a "#" (i.e. period of No Motion) instead, then that is still treated as a "Click and Drag" operation where the button press and release signals are generated without any motion between the two. This in effect can be treated as a Click command.<br>Note: The above gesture definitions can be used for generating signals using the Right Mouse Button on a computer mouse (or equivalent) by substituting a "[R>]" for a "[<R>]". |
| Click/Select | {#}[<R][~][###]<br>{#}[<R][###]<br>{#}[<R>][<R][###]<br>A Selection signal can be generated at the end of the [###] action. A Left Mouse Button click can be generated based on use of [<R] in the above gesture and a Right Mouse Button click can be generated for the variations below.<br>{#}[R>][~][###]<br>{#}[R>][###]<br>{#}[<R>][R>][###]<br>It will be obvious that the [<R] can be used for Right Click and [R>] can be used for Left Click instead. |
| Swipe Left | [#][<Y2] or<br>[#][P>][<Y]<br>The first variation shows an optional period of No Motion followed by a left time bounded yaw with possibly magnitude bound(s) as well. The Left Swipe command signal can be generated at the end of the gestures. In some controllers, a Click and Drag command with motion to the left side can also generate a Left Swipe signal.<br>Note that the above variations can also use [<Y>] instead of [<Y], or [<Y2>] instead of [<Y2].<br>The second variation requires and additional down pitch. Additions like these (especially motions in an axis different from the axis of the main motion) can be useful in ascertaining user intent and weeding out gestures performed unintentionally by the user. It can also increase the efficacy of the gesture detection algorithms, both in terms of CPU performance as well as lowering of false positives and/or false negatives. Note that the added orthogonal action can require different time and magnitude bounds to make it easier to perform in relation to the original user gesture. For example, a wider time duration range may be specified to complete the additional action as well as a wider range of magnitudes of motion may be allowable. |

TABLE 6-continued

An embodiment of a User Interface using User Gestures
with prominence of Roll Motion/Position actions.

| Command to be Invoked | User Gesture to Invoke the Command |
|---|---|
| | Therefore, as per the second variation above, the user can be required to gently rotate the head in generally the downward direction (down pitch) before flicking it side ways to the left (left yaw). Given that human beings generally do not move their heads abruptly in orthogonal directions, use of consecutive orthogonal motions can be very helpful in communicating and detecting user intention. Generally speaking, it could be said that when user gestures are designed to start with actions in orthogonal axes, that can lead to easier ascertainment of intentionality behind those user actions. This can be especially true when at least one of those consecutive actions in orthogonal directions have requirements around time and magnitude bounds.<br>Right swipe can be had by substituting [<Y] by [Y>], [<Y>] by [>Y<], [<Y2] by [Y2>], and [<Y2>] by [>Y2<]. |
| Swipe Right | [#][Y2>] or<br>[#][P>][Y>]<br>The first variation shows optional period of No Motion followed by a left time bounded yaw with possibly a magnitude bound as well. The Right Swipe command signal can be generated at the end of the gestures. In some controllers, a Click and Drag command with motion to the right side can also generate a Right Swipe signal.<br>Note that the above variations can also use [>Y<] instead of [Y>], or [>Y2<] instead of [Y2>].<br>The second variation requires and additional down pitch. Additions like these (especially motions in an axis different from the axis of the main motion) can be useful in ascertaining user intent and weeding out gestures performed unintentionally by the user. |
| Page Down | [#][P2>] or<br>[#][Y>][P2>]<br>The first variation can require a time bound and magnitude bound down pitch, possibly preceded by an optional POLA such as a period of No Motion. The Page Down signal can be generated when the [P2>] action is detected.<br>The second variation inserts an additional motion ([Y>]) which is in an orthogonal direction to the main defining motion of the gesture that happens along the P axis. The Page Down signal can be generated when the [P2>] action is detected.<br>Note that the above variations can also use [>P2<] instead of [P2>]. |
| Page Up | [#][<P2] or<br>[#][Y>][<P2]<br>The first variation can require a time bound and magnitude bound down pitch, possibly preceded by an optional POLA such as a period of No Motion. The Page Down signal can be generated when the [<P2] action is detected.<br>The second variation inserts an additional motion ([Y>]) which is in an orthogonal direction to the main defining motion of the gesture that happens along the P axis. The Page Down signal can be generated when the [<P2] action is detected.<br>Note that the above variations can also use [<P2>] instead of [<P2]. |
| Zoom In or Out | [P>]{R}#<br>A down pitch (possibly time as well as magnitude bound) followed by a Roll motion causes zoom in or out command. The command signals can be generated continuously in accordance to direction and/or magnitude of R motion. The generation of signals can be ended upon a POLA such as period of No Motion. Note that [P>] can be substituted by a [<P] or even a [<Y] or [Y>]. |

Note: The User Gestures in Table 6 can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers, where the pointing is often done by Yaw and Pitch actions and the wearable device may not be able to sense facial expressions.

TABLE 7

An embodiment of a User Interface using User Gestures that can be used
with Smart Glasses and other Head Worn Devices (including but not limited to Head/Ear
Phones, Ear Buds, Eye Wear, Augmented Reality or Virtual Reality Devices), as
well as other Wearables (such as wrist bands) as well as Hand Held controllers.

| Command to be Invoked | User Gesture to Invoke the Command (and Explanation) |
|---|---|
| Move/Modify an OOI (Object of Interest) | {#}[<R]*{YP}#<br>The "{#}[<R]" action sequence is used as a start trigger. The start trigger here constitutes a Left Roll motion (with time and magnitude bounds) which is preceded by an optional period of No Motion of at least a specified minimum length. Once the complete start trigger is performed, the control system can ignore all motions for the duration of the following FLBP ("*"). The subsequent {YP} motions can be used to generate signals to modify the current OOI. This generation of signals can end when a POLA is encountered, which in this case is a period of No Motion of a minimum specified duration.<br>{#}[<R][~][#]{YP}#<br>In this variation, the FLBP of the first variation is replaced by a bounded VLWP that looks (waits) for "[#]" (that is a period of No Motion with a lower as well as upper bound on its duration) to occur. The use of VLWP therefore gives user some limited time to settle down after performing the Roll motion before starting to generate the signals to modify the OOI in accordance to the "{YP}" motions, until a POLA ("#") is encountered.<br>{#}[<R>][<R]*{YP}#<br>This is a variation of the first variation above. In this variation, the system requires an additional [<R>] action in the start trigger. This additional requirement can further help with confirmation of user intent and reduce false positives when recognizing gestures. (This approach of requiring additional actions can be used with any user gestures.)<br>Some embodiments can do away with the "{#}" at the beginning of the user gesture variations above. |
| Scroll or Pan | {#}[R>]*{YP}# or<br>{#}[R>][~][#]{YP}# or<br>{#}[>R<][R>]*{YP}#<br>These variations are the same as the variations described for Move/Modify OOI command above, with the difference that the Left Roll action is replaced by the Right Roll action and vice versa, and Scroll or Pan command signals are generated in accordance to the {YP} motions.<br>Some embodiments can do away with the "{#}" at the beginning of the user gesture variations above. |
| Zoom or Rotate | {#}[R>]*[##]{YP}# or<br>{#}[R>][~][##]{YP}# or<br>{#}[>R<][R>]*[##]{YP}{#}<br>These variations are similar to variations for Scroll and Pan above but with the some differences. In the first variation, there is a period of No Motion at the end of the FLBP (that is a "*"). In the second variation, the period of No Motion has a minimum time bound which is higher in value than the one used for Scroll/Pan. For the third variation, there is a period of No Motion after the FLBP. Zoom in or out command signals can be generated in accordance to the Pitch motions/actions, wherein for example, Up Pitch actions can result in zooming out and Down Pitch can result in zooming in. Similarly, Rotate Left (anticlockwise) or Right (clockwise) commands signals be generated based on Yaw Left or Yaw Right actions. Note that the magnitude of the generated Pitch or Rotate command can be based on the magnitude of the Pitch or Yaw actions and/or the amount of time the Pitch or Yaw action is performed. The signals can stop being generated when the last period of No Motion ("#") is performed.<br>Some embodiments can restrict the user command to be only a Zoom or a Rotate based on some criterion evaluated at the beginning of the "{YP}" action and locking the subsequent generation of commands to be either Yaw or Pitch to be based on that criterion. For example, if the Yaw action's absolute magnitude was larger than the absolute magnitude of Pitch at the beginning of the "{YP}" part of the user gesture, then the system can ignore the Pitch actions for the remainder of the user gesture, and in effect treating that user gesture as a Rotate user gesture.<br>It will be obvious to persons knowledgeable in the art that the Pitch can be substituted for Yaw (and vice versa) in the user gestures above to generate the Zoom or Rotate command signals. Further, the direction of the Pitch or Yaw can be switched while generating the Zoom or Rotate signals as well. (For example, Up Pitch action can result in zooming in and Down Pitch can result in zooming out.) |
| Click or Select or Tap/Touch | [P>] or<br>{#}[P>] or<br>{#}[>P<] or<br>{#}[P>][<P] or<br>{#}[P>][#][<P]<br>The first variation is simply a Pitch Down motion performed within specified bounds of time and magnitude. At the end of satisfactory |

TABLE 7-continued

An embodiment of a User Interface using User Gestures that can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers.

| Command to be Invoked | User Gesture to Invoke the Command (and Explanation) |
|---|---|
| | performance of the motion, at least one signal is generated intended to cause a Click or Select or a Tap or Touch action on the device being controlled. The Click command signal can be equivalent to a Left Mouse Button Click signal (generated by a computer mouse or touchpad). The second variation requires a period of No Motion of a minimum specified duration, before the Pitch motion is initiated. The third variation is similar to the second variation, albeit with an additional requirement of a Pitch Up motion following the Pitch Down motion. The fourth variation is functionally the same as the third variation, however, represented a little differently to explicitly show a time and magnitude bounded Pitch Up motion following the Pitch Down Motion. Note that the time and magnitude bounds on the Pitch Down motion can be different from those on the Pitch Up motion. The fifth variation is a variation of the fourth variation, where a period of No Motion (with both a specified lower and a specified upper bound on the length of the period of No Motion) or a POLA is inserted between the two Pitch motions. This addition can provide convenience to the user as well as help with the gesture recognition algorithms. |
| Right Click or Back Button or Escape Button | [<P] or<br>{#}[<P] or<br>{#}[<P>] or<br>{#}[<P][P>] or<br>{#}[<P][#][P>]<br>The five variations above are same as the five variations for the Click/Select/Tap command above with the difference that the Pitch Down motions have been replaced by Pitch Up motions and vice versa. Also, at the end of the performance of the user gesture, a signal equivalent to click of a Right Mouse Button (on a computer mouse or touchpad) or the Back Button or Escape Button (for example, on devices based on Android operating system), can be generated. |
| Click and Drag OOI | {#}[<Y][P>]*{YP}# or<br>{#}[<Y][P>][~]#{YP}# or<br>{#}[<Y][P>][<P]{YP}#<br>The gesture can begin by user performing a period of No Motion (possibly of a minimum specified duration), after which the user can perform a Left Yaw motion followed by a Pitch Down Motion within specified individual time bounds and with magnitudes within specified ranges. After this point, there can be three variations as depicted above.<br>In the first variation, the system can ignore all motions for a specified time period (as shown by "*", a FLBP). After the expiration of the FLBP, a Left Mouse Button Press signal (or equivalent) can be generated.<br>In the second variation, the system can ignore all motions for a specified maximum time period, until a period of No Motion of minimum specified duration is performed (as shown by "[~]#", a VLWP). After the successful completion of the VLWP (that is the user performing the "#" within the max time bound of the VLWP), a Left Mouse Button Press signal (or equivalent) can be generated. (Note: IF the user does not perform the "#" within the specified time bound of the VLWP, the system can reject the gesture. The user actions performed so far for this gesture can be ignored, and the system can go back to waiting for a new gesture to be performed by the user.)<br>In the third variation, the user can perform a Pitch Up motion within a specified time and magnitude bound. After completion of the Pitch UP, a Left Mouse Button Press signal (or equivalent) can be generated.<br>After the above, OOI modification signals can be generated in accordance to the Yaw and Pitch motions. The generated signals can stop when a period of No Motion of a minimum specified duration is encountered ("#"). At this point, a Left Mouse Button Release (of equivalent signal) can be generated.<br>Note: In some systems, a Touch Start signal (indicating initiation of a touch of a touch sensitive surface of a device, such as a touch sensitive display screen of the device) can be considered as equivalent to the Left Mouse Button Press signal. Similarly, an End of Touch signal (indicating the ending of a touch that was previously started) can be considered to be equivalent to the Left Mouse Button Release signal. Further, some systems can generate additional signals during the time period between the generation of the Touch Start and End of Touch Signal to signify/simulate continuous touch by the user).<br>Some embodiments may not require the "{#}" at the beginning of the user gesture. |

TABLE 7-continued

An embodiment of a User Interface using User Gestures that can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers.

| Command to be Invoked | User Gesture to Invoke the Command (and Explanation) |
|---|---|
| | Some embodiments can use "<P" instead of "P>" and vice versa in the variations above. Further, some embodiments can generate Right Mouse Button signals instead of the Left Mouse Button signals described above. |
| Swipe Left or Right | Swipe Left: <br> [P>][<Y] or <br> {#}[P>][<Y] or <br> {#}[P>][#][<Y] <br> The first variation includes a Down Pitch followed by a Left Yaw (both with time bounds). In the second variation, the gesture can begin by user performing a period of No Motion (possibly of a minimum specified duration), after which the user can perform a Pitch Down motion followed by a Left Yaw motion. A Swipe Left signal can be generated at the end of the Yaw action. The third variation can work very similarly to the second variation, with the difference that the user can also perform a period of No Motion (possibly with lower as well as higher bound on the time duration of the period) between the Pitch and the Yaw actions. <br> In some devices that have touch sensitive surfaces (for example, smart phones and tablets), wherein the user can swipe on the surface using a body part (such as a finger), the time taken to complete the swipe and the distance covered by the body part while in touch with the touch sensitive surface can have an impact on the amount and/or type of signals generated from the swipe action. For example, a TMB short swipe can result in quickly changing the displayed object on the display screen of the device from one graphical object (or set of graphical object) to another in a quick succession. Whereas, a slow and long swipe can result in the display showing a slow or slower deliberate transition (possibly on the display screen) from the first graphical object (or set of graphical objects) to another graphical object (or set of graphical objects). All three variations of the swipe gesture above can mimic this effect, wherein the generated signals for a swipe command can emulate a quick and short swipe or a slow and long swipe based on the speed of the performance of the Pitch and/or Yaw actions. Some embodiments can have the speed and/or length of the generated swipe command be driven by only the second action (i.e. the Yaw action in the above variations). Some embodiments can start generating the swipe command signals when the second action (i.e. the Yaw action in the variations above) begins and end the generation when the second action ends. In effect, the control system can emulate initiation of a touch of the touch sensitive surface by the user when the second action is started and continue emulating the touch until the end of the second action or the end of the gesture. This emulated touch can begin at/from the current or last location of a mouse pointer or cursor on the screen, or from the center of the screen, or from the end point of the previous swipe command (whether or not that swipe command was performed by the user by physically touching the touch sensitive surface or was an emulated swipe), or a specified number of pixels/distance away from any of the above mentioned locations, one of the edges of the display screen, or any other suitable location. During this emulation, the system can also generate signals for emulating the change in location of the emulated point of touch on the touch sensitive surface, by generating signals to emulate the change in the location of the emulated touch (on the touch sensitive surface) in accordance to the second action (that is the Yaw motion in this embodiment). <br> {#}[P>][#][Y}# (Fourth variation) <br> The fourth variation above is similar to the third variation above with the difference that the second action is a generic Yaw action (as against a Left Yaw in the third variation). This variation can therefore lead to a Left or a Right Swipe based on either the direction of the motion/action at the beginning of the second action (i.e. Yaw in this case) and/or the instantaneous direction of the second action. Thus the system can start generating signals for left or right swipe when the second action starts, but then change (and continue to change) the direction of the generated swipe signals when the second action changes direction. This (possibly continuous) change in direction can be achieved by changing the instantaneous location of the emulated touch point based in accordance to the instantaneous direction and/or magnitude of the second action. <br> {#}[<Y] (Fifth variation) <br> Some embodiments can implement the fifth variation for the Swipe Left command, which is simply a Yaw Left action, possibly preceded by a period of No Motion, wherein the Yaw Left action may have time and/or magnitude bounds. A Left Swipe signal can be generated at the end of the Yaw Left Action. |

TABLE 7-continued

An embodiment of a User Interface using User Gestures that can be used with Smart Glasses and other Head Worn Devices (including but not limited to Head/Ear Phones, Ear Buds, Eye Wear, Augmented Reality or Virtual Reality Devices), as well as other Wearables (such as wrist bands) as well as Hand Held controllers.

| Command to be Invoked | User Gesture to Invoke the Command (and Explanation) |
|---|---|
| | Some embodiments may not require the "{#}" at the beginning of the user gesture.<br>Swipe Right:<br>[P>][Y>] or<br>{#}[P>][Y>] or<br>{#}[P>][#][Y>]<br>The Swipe Right user gesture variations above are shown to be very similar to the first three variations of the Swipe Left gesture illustrated above, with the difference that the Left Yaw action ("[<Y]") can be replaced by a Right Yaw action (such as "[Y>]"). The generation of the command signals can work similar to above descriptions of Swipe Left command as well with the difference that Swipe Right command signals are generated (instead of Swipe Left command signals).<br>{#}[Y>]<br>This variation can also be used for Swipe Right (similar to the Swipe Left fifth variation). |
| Swipe Up or Down | Swipe Up:<br>[Y>][<P] or<br>{#}[Y>][<P] or<br>{#}[Y>][#][<P]<br>As shown in the first and second variations above, the gesture can begin by user performing a period of No Motion (possibly of a minimum specified duration), after which the user can perform a Yaw Left motion/action followed by a Pitch Up motion/action. A Swipe Up signal can be generated at the end of the second action (Pitch). The third variation can work very similarly to the first two variations, with the difference that the user can also perform a period of No Motion (possibly with lower as well as higher bound on the time duration of the period) between the Yaw and the Pitch actions.<br>In some devices that have touch sensitive surfaces (for example, smart phones and tablets), wherein the user can swipe on the surface using a body part (such as a finger), the time taken to complete the swipe and the distance covered by the body part while in touch with the touch sensitive surface can have an impact on the amount and/or type of signals generated from the swipe action. For example, a quick short swipe can result in quickly changing the displayed object on the display screen of the device from one graphical object (or set of graphical object) to another in a quick succession. Whereas, a slow and long swipe can result in the display showing a slow or slower deliberate transition (possibly on the display screen) from the first graphical object (or set of graphical objects) to another graphical object (or set of graphical objects). All three variations of the swipe gesture above can mimic this effect, wherein the generated signals for a swipe command can emulate a quick and short swipe or a slow and long swipe based on the speed of the performance of the Pitch and/or Yaw actions. Some embodiments can have the speed and/or length of the generated swipe command be driven by only the second action (i.e. the Pitch action in the above variations). Some embodiments can start generating the swipe command signals when the second action (i.e. the Pitch action in the variations above) begins and end the generation when the second action ends. In effect, the control system can emulate initiation of a touch of the touch sensitive surface by the user when the second action is started and continue emulating the touch until the end of the second action or the end of the gesture. This emulated touch can begin at/from the current or last location of a mouse pointer or cursor on the screen, or from the center of the screen, or from the end point of the previous swipe command (whether or not that swipe command was performed by the user by physically touching the touch sensitive surface or was an emulated swipe), or a specified number of pixels/distance away from any of the above mentioned locations, one of the edges of the display screen, or any other suitable location. During this emulation, the system can also generate signals for emulating the change in location of the emulated point of touch on the touch sensitive surface, by generating signals to emulate the change in the location of the emulated touch (on the touch sensitive surface) in accordance to the second action (that is the Pitch motion in this embodiment).<br>{#}[Y>][#][P]{#} (Fourth variation)<br>The fourth variation above is similar to the third variation above with the difference that the second action is a generic Pitch action (as against a Up Pitch in the third variation). This variation can therefore lead to a Up or a Down Swipe based on either the direction of the motion/action at the beginning of the second action (i.e. Pitch in this case) and/or the instantaneous direction of the second action. Thus the system can start |

TABLE 7-continued

An embodiment of a User Interface using User Gestures that can be used
with Smart Glasses and other Head Worn Devices (including but not limited to Head/Ear
Phones, Ear Buds, Eye Wear, Augmented Reality or Virtual Reality Devices), as
well as other Wearables (such as wrist bands) as well as Hand Held controllers.

| Command to be Invoked | User Gesture to Invoke the Command (and Explanation) |
|---|---|
| | generating signals for up or down swipe when the second action starts, but then change (and continue to change) the direction of the generated swipe signals when the second action changes direction. This (possibly continuous) change in direction can be achieved by changing the instantaneous location of the emulated touch point based in accordance to the instantaneous direction and/or magnitude of the second action.<br>{#}[<P] (Fifth variation)<br>Some embodiments can implement the fifth variation for the Swipe Up command, which is simply a Pitch Up action, possibly preceded by a period of No Motion, wherein the Pitch Up action may have time and/or magnitude bounds. A Swipe Up signal can be generated at the end of the Pitch Up Action.<br>Some embodiments may not require the "{#}" at the beginning of the user gesture.<br>Swipe Down:<br>[Y>][P>] or<br>{#}[Y>][P>] or<br>{#}[Y>][#][P>]<br>The Swipe Down user gesture variations above are shown to be very similar to the first three variations of the Swipe Up gesture illustrated above, with the difference that the Pitch Up action can be replaced by a Pitch down action (such as "[P>]"). The generation of the command signals can work similar to above descriptions of Swipe Up command as well with the difference that Swipe Down command signals are generated (instead of Swipe Up command signals).<br>{#}[P>]<br>This variation can also be used for Swipe Down (similar to the Swipe Up fifth variation). |
| Zoom or Rotate | {#}[R>]*{YP}#<br>The "{#}[<R]" action sequence is used as a start trigger. The start trigger here constitutes a Left Roll motion (with time and magnitude bounds) which is preceded by a period of No Motion of at least a specified minimum length. Once the complete start trigger is performed, the control system can ignore all motions for the duration of the following FLBP ("*"). The subsequent {YP} motions can be used to generate signals to modify the current OOI. This generation of signals can end when a POLA is encountered, which in this case is a period of No Motion of a minimum specified duration.<br>{#}[<R][~][#]{YP}#<br>In this variation, the FLBP of the first variation is replaced by a bounded VLWP that looks (waits) for "[#]" (that is a period of No Motion with a lower as well as upper bound on its duration) to occur. The use of VLWP therefore gives user some limited time to settle down after performing the Roll motion before starting to generate the signals to modify the OOI in accordance to the "{YP}" motions, until a POLA ("{#}") is encountered.<br>{#}[<R>][<R]*{YP}#<br>This is a variation of the first variation above. In this variation, the system requires an additional [<R>] action in the start trigger. This additional requirement can further help with confirmation of user intent and reduce false positives when recognizing gestures. (This approach of requiring additional actions can be used with any user gestures.) |

Note 1: The tables in this document are exemplary collections of embodiments illustrating various principles disclosed. Many different other embodiments of user gestures, user interfaces, control systems, methods, etc. are possible using the principles above by simply substituting one type of motion or action with another, as well as by inserting or removing periods of No Motion or other POLAs in the definition of gestures. In particular, in user gesture definitions where a motion/action along one axis is shown to be immediately followed by another motion/action performed along a different axis, a POLA can be inserted (between those two motions/actions) to allow the user to transition between two motions in a comfortable fashion. It will be obvious that such POLAs can have a lower time bound on the duration of the POLA to be specified to be equal to zero or a suitable non-zero value. For example, the user gesture definition "[#][Y>][<P2]" (for Page Up from Table 6) can be replaced by "[#][Y>][#][<P2]", to insert a No Motion POLA between the time bound Y and P motions. Further, for this user gesture or any other user gestures described, varied time and magnitude bounds can be imposed or removed on each of the motions/actions to obtain even more variations. Variations can also be obtained by replacing periods of No Motion by a more generic POLA (where the bounds on the motion or position may not be substantially close to zero) in any/all user gesture definitions.

Note 2: Many of the user gestures described above use POLAs such as period of No Motion to stop generation of command signals. Some embodiments can also use other actions such as motion along an axis that is orthogonal to the axis/axes of motion in accordance to which the signals are being generated. For example, if the user gesture for OOI Modification was "{#}[<R]*{YP}#", where in the signals were being generated in accordance to "{YP}" and the generation of signals was being terminated by a period of No Motion ("#"), then a variation of this user gesture can be "{#}[<R]*{YP}[R]" where performing a Roll motion of specified minimum magnitude for a minimum duration of time can be used as a trigger to stop the generation of the command signals. The terminating trigger as well as the start triggers can also be other actions that may not involve any discernable motion, for example a voice command, jaw clenching, holding breath, tightening a muscle, changing brain wave pattern, moving eye gaze in a specified pattern, etc.

Note 3: Different actions in a particular user gesture can be performed using different body parts. For example, in one embodiment, the user gesture for modifying OOI can be "{#}[<R]*{YP}#" where in, the "<R" can be performed by using user's head, the "{YP}" could be performed using arm/hand/hand held controller/wearable ring controller/etc.

Note 4: While the above user gestures refer to motions, any of those motions can be replaced by actions that may not involve continuous motion. In some embodiments, a Pitch motion in a user gesture can be substituted by a Pitch position or displacement (angular position along the axis about which the Pitch motion is being measured). Further, angular motions/positions can be substituted by linear motions/positions along the same or different axis. For example, Pitch angular motion can be substituted by linear motion or displacement along the Y axis, Yaw angular motions can be substituted by linear motion or displacement along the Z axis. These substitutions can be useful with hand-held controllers, finger/hand/arm worn controllers, or even in controllers that rely on camera for sensing motion or positions of user's body parts.

Note 5: User feedback can be provided by audio, visual, haptic as well as any other suitable methods during the progress and processing of a user gesture. Feedback can be provided during performance as well as upon completion of each individual action in the user gestures, including but not limited to the start, progress and end of the periods of No Motion, POLA, FLBP, VLWPs, etc. Indicators can also be provided at end of recognition of each of the constituents of each action in a user gesture, possibly along with hint of what action needs to be performed next after the completion of the current action. Some embodiments can suppress such indicators after the user becomes familiar or skilled with performance of some of the gestures. Feedback can be provided in form of audio signals or visual progress meters as the user is performing a period of No Motion or any other POLA or even FLBPs or VLWPs in any of the described gestures. The audio signals can increase or decrease in frequency as a POLA/FLBP/VLWP is initiated and as it comes to an end. The progress meters can be visual and be shown in form of thermometer like (thin rectangular display that fills up) or circular (clock-like) graphical objects. Audio signals can be generated as per success or failure of some or each component action of a user gesture, and can accompany the visual feedback. Textual information or symbols (static or animated) can also be displayed at suitable locations. Variety of feedback can also be provided when the OOI is being actively modified in accordance to the OMD. Haptic feedback can be provided, possibly via any device or object being worn by the user, in a similar fashion indicating start, progress, successful completion or failure of some or all of the actions in the user gesture or the entire user gesture itself.

Note 6: The term "Click", or "Select" can be taken to include generation of any signals equivalent to a click done using a computer mouse or signals representing a tap on a touch sensitive surface or press on a pressure sensitive surface or press of a selection button/input mechanism or any other equivalent signals. They can be replaced by or are equivalent to button press and release signals generated by accessibility switches, gaming consoles or joysticks, etc. Furthermore, some controllers/control systems can have them mapped to any particular command or a macro, possibly when some other program is detected to be running on the device. For example, if a FPS (First Person Shooter) video game is running on the controlled electronic device, a Click or Select can be mapped to showing the health of the main character instead of causing a regular action (such as firing a weapon) that may normally happen on a click of a computer mouse.

Note 7: Any user gesture definition can be modified by inserting additional motions along axes that are orthogonal to the axes of motions already present in the user gesture definition. Such additions can be useful in ascertaining user intent and can help with filtering out actions/gestures that may have been performed unintentionally by the user. Some embodiments can have additional motion inserted just before the preexisting motion (that it is orthogonal to). Further note that the time bounds and the magnitude bounds on these additionally inserted motions can be different from the preexisting motions. For example, some embodiments can have the additional motions to have a less stringent time bound and can allow for lower magnitudes (of motion) as well.

Note 8: The user interface embodiments described in this document can be used with a variety of controllers/control systems. For example, they can be used with smart glasses, head mounted displays, head phones, head sets, head worn accessories, hand held controllers, arm bands, rings worn on fingers, other wearables or devices held or worn by the user, or even with tablets, laptops, desktop computers, smart phones, smart TVs and any other electronic devices can need controlling or be used as controllers. They can also be used with variety of sensors ranging from (but not limited to) inertial sensors to image sensors to biometric sensors. Further, the user interfaces described can be implemented as apparatuses, computer software stored on non-transient computer storage media, software API (Application Programming Interfaces) and be implemented as processes and methods as well.

Note 9: Some embodiments can use multiple variations of user gesture definitions to cause signal(s) to be generated for a particular command on the controlled device.

Note 10: Some embodiments can implement only the lower bound or the upper bound for time or magnitude of motions/actions included in "[ ]" in user gesture definitions. For example, the user gesture definition "[P>]" may be implemented such that it ignores the upper bound on time duration or magnitude of the Pitch action. Therefore, performing a down Pitch with at least a specified magnitude and for at least the specified duration can generate a specified signal the moment the action is sustained for at least the minimum specified time duration.

Note 11: In practice, users may not necessarily be able to perform actions/motions specified in user gesture definitions with absolute purity. That is, while performing the motions or actions specified for a particular gesture, they may inadvertently end up performing additional motions/actions that are not part of the specified gesture definition. For example, while performing a Yaw motion as part of a gesture, the user can end up performing certain amount of Pitch motion at the same time unintentionally. In another example, while performing Roll motion with the head, some Yaw or Pitch motion can also be inadvertently performed. Some embodiments can ignore or correct for such superfluous unintentional motions/actions based on a variety of criteria. For example, some embodiments can ignore the superfluous motions if the superfluous motions are within a specified threshold. The said threshold can be defined based on absolute magnitude of the experienced superfluous motions, or can be based on the ratio of the superfluous motion to the intended motion, or can be based on the difference in magnitude between intended and superfluous motion, etc. Other criteria to detect, ignore or take in account for superfluous can be also used. The above approaches can be especially useful when monitoring for Roll motions of head. This is because many times user will perform superfluous motions in Yaw and Pitch axes when performing Roll actions using their head. Using the above principles can improve the detection of those user gestures (involving Roll head action) and make it a bit easier for the user to perform them.

Performing Roll motion with the head can be difficult for some users, and therefore can be prone to extraneous/inadvertent Yaw or Pitch motions creeping in. As mentioned earlier, some embodiments can ignore other (superfluous) motions when the user starts performing motions/actions that match with motions/actions in a predefined gesture. Such embodiments can further require that the motions in the predefined gesture are performed with magnitude above a certain threshold. This approach can be especially useful when performing gestures that involve Roll motion of the head; here, Yaw or Pitch motions of the head can be ignored when the Roll motions are being performed with a magnitude greater than a certain Roll motion threshold and/or the ratio of the Roll motion's magnitude to Pitch or Yaw motion is greater than a certain threshold ratio. Users can also be instructed to perform head Roll motions (in any user gesture) by focusing on the motion of their chin to cause the Roll motion. For example, the user can be instructed to point their chins towards an imaginary spot a few inches (0-12 inches or any other comfortable distance) directly in front of their left or right shoulder. Another way is to instruct the users to tip their head sideways, as if trying to pour some liquid out of left or right ear on or around their left or right shoulder (respectively); this approach can also be an easy way for the user to learn and perform roll motions with their head. Yet another way of instructing the user (to perform Roll motion with their head) is by asking them to tip their head sideways as if they wanted to touch the side of their ear to the top surface of their shoulder (which is closer to that ear). Roll motions of the head are not as commonly performed by people (compared with Pitch and Yaw motions), so using Roll motions, especially as triggers in gestures, can be advantageous in some embodiments.

As illustrated in above embodiments, some user gestures can have (sequence of) actions that can involve motion of head, eyeballs (and/or eye gaze), hands/arms/fingers or other body parts, body worn or hand held controllers, etc., so that the direction of said motion is changed abruptly while performing the gesture. Some sequence of actions can be viewed as, as if, the user is trying to trace the letter "L" in various orientations and directions by using a body part or their eye gaze. Some examples of this are the action sequences "[Y>][P2>]" or "[P>][<Y]" and the like. Such motion sequences can look like tracing of letter "L" in different orientations. Note that the time and magnitude bounds can be different for each leg of the "L". Other sequence of actions can be viewed as, as if, the user is changing the direction of the motion to be opposite of the previously performed motion. Some examples of this can include motion sequences such as "[<P>]", which represents two motions performed one after another (which is Pitch in this example) in opposite direction. Note that in this situation, the time and magnitude bound on the motion can be different in different directions. Therefore, in this example, the Up Pitch motion can be performed at a different speed and time duration than the speed and time duration of the Down Pitch. User gestures designed so as to include action sequences that have sudden change in direction of motion (such as change in direction by roughly 90 degrees or 180 degrees) can be recognized easier via software algorithms (including machine learning algorithms). This can help reduce the number of false positives (in detection of gestures), which can be crucial for usability of a system utilizing gesture recognition. Such sudden change in directions can also be helpful in design of start triggers. POLAs, VLWPs, FLBPs or periods of No Motion can be introduced between any two consecutive actions (in a user gesture) to further help the user in performance of those user gestures, especially when the two consecutive actions involve a sudden change in direction of motion or position of the designated body part. Further, inclusion of superfluous action that requires the user to perform sudden change in motion (in a user gesture) benefits the system in recognizing those actions as intentional. For example, a "P> <P" performed with the head can be a user gesture that looks like a head nod. However, requiring additional Yaw motion (however slow or fast, long or short) immediately before or after the Pitch action sequence can help decrease the false positives in detection of those nods. E.g. "Y> P> <P", "[Y] P> <P", "P> <P [Y]" or "P> <P<Y" can be easier to be ascertained as user intended, especially if time and magnitude bounds are placed on the original actions of the user gestures and/or the superfluous actions added to the user gesture. POLAs, VLWPs, FLBPs or periods of No Motion can be introduced at the beginning and/or end of the superfluous actions to help decrease in false positives as well.

Figure 9:
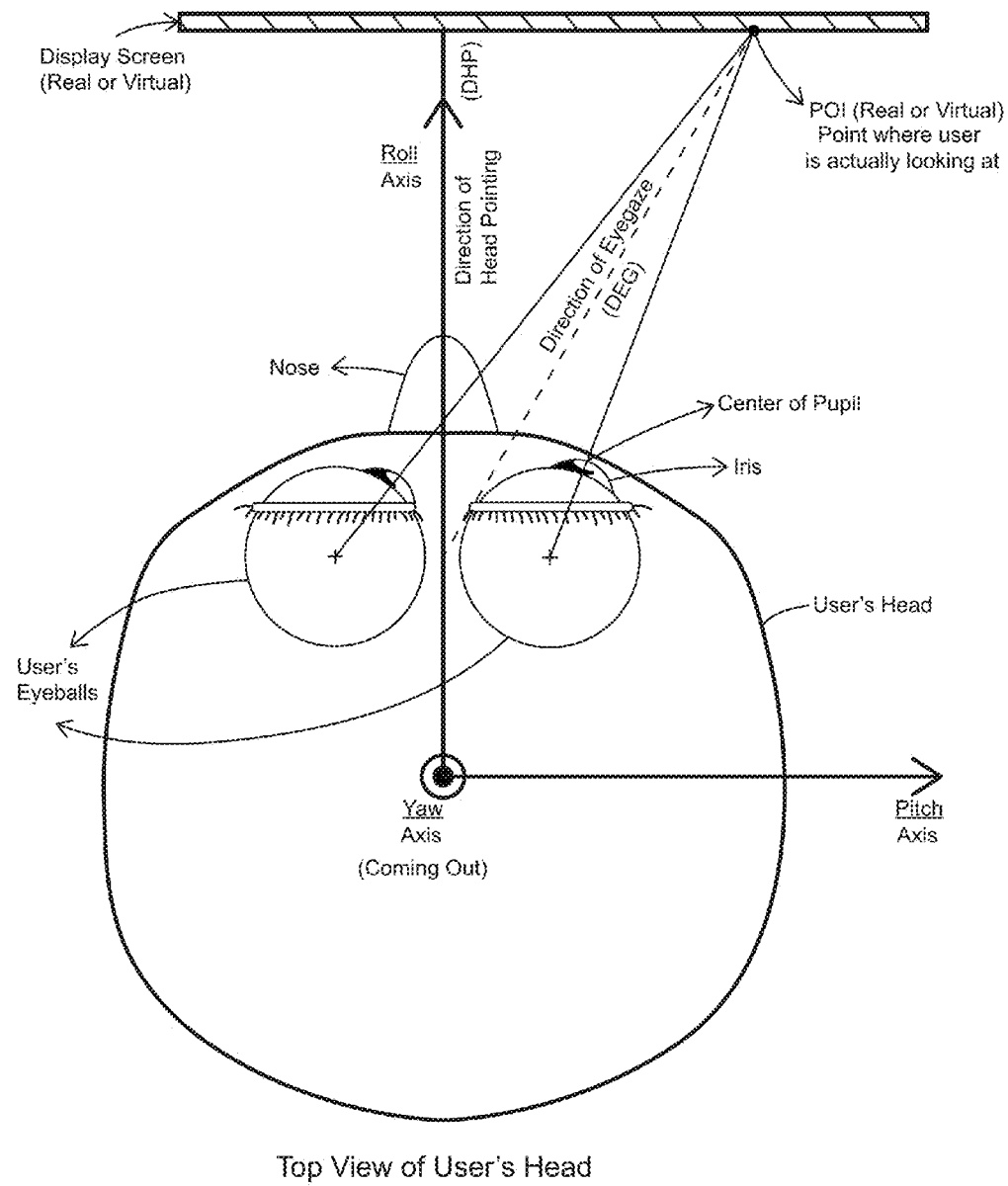
FIG. 9 illustrates an exemplary Direction of Eye Gaze versus Direction of Head Pointing in an Embodiment.

Some embodiments can use Eye Gaze along with some of the above principles to define user gestures to generate various commands signals meant to control or affect an OOI, a device or a system being controlled. In one embodiment, the system can include an eye tracker that can track the direction or a point in space (real or virtual) where the user is looking. Let us call this direction the Direction of Eye Gaze (DEG for short), and point in space as Point of Interest (POI). The DEG can be different from the direction where the user's head is pointed; let us call the latter the Direction of Head Pointing (DHP for short). DHP can be aligned with the Roll Axis of the user's head or be parallel to the Roll axis but in the XY plane of the Head Coordinate System. FIG. 9 shows a top view of user's head (in a schematic form), and shows the DHP aligned with the Roll Axis of the user's head. The DEG can be determined based on the orientation of one or both of user's eye ball(s). The user may be looking at a real point in space or a virtual point in virtual space (possibly presented to the user on a display screen). The display screen itself can be real or virtual, planar or spherical or any other convenient shape. If the display screen is real, it can be in form of a display screen part of the eyewear or headgear being worn by the user. In one embodiment, an Object of Interest (such as, for example, a graphical icon such as a mouse pointer) can continuously adjust according to the DEG, possibly according to one of the OOI Motion gestures/ heuristics described in this or referenced documents. (Note that this OOI may or may not be visible to the user, though the system may be updating its attributes according to the DEG.) As an illustrative example, if the OOI is a mouse pointer, the OOI can move continuously according to the DEG. (The mouse pointer can be optionally displayed on a display screen). If the user performs pre-defined sequence(s) of body action(s) such as a combination of head motion along the Pitch, Yaw or Roll axis, then predesignated command signals can be generated in response to those pre-defined sequence(s). Further those generated command signals can be made to affect the real or virtual objects the user may be looking at (possibly as determined by the user's DEG or POI). Therefore, for example, if the user is looking at a particular point on a display screen, and s/he performs a Down Pitch action (e.g. as indicated by the symbolic representation "[P>]", "[>P<]", or other suitable action, possibly with their head), then that can generate a Left Click or equivalent selection command signal at or around the POI. If the user performs an Up Pitch action (e.g. as indicated by the symbolic representation "[<P]", "[<P>]" and so on), then that can generate a Right Click or equivalent selection command signal at or around the POI. Similarly, a Left Yaw (possibly performed as per the symbolic representation "[<Y]" or "[<Y>]") can generate signal for Left Mouse Button Press (to indicate start of a Drag or Swipe Command) and a Right Yaw (possibly performed as per the symbolic representation "[>Y]", "[>Y<]", etc.) can generate a Shift+Left Mouse Button Press command signal. (Note that commands such as Drag or Swipe can be brought to an end based on an ODE such as a POLA or some other predefined action sequence.) The system can require that these pre-defined sequence(s) of body action(s) be performed only after the DEG or the POI has been reasonably steady (as determined by being within a specified tolerance zone) for at least a minimum amount of specified time, for the command signals to be generated. (This can be viewed as the user performing a POLA, possibly for a specified minimum amount of time while looking at a POI. Let us call this action POI POLA.) This tolerance zone can be specified in number of degrees (for the DEG) or number of pixels or a suitable unit of distance for the POI, or as a combination of the aforementioned as well as any other suitable criteria. Therefore, as an illustration, if the user is looking at a particular point (or surrounding region of +/−25 pixels or voxels) on a display screen for a minimum of 250 milliseconds, then if the user performs a Down Pitch action with the head (e.g. "[P>]"), a Left Click/Touch/Selection command signal can be generated at that point on the display screen. (That is, if the POI/DEG was not steady enough for at least 250 ms, then a following "[P>]" action may not generate any command signal.) Some systems can further require that the DEG or POI be also steady (as measured by a specified tolerance on POI or DEG) during the performance of the pre-defined sequence(s) of body action(s) as well, before command signals can be generated. In this scenario, the tolerance zone used for determining steadiness before the sequence(s) of body action(s) can be different from the tolerance zone used during the sequence of body action(s). Some systems can also require that the POI POLA be performed no more than a designated lag time period between the start or end of POI POLA and the start/end of the following action sequence or user gesture intended to cause a command signal to be generated at the POI of the POLA. Some embodiments can have the tolerance zone to be used before or after the action sequence to be sufficiently large so as to effectively eliminate the check for steadiness (before and/or after the initiation of the action sequence). It will be obvious that different actions can be substituted in or added to the illustrative examples of action sequences above to generate various different command signals at the POI of the POI POLA, using the principles described above.

Note: Same or different sensors can be used to determine the DEG, POI as well as the motion/position of body parts used in the sequence(s) of body action(s). In one embodiment, an image sensor (monitoring the position/orientation of user's eyeball) to determine DEG, can also be used to get an indication of motion of head of the user based on the relative location of the various "features" on the eye. These "features" can be corners of the eye, center of the pupil, interesting locations on the iris or the sclera, interesting locations on the eyelids, the glint(s) on eyeball cast by a light source, etc. In other embodiments, inertial sensors (such as MEMS gyroscopes or accelerometers, radar sensors, etc.) can be used to get an indication of the motion/position of a body part of the user (such as the head). In other embodiments, a different image sensor(s) may be used for getting information indicative of motion of body part(s) than what is used for determining the DEG.

Using the above principles, the content on a display screen or an OOI can be scrolled, moved, rotated, zoomed, panned when the user performs a POI POLA (for a minimum required time) and then moves/rotates their head (possibly as measured by change in DHP or movement of tracked features of the user's face captured by an image sensor), by a minimum required amount in a specified direction. The command signal generation can initiate once the user's head is moved/rotated by the minimum required amount and then continue indefinitely. The command can end (i.e. the command signals can stop being generated) when the user moves/rotates their head back to roughly the position their head was at the time of the initiation of the rotation and/or possibly holds their head steady for another minimum specified amount of time or performs another POI POLA or a designated ODE (possibly even using a PCE/PCM). For example, if a user performs a POI POLA on an OOI (such as a virtual 3D Model) displayed on their head worn device (such as Augmented/Virtual/Mixed Reality headset), a subsequent Yaw, Pitch, Roll of their head can cause the OOI to rotate/change orientations as per their subsequent head motions. However, if a PCE/PCM is active at the time of POI POLA or during the subsequent head motions, the system can generate signals to translate the OOI (instead of rotation), or any other command signals to modify the OOI for that matter. Some embodiments can provide visual indication of the POI and/or the OOI that is "selected" as a result of the performance of the POI POLA. Some embodiments can decide not to require steadiness of the DEG or POI once the command is initiated.

It will be obvious that any number and variety of command signals can be generated by the system based on different sequences of body actions. Similarly, any number, variety and combination of sensors can be used to get information indicative motion or position of different body parts of the user or different body actions of the user.

In some embodiments, an OOI (e.g. a cursor or pointer or a graphical icon on a display screen of a device) can be moved/modified in accordance to body action such as eye gaze or head motion of the user, wherein the motion is initiated upon a first body action such as blinking of at least one eye, winking, squinting/changing the amount of opening of the eye (possibly beyond a specified threshold), opening an eye wide, crinkling around the corner of the eyes or any area surrounding the eye, moving an eyebrow, smile, mouth twitch, mouth open/close, twitching/pulling/moving a corner of lip(s), frowning, sticking the tongue out, wiggling the tongue, inflating the nostrils, puffing cheeks, sucking cheeks, sucking/puffing action, moving an eyebrow(s), squinting eye(s), making eye(s) bigger (by opening it/them wide), lip pucker, or any other facial expressions or any other designated body action. As an example, OOI motion/modification can be initiated upon performance of a designated body action such as blinking or winking or other suitable action. The user can place the OOI at a particular spot on a display screen by looking at that spot and blinking/winking. The blinking/winking action can be taken as a cue by the system to generate command signals to move the OOI to that spot. After the OOI is moved to the spot, it can stay there till the user looks at another spot and performs another blink (or any other designated body action). Alternatively, the OOI can keep on moving once the OOI Motion is initiated by the first designated body action and can be terminated by an ODE (OOI Motion/Modification Disabling Event). That is, for example, once the OOI Motion is initiated by a blink/wink or other designated first body action, it can continue to be moved/modified in accordance to the eye gaze and/or head motion or motion of other designated body part, until the point the user performs a second body action such as another blink, wink, smile, mouth twitch, mouth open/close, twitching/pulling/moving a corner of lips, sticking the tongue out, wiggling the tongue, inflating the nostrils, puffing cheeks, sucking cheeks, sucking/puffing action, moving an eyebrow(s), squinting eye(s), making eye(s) bigger (by opening it/them wide), lip pucker, or any other facial expressions or any other designated body action. The second body action can also include performance of a POLA such as the user simply holding their gaze or head steady for designated amount of time and/or within certain limits of range of motion or position. Use of a POLA for disabling the OOI Motion/Modification can be called the "Dwell Park" concept/principle/heuristic wherein OOI Motion/Modification is ended upon hovering the OOI for a designated minimum duration or time and/or within a designated area on the display screen and/or within designated limits of motion, or any other suitable criteria for measuring the hover action.

OOI Stickiness: In some embodiments, the OOI moves in accordance to motion of a body part such as the head. For example, the OOI motion can start when the head motion exceeds a first start motion threshold. Upon start of the OOI motion, it can continue until the user performs a POLA using their head, that is, the head motion is held within a second head motion threshold for at least a designated amount of time. At that time, the OOI motion/modification can come to a stop. In this variation, the first start motion threshold can be made unequal to the second head motion threshold. For example, by making the first threshold larger than the second threshold, it can make restarting the OOI motion a bit harder. This can make it feel that the OOI has become sticky as it takes additional effort to start its motion than to continue the motion. This can be advantageous in scenarios where the user needs to park the OOI in its location for a while, without disturbing its position by unintentional body/head motions. Once the user is ready start OOI motion again, they can start moving their head at a rate larger than the first start motion threshold and then continue the OOI motion with lesser effort before bringing it to a stop. This concept of stickiness of OOI can also help the user to move the OOI through large distances using only limited amount of body/head motions, by covering the large distances in multiple steps of shorter distances. For example, if the user desires to move the OOI through a distance of 30 inches on the display screen from the left edge to the right edge, but if their head motion range allows only 10 inches of OOI motion, they could move that distance in 3 steps of 10 inches. In every step, they would move their head from left to right at a higher speed than the first start motion threshold to start the OOI motion; continue moving their head rightwards until they cannot move their head anymore; hold the head steady for a designated amount of time (so that their head motion is within the second head motion threshold) to bring the OOI motion to an end; then move/rotate their head back to the left (to a comfortable head position) at a lower speed than the first start motion threshold (so that the OOI position is left parked/undisturbed), and then repeat the process. Note that in this principle, head can be substituted by any other body part or mechanism being used to move the OOI. Persons knowledgeable in the art can see that the above disclosed concepts/principles can be combined with other concepts/principles described in this or referenced documents.

Figure 10:
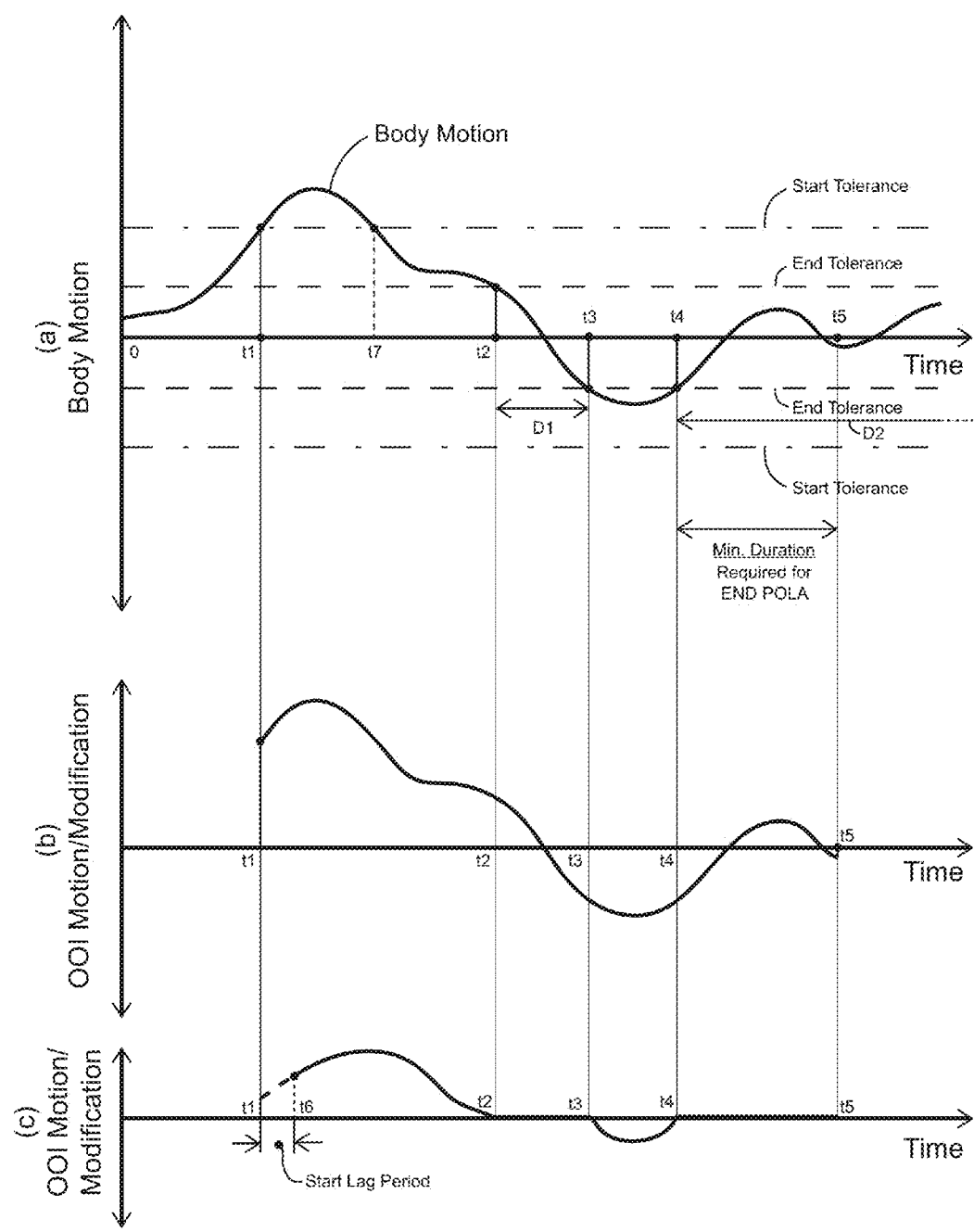
FIG. 10(a) illustrates an exemplary embodiment Using POLAs for Start as well as End Triggers while Generating Signals, and in particular illustrates Body Motion over time that can be used to determine if the user is performing or not performing a POLA with the designated body part.
FIG. 10(b) illustrates an exemplary embodiment Using POLAs for Start as well as End Triggers while Generating Signals, and in particular illustrates OOI Motion/Modification signals that can start being generated in accordance to the Body Motion.
FIG. 10(c) illustrates an exemplary embodiment Using POLAs for Start as well as End Triggers while Generating Signals, and in particular illustrates a further variation where while the OOI Modification signals are in accordance to the Body Motion, their magnitude is not directly proportional to the Body Motion.

In some embodiments, termination of a POLA can be used as trigger to start OOI Modification. FIG. 10 illustrates an embodiment where POLAs are used for both start and end triggers. A body part of the user (or an object whose motion or position can be affected by the user) can be designated as the "body part" which will be monitored by the system to enable the user to perform a user gesture to affect an OOI. The motion of this body part ("Body Motion" as shown in part (a) of FIG. 10) over time then can be used to determine if the user is performing or not performing a POLA with the designated body part. Limits on body motion (thresholds) can be specified to determine if the user is performing a POLA. The dashed and dash-dot lines in the figure show the limits of motions that can be used to determine if the user is performing a POLA. In this example, the limit on the body motion (Start Tolerance) is higher for the POLA that will be used as a trigger to start OOI modification, compared to the POLA that will be used as the end trigger (End Tolerance). As in the figure, the (magnitude of) monitored motion of the user's body part crosses the start threshold ("start tolerance" used by the start trigger POLA) at time t1 (thereby terminating the POLA that was in progress until time t1). The Body Motion then falls to be within the end threshold (the "end tolerance" used by the end trigger POLA) at time t2. At time t1, given that the Body Motion crosses the start threshold (and possibly terminates the start POLA), OOI Motion/Modification signals can start getting generated in accordance to the Body Motion, as shown in part (b) of the figure. Once OOI Modification signals start getting generated, they can continue until the end POLA is performed. At time t2, the magnitude of Body Motion does indeed fall within the zone of end tolerance, however, it lasts only for duration D1 (shown as t3–t2 in the figure, wherein t3 is the time when the body motion ceases to be within the end tolerance zone). In this illustration, the duration t3–t2 is shown to be lesser than the minimum required duration of an end POLA, which is shown to be equal to t5–t4 (in the figure). Note that t2, t3, and t4 are all points in time when the Body Motion crosses the End Tolerance. As shown in the figure, the Body Motion is within the End Tolerance during time period t4:t5 for the duration of the Minimum Duration Required for End POLA. Therefore, the user can be considered to have performed an end POLA at time t5. Thereby, the generation OOI Modification signals can end at time t5, as shown in parts (b) and (c) of the figure. Part (c) of the figure shows a further variation where while the OOI Modification signals are in accordance to the Body Motion, their magnitude is not directly proportional to the Body Motion. In this case, the signals are shown to be suppressed (or to have the magnitude of OOI modification reduced to zero) when the Body Motion falls within a third specified tolerance zone. In this illustration, the tolerance zone used is the same as the second tolerance zone (the tolerance zone of End POLA), however, it is obvious that a different tolerance zone could have been used. (Note: The tolerance zones can be asymmetric about the X axis, meaning the magnitude of the tolerance on the positive side may not be the same as the magnitude on the negative side.) The variation in part (c) also indicates a further variation where the OOI Modification signals can start after a time lag after time t1 (rather than starting substantially close to time t1). This Start Lag Period can be used to provide the user an opportunity to get better prepared to start modifying the OOI after time t1. Part (c) of the figure shows Start Lag Period during time period t1:t6, during which generation of signals is optional. This Start Lag Period can be considered to be akin to the Blackout Period described earlier. Note that the Start Lag Period (SLP) can be made variable (instead of being fixed in value). For example, the SLP can be defined to start at t1 (the time when Body Motion first crosses the first threshold) and end at the second crossing of the same threshold (that is at time t7). Alternatively, SLP can also be said to end at time t2, when Body Motion crosses the second threshold (i.e. the End Tolerance) for the first time after time t1. The end effect of this can be that the user is required to move the body part at a higher magnitude to indicate intent to start OOI Modification, however, the signals start getting generated only when the user subsequently slows down the body part to be within a Signal Generation tolerance (threshold) zone, probably for a specified amount of time (Signal Generation POLA time), which may or may not be less than the Minimum Duration Required for the End POLA. Once the signal generation is started, terminating the generation can require an End POLA. In this case, the signal generation can start at time t2 (instead of t1) and end at t5. In embodiments that have Signal Generation POLA time equal to or greater than the Minimum Duration for End POLA, the overall user gesture would have three different POLAs—Start POLA, followed by a Signal Generation POLA, followed by an End POLA. (Note that the threshold value for the Signal Generation POLA can be the same or different from the End POLA.) In this case, the signals can be generated starting the completion of the Signal Generation POLA and end upon the completion of the End POLA.

Figure 11:
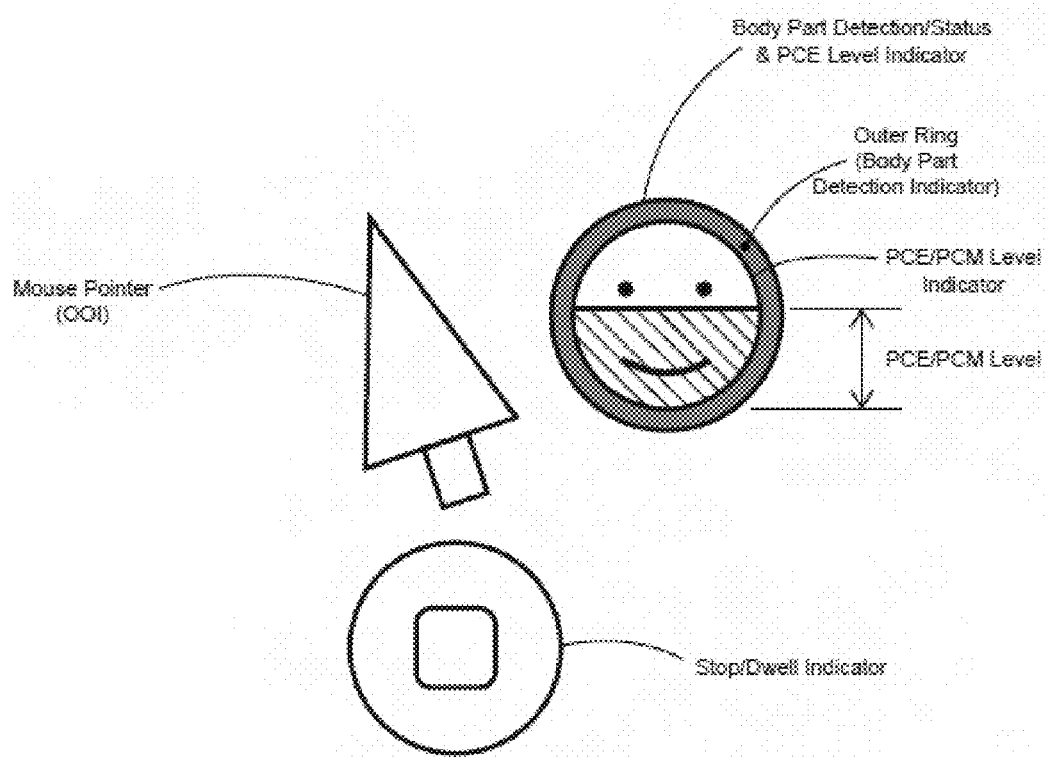
FIG. 11 illustrates an exemplary embodiment of Visual Feedback Provided to User including Body Part Detection Status Indicator, PCE Level Indicator and Stop/Dwell Indicator.

Some embodiments can provide feedback (to the user) on the status, magnitude, direction and other suitable characteristics of Body Motion, Facial Expressions, POLA (start, progress, end) and any components of user gestures. FIG. 11 shows an embodiment where visual feedback is provided to the user, possibly on a display screen. The OOI used in this illustration is a mouse pointer. A first graphical object (which happens to be on the right side of the figure) is shown to be used as a "Body Part Detection/Status & PCE Level Indicator". This graphical object is shown to consist of multiple components. The first component (outer ring in this illustration) can be used to show the status of detection of a body part being monitored, possibly for Body Motion or PCE or both. This first component can convey the status of body part detection by changing color, shape, texture, etc. The second component of this graphical object is the inner part that can show level of monitored PCE/PCM (Primary Control Expression/Motion). The shaded/colored area in the PCE/PCM Level indicator can change based on the level of monitored PCE/PCM. While the illustration shows the height of the shaded area changing based on the level of PCE/PCM, other variations are possible. For example, the level can be indicated by the shaded area in the form of a circular ring where the radius and/or thickness of the shaded ring shaped area is changed based on the level of the PCE/PCM. Alternatively, the entire area could be colored but the color itself is changed (or simply made darker or lighter, translucent or opaque) based on the level of the PCE/PCM, and so on. A second graphical object is shown to visually indicate the status of a POLA or "dwell gesture" being performed by the user (via a designated body part). Again, the shape, size, color, texture, visibility, translucency and other visual characteristics can be changed according to the Body Motion and/or the duration of time for which the Body Motion is within the specified limits of the POLA.

Figure 12:
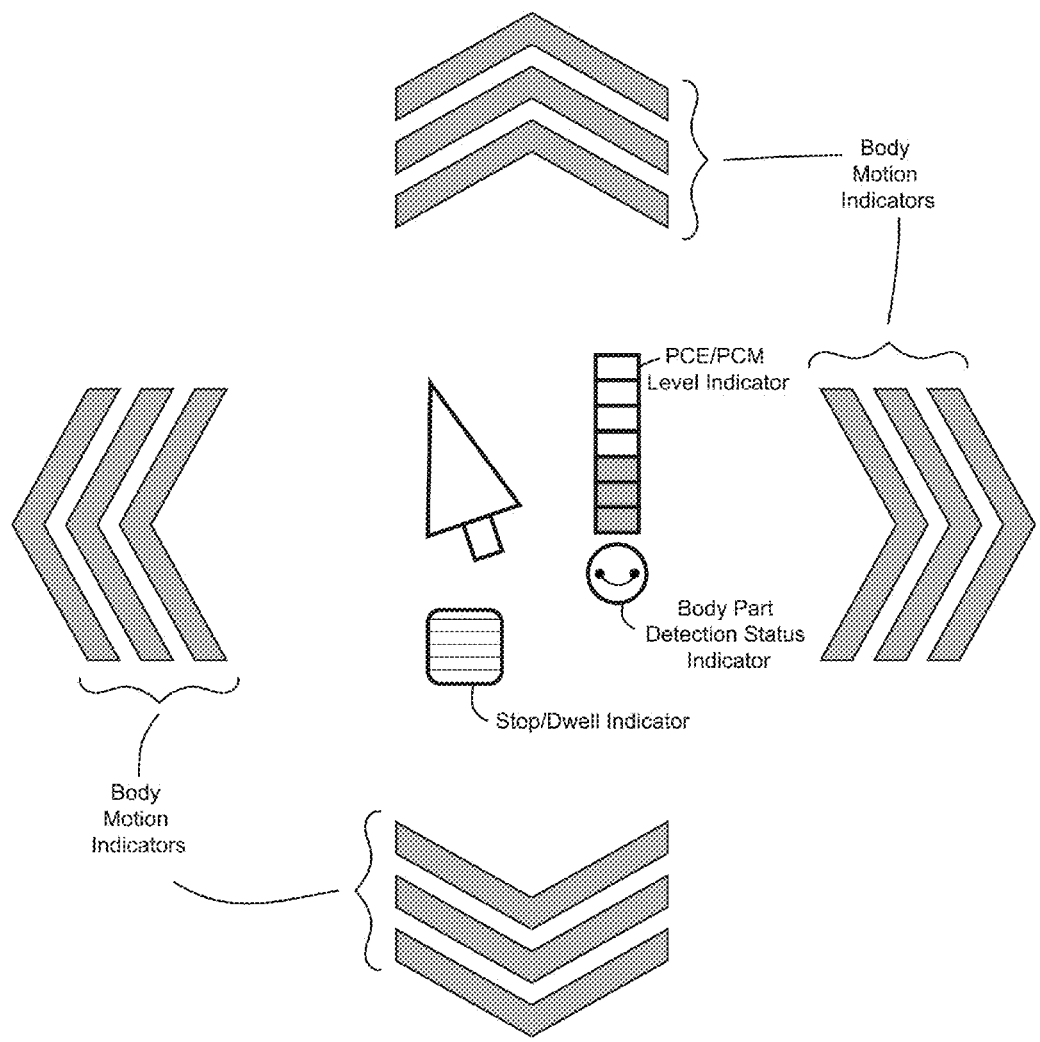
FIG. 12 illustrates an exemplary embodiment of Visual Feedback Provided to User including Body Part Detection Status Indicator, PCE/PCM Level Indicator, Stop/Dwell Indicator and Body Action Indicators.

FIG. 12 illustrates another embodiment where visual feedback is provided to the user on various statuses and levels of body motions, user actions, PCE/PCMs, and other variables that may be part of a user gesture, or may help the user to perform a user gesture. It shows PCE/PCM Level Indicator separated out from the Body Part Detection Status Indicator. A Stop/Dwell indicator is also shown that can indicate when the monitored body part is held "stationary" (that is within certain specified limits of motion or position). Additional Body Motion Indicators are also illustrated that provide feedback on the Body Motion being performed by the user. These indicators can change shape, color, texture, number of components, position, visibility and other visual characteristics based on the user's actions. As an illustration, FIG. 13 shows an embodiment where the number of '>' shapes displayed is changed based on Body Motion. In this example, at a particular instant in time, the user is moving the body part faster in the right direction while simultaneously moving it downwards at a lower speed. That indication is provided by showing more '>' shapes pointing towards the right and less shapes being pointed downwards. The colors of those shapes can also be made different to further highlight speed differences. The top and left pointing shapes are not visible as the body part is not moving in those direction. In a variation, the Stop/Dwell Indicator can be replaced by the Body Motion indicator, wherein Body Motion indicators in all four directions can be made visible or invisible, to indicate the body part is stationary.

FIG. 14 illustrates an embodiment where the shape, size, color and other visual characteristics of the OOI itself can be modified based on components of a user gesture or other actions or statuses that can help the user in performing a user gesture. In this figure, the OOI is the mouse pointer. The OOI is colored/shaded to varying degree, in accordance to the PCE/PCM level at any particular instant. FIG. 15 shows the visual feedback when the Body Part is being moved (towards the left at this instant, by showing motion trail towards the right of OOI), regardless of the fact if the OOI itself is also actually moving. In fact, when the OOI itself starts moving, some embodiments can make the motion trails (or Body Motion feedback indicators in general) to be invisible. Note that the number of shapes displayed in the trail or the size or shape of the trail itself, can be varied based on the magnitude of the motion. Some embodiments can display graphical animations (instead of fixed shapes) as part of the various indicators. Note: The position of the various indicators can be decided in relation to the position of OOI, or bear no relation to it at all. For example, the indicators can be a fixed or variable distance away from the OOI in certain orientations. In some embodiments, they can be just a few pixels adjacent to the OOI and move along as the OOI moves or is modified while maintaining the same distance and relative orientation. In others, the distance from OOI or the orientation related to the OOI change based on the magnitude or direction of Body Motion, PCE/PCM, or any other suitable criteria. In other embodiments, the indicators can be always at fixed locations, possibly at designated spots on display screen (such particular edges, corners or center of the display screen).

Figure 16:
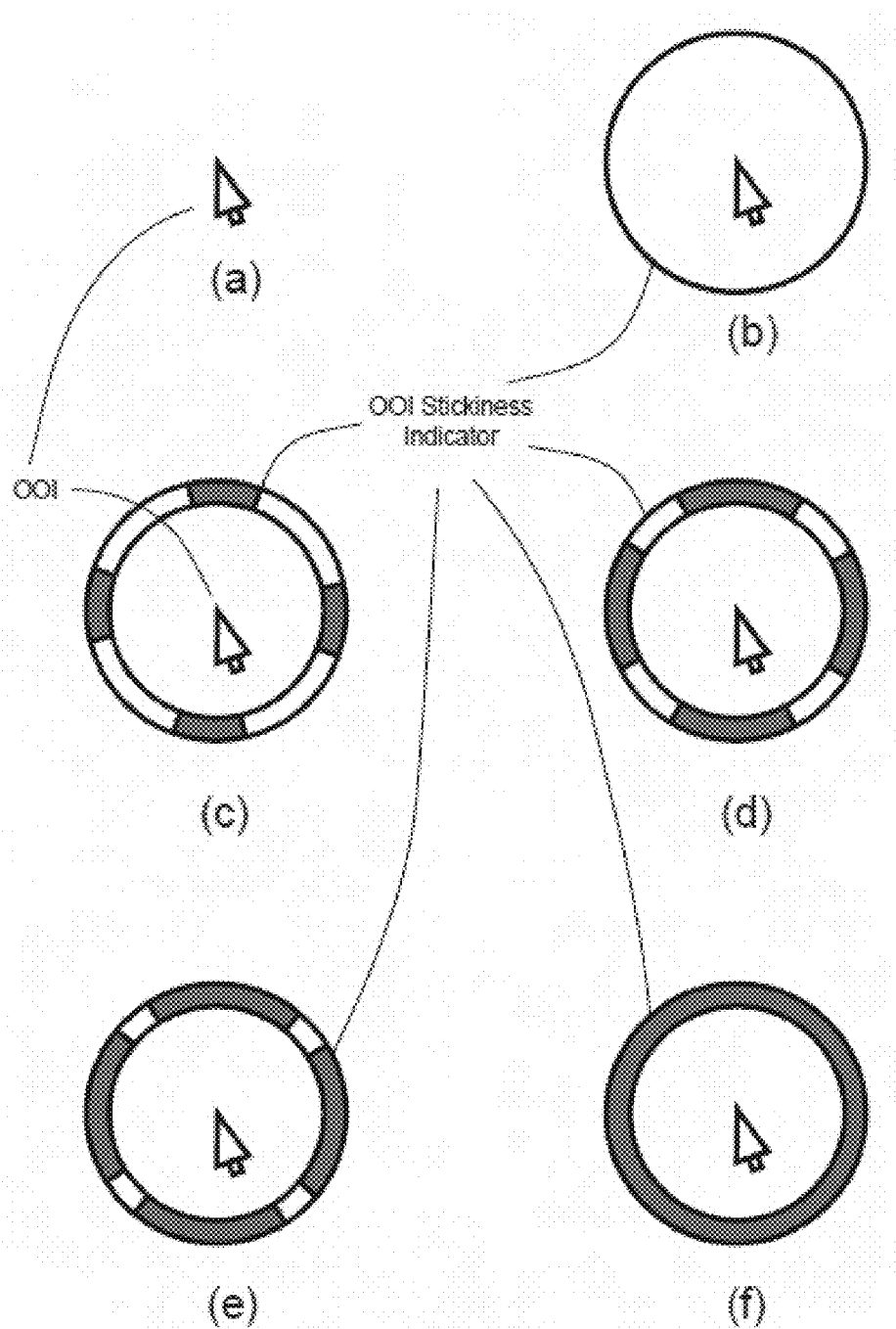
FIG. 16(a) illustrates an exemplary embodiment of OOI Stickiness Indicator with no indicator around the OOI when the magnitude of body motion is below the MNT.
FIG. 16(b) illustrates an exemplary embodiment of OOI Stickiness Indicator with a circular indicator around the OOI when the magnitude of detected body motion is higher than the MNT, but still quite small compared to the start motion threshold.
FIG. 16(c) illustrates an exemplary embodiment of OOI Stickiness Indicator with a more prominent visual indicator than FIG. 16(b) around the OOI, indicating higher detected magnitude of body motion but still lower than the start motion threshold.
FIG. 16(d) illustrates an exemplary embodiment of OOI Stickiness Indicator with a more prominent visual indicator than FIG. 16(c) around the OOI, indicating higher detected magnitude of body motion but still lower than the start motion threshold.
FIG. 16(e) illustrates an exemplary embodiment of OOI Stickiness Indicator with a more prominent visual indicator than FIG. 16(d) around the OOI, indicating higher detected magnitude of body motion but still lower than the start motion threshold.
FIG. 16(f) illustrates an exemplary embodiment of OOI Stickiness Indicator with a full ring visual indicator when body motion equals or exceeds the start motion threshold, indicating the start of OOI motion signal generation.

FIG. 16 shows an embodiment where visual indicators are provided around a mouse pointer (the OOI) based on the detected body motion, in relation to the start motion threshold. This approach can be used when using the principle of OOI Stickiness. FIG. 16(a) shows no indicator around the OOI when the magnitude of body motion is below the MNT. FIG. 16(b) shows a circular indicator around the OOI when the magnitude of detected body motion is higher than the MNT, but still quite small compared to the start motion threshold. FIGS. 16(c), (d) and (e) show progressively more prominent visual indicator (in the shape of a broken ring progressively getting fuller) around the OOI, in correspondence to progressively higher detected magnitude of body motion, however, still lower than the start motion threshold. FIG. 16(f) shows visual indicator (in the shape of a full ring) when body motion finally equals or exceeds the start motion threshold, indicating the start of OOI motion signal generation. Once the OOI start moving, the visual indicator can optionally continue to be displayed and also possibly move along with the OOI. As the visual indicator is updated in real time in response to the detected body motion (OMD), the user effectively sees an animation that provides them a real-time feedback on how much they need to move the designated body part to overcome the start motion threshold as well as how close they are to the start motion threshold in case they do not trigger OOI motion.

Figure 17:
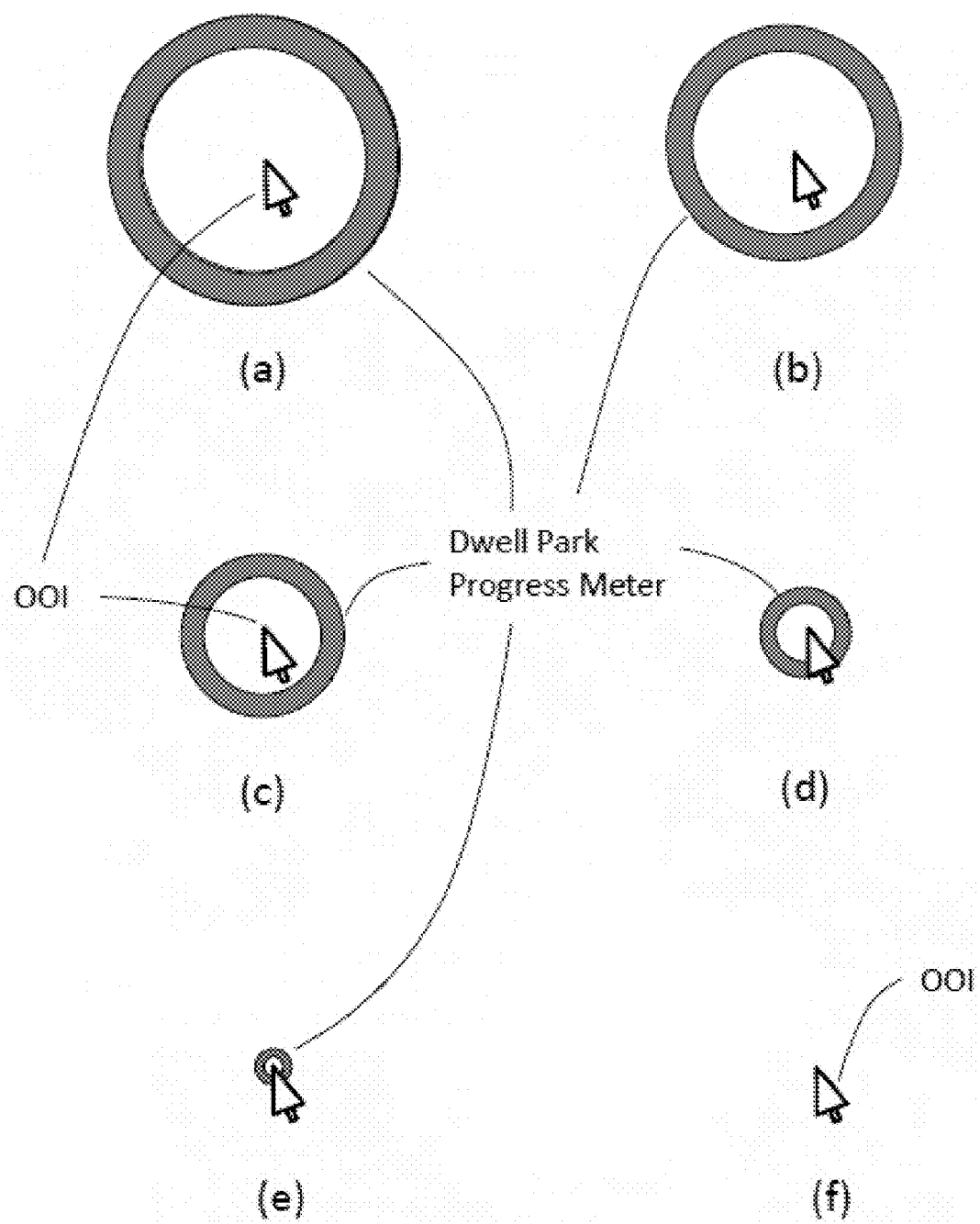
FIG. 17(a) illustrates an exemplary embodiment of Dwell Park Progress Meter with a full ring around the OOI when the OOI is in motion and the magnitude of the body motion is above the end motion threshold.
FIG. 17(b) illustrates an exemplary embodiment of Dwell Park Progress Meter where the size of the visual indicator is smaller than FIG. 17(a) indicating the body motion fell below the end motion threshold and continues to stay below it.
FIG. 17(c) illustrates an exemplary embodiment of Dwell Park Progress Meter where the size of the visual indicator is smaller than FIG. 17(b) indicating the body motion continues to stay below the end motion threshold for a longer duration than in FIG. 17(b)
FIG. 17(d) illustrates an exemplary embodiment of Dwell Park Progress Meter where the size of the visual indicator is smaller than FIG. 17(c) indicating the body motion continues to stay below the end motion threshold for a longer duration than in FIG. 17(c)
FIG. 17(e) illustrates an exemplary embodiment of Dwell Park Progress Meter where the size of the visual indicator is smaller than FIG. 17(d) indicating the body motion continues to stay below the end motion threshold for a longer duration than in FIG. 17(d)
FIG. 17(f) illustrates an exemplary embodiment of Dwell Park Progress Meter where the visual indicator disappears indicating the body motion continues to stay below the end motion threshold for a duration equal to or longer than required to complete a POLA.

FIG. 17 shows an embodiment illustrating how visual indicators can change when the magnitude of body motion falls below end motion threshold, and can finally disappear when the OOI gets dwell/hover parked. FIG. 17(a) shows a full ring around the OOI when the OOI is in motion and the magnitude of the body motion is above the end motion threshold. However, when the OMD (body motion) magnitude falls below the end motion threshold, the visual indicator can start changing to indicate that fact, and it can continue to change as the body motion continues to be within the end motion threshold. In this embodiment, the size of the visual indicator changes progressively from FIG. 17 (b) through 17(d) (and finally disappears in 17(e)) in accordance to the time elapsed since the last time the body motion fell below the end motion threshold and continuously stayed below it. In this embodiment, the size of the visual indicator is an indication of amount of time spent in period of No Motion (by the user holding still/dwelling/hovering). The change in shape/size of the visual indicator can be in accordance to the time remaining to successfully complete a POLA to bring the OOI motion to an end, that is to Dwell Park the OOI. When the required duration of the POLA (to bring the OOI motion to an end) is met or exceeded, the visual indicator can completely disappear, and the OOI can become sticky again. (Refer to a previous section on OOI Stickiness.)

The principles of user interface and user gesture definition/recognition disclosed in this document are applicable for use with information from any sensors that can provide information related to motion and/or position of body parts or any other objects that can provide an indication of motion of users body parts. For example, an indication of motion/position of user's arm can be provided by measuring motion/position of an arm band, wrist band, watch, ring, glove, etc. being worn by the user. Motion/position of user's head (Body Motion) can be substituted by motion or position of a hat, eye glasses or a head gear worn by the user. In effect, Body Part can be substituted by a foreign object under direct or indirect, full or partial control of the user. Further, this motion/position information can be derived using a variety of sensors including but not restricted to accelerometers, gyroscopes, image sensors, wave field sensors, radars, electric field sensors, acoustic sensors, ultrasonic sensors, EMG sensors, OCG sensors, resistive sensors, as well as others. Further, some user actions may not be detectable visibly from outside but be detectable by other sensors. For example, users can change their meditation or attention level consciously. Alternatively, they can also intentionally change the level of their Alpha, Beta, Theta or Delta brain waves. These levels and/or level changes can be measured by brainwave, EEG or other suitable sensors. Neurosky, Inc. (http://neurosky.com) is one vendor that provides hardware and software to measure brainwaves and detect changes in meditation and attention level of the user. Some embodiment then can use brainwave sensors that provide readings of either meditation level or attention level or any other biometric quantity that the user can consciously have an effect on and/or can cause a change in magnitude, frequency, direction or other measurable attributes. For example, instead of performing a facial expression, the user can increase or decrease meditation or attention level, which then can be treated as "PCE" information and used in the heuristics/principles as described in this and above reference documents. Brainwave sensors, EEG and other biometric sensors can be used as PCE sensors and used to control electronic devices. Similarly, certain conscious bodily muscular action may be hard to detect visibly, however, may be easily detectable by EMG sensors and other sensors. For example, clenching of the teeth or different parts of lower jaw, tensing throat, other parts of face or head, scalp, various auricularis muscles, parts of torso, shoulders, arms, legs, feet, fingers, toes, thighs, calves, or various sphincters of the body may not be externally visible but could be detected by EMG or other sensors. Again, these sensors can be used as PCE/PCM sensors and all the heuristics defined for PCE/PCM sensors can be used with these sensors as well.

All of the above disclosed concepts/principles/heuristics/techniques/algorithms, etc. can be used in variety of different fields and applications. Some of the examples are Augmentative and alternative communication (AAC), Assistive Technology, Speech Generation Devices, Augmented/Mixed/Virtual Reality, Desktop & Mobile Computing, Gaming, Industrial Control, Healthcare, Defense, Aviation, Transportation, Manufacturing, Product Lifecycle Management, Aerospace, & others. All the concepts/principles/heuristics/techniques/algorithms, etc. disclosed in this document can also be used with all the apparatuses/devices disclosed in the referenced documents, as well as with devices including but not limited to head worn devices such as smart glasses, smart helmets, virtual/mixed/augmented reality devices, head worn controllers, in-ear controllers, head phones, ear plugs, head bands and neck bands. Further, they are also applicable to other body worn devices such arm/wrist bands, devices utilizing wearable sensors and smart watches, devices embedded inside the user's body, as well as devices that are not physically worn in/on user's body such as smart phones, tablets, desktop computers, smart TVs, set top devices, and others that may possibly utilize image, radar, sonar, sound/voice, ultrasonic, laser and other sensors to sense any or all body actions.

Persons knowledgeable in the art can see that the above disclosed concepts/principles/heuristics/techniques/algorithms, etc. including but not limited to Combination of different types of Motion & Expressions that occur simultaneously or in tandem, Periods of "No Motion" or "No Expression", Periods of Motion or "No Motion" or Expression or "No Expression" with fixed and variable or indefinite lengths or bounded lengths, Time bounds on periods of Motion or No Motion or Expression or No Expression, Magnitude (and other attribute) bounds on Motions and Expressions, TMB Motions and Expressions, Blackout Periods, Variable Length Waiting Periods with or without bounds, Gesture Wakeup Sequence, Session Wakeup Sequence, Signal Generation Session, Concept of Modes, etc. can be used not only to define user gestures but also facilitate recognition of those user gestures, as well as to provide user convenience. Further, Motions and Expressions can be substituted by other bodily and/or mental actions performed by the user in the use/application of the disclosed concepts/principles/heuristics/techniques/algorithms, etc. Some or all of the above disclosures can be used to define or implement computer implementable methods or processes, to design and create part of user interfaces to electronic devices, to devise/create software modules/applications/programs, API, to manufacture non-transient storage media that can contain computer executable instructions based on some or all of the teachings of the disclosures, and/or to manufacture devices or apparatuses that implement some or all of the teachings of the disclosures.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

I claim:

1. A computer implemented method of controlling an electronic device by a user, the computer implemented method comprising:
    receiving facial expression information (FE Info) indicative of one or more facial expressions on the face of the user;
    receiving body information (Body Info) indicative of at least one of motion and position of one or more body parts of the user, wherein the Body Info is different from the FE Info, and wherein the one or more body parts of the user are at least one of arm, hand, finger, thumb, leg, foot, toe, head, jaw, tongue, torso, chest, abdomen and shoulder of the user;
    waiting for detection of a period of limited activity (POLA) based on the Body Info, wherein the POLA comprises the Body Info being steady within a specified range-for at least a specified minimum time duration;
    after detection of the POLA:
        (1) start comparing at least one of the FE Info and the Body Info with one or more predefined user gestures to detect a first matching portion of a recognized user gesture, wherein the recognized user gesture is one of the one or more predefined user gestures, and wherein the first matching portion is disposed at the start of the recognized user gesture and the first matching portion comprises all or part of the recognized user gesture;
        (2) if the first matching portion of the recognized user gesture is detected, generating command signals for the electronic device based on at least one of the FE Info and the Body Info until the recognized user gesture is no longer detected; and
        (3) if the first matching portion is not detected within a waiting period, restart the waiting for detection of a POLA.

2. The computer-implemented method of claim 1, wherein the electronic device is worn on the user's body.

3. The computer-implemented method of claim 2, wherein a MEMS sensor provides at least a portion of at least one of the FE Info and the Body Info.

4. The computer-implemented method of claim 1, wherein the generated command signals modify an object of interest (OOI) affected by the electronic device.

5. The computer-implemented method of claim 4, wherein the OOI is a virtual object.

6. The computer-implemented method of claim 1, wherein the generated command signals comprise a selection command.

7. The computer-implemented method of claim 1, wherein the one or more facial expressions of the user comprise at least one of a smile, jaw motion, eyebrow motion, puffing action, sipping action, puffing a cheek, sucking a cheek, squinting an eye, opening an eye, closing an eye, blinking an eye, changing opening of an eye, opening mouth, closing mouth, pouting, frowning, pulling a corner of the lips, puckering lips, puffing or sucking cheeks, inflating nostrils, sticking out the tongue, and moving the tongue.

8. The computer implemented method of claim 1, wherein the specified range has symmetric bounds around zero.

9. A system for a user to control an electronic device, the system comprising:
    at least one input configured to receive at least one of facial expression information (FE Info) indicative of one or more facial expressions on the face of the user, and body information (Body Info) indicative of at least one of motion and position of one or more body parts of the user, wherein the Body Info is different from the FE Info, and wherein the one or more body parts of the user are at least one of arm, hand, finger, thumb, leg, foot, toe, head, jaw, tongue, torso, chest, abdomen and shoulder of the user;
    a processor configured to detect a period of limited activity (POLA) based on the Body Info; and after detection of the POLA, to compare at least one of the FE Info and the Body Info with one or more predefined user gestures to detect a first matching portion of a recognized user gesture, wherein the recognized user gesture is one of the one or more predefined user gestures; if the first matching portion of the recognized user gesture is detected, to generate command signals for the electronic device based on at least one of the FE Info and the Body Info until the recognized user gesture is no longer detected; and if the first matching portion is not detected within a waiting period, to wait for detection of a subsequent POLA,
    wherein the POLA comprises the Body Info being steady within a specified range for at least a specified minimum time duration, and wherein the first matching portion is disposed at the start of the recognized user gesture and the first matching portion comprises all or part of the recognized user gesture.

10. The system of claim 9, wherein the electronic device is worn on the user's body.

11. The system of claim 10, wherein the system further comprises a MEMS sensor, wherein the MEMS sensor provides at least a portion of at least one of the FE Info and the Body Info.

12. The system of claim 9, wherein the generated command signals modify an object of interest (OOI) affected by the electronic device.

13. The system of claim 12, wherein the OOI is a virtual object.

14. The system of claim 9, wherein the generated command signals comprise a selection command.

15. The system of claim 9, wherein the one or more facial expressions of the user comprise at least one of smiling, jaw motion, eyebrow motion, puffing or sucking action, squinting an eye, opening an eye, closing an eye, blinking an eye, changing opening of an eye, opening mouth, closing mouth, pouting, frowning, pulling a corner of the lips, puckering lips, puffing a cheek, sucking a cheek, puffing action, sipping action, inflating nostrils, sticking out the tongue, and moving the tongue.

16. The system of claim 9, wherein the specified range has symmetric bounds around zero.

17. A non-transitory computer readable medium comprising one or more programs configured to be executed by one or more processors to enable a user to communicate with an electronic device, said one or more programs causing performance of a method comprising:
receiving facial expression information (FE Info) indicative of one or more facial expressions on the face of the user;
receiving body information (Body Info) indicative of at least one of motion and position of one or more body parts of the user, wherein the Body Info is different from the FE Info, and wherein the one or more body parts of the user are at least one of arm, hand, finger, thumb, leg, foot, toe, head, jaw, tongue, torso, chest, abdomen and shoulder of the user;
waiting for detection of a period of limited activity (POLA) based on the Body Info, wherein the POLA comprises the Body Info being steady within a specified range for at least a specified minimum time duration;
after detection of the POLA:
(1) start comparing at least one of the FE Info and the Body Info with one or more predefined user gestures to detect a first matching portion of a recognized user gesture, wherein the recognized user gesture is one of the one or more predefined user gestures, and wherein the first matching portion is disposed at the start of the recognized user gesture and the first matching portion comprises all or part of the recognized user gesture;
(2) if the first matching portion of the recognized user gesture is detected, generating command signals for the electronic device based on at least one of the FE Info and the Body Info until the recognized user gesture is no longer detected; and
(3) if the first matching portion is not detected within a waiting period, restart the waiting for detection of a POLA.

18. The non-transitory computer readable medium of claim 17, wherein the electronic device is worn on the user's body.

19. The non-transitory computer readable medium of claim 17, wherein an image sensor provides at least a portion of at least one of the FE Info and the Body Info.

20. The non-transitory computer readable medium of claim 17, wherein the generated command signals modify an object of interest (OOI) affected by the electronic device.

21. The non-transitory computer readable medium of claim 20, wherein the OOI is a virtual object.

22. The non-transitory computer readable medium of claim 17, wherein the generated command signals comprise a selection command.

23. The non-transitory computer readable medium of claim 17, wherein the one or more facial expressions of the user comprise at least one of a smile, jaw motion, eyebrow motion, puffing action, sipping action, sucking a cheek, puffing a cheek, squinting an eye, opening an eye, closing an eye, changing opening of an eye, blinking an eye, opening mouth, closing mouth, pouting, frowning, pulling a corner of the lips, puckering lips, puffing or sucking cheeks, inflating nostrils, sticking the tongue out, and moving the tongue.

24. The non-transitory computer readable medium of claim 17, wherein the specified range has symmetric bounds around zero.

25. An apparatus for a user to control an electronic device, the apparatus comprising:
memory;
a processor configured to:
receive facial expression information (FE Info) indicative of one or more facial expressions on the face of the user;
receive body information (Body Info) indicative of at least one of motion and position of one or more body parts of the user, wherein the Body Info is different from the FE Info, and wherein the one or more body parts of the user are at least one of arm, hand, finger, thumb, leg, foot, toe, head, jaw, tongue, torso, chest, abdomen and shoulder of the user;
detect a period of limited activity (POLA) based on the Body Info, wherein the POLA comprises the Body Info being steady within a specified range-for at least a specified minimum time duration;
after detection of the POLA:
compare at least one of the FE Info and the Body Info with one or more predefined user gestures to detect a first matching portion of a recognized user gesture, wherein the recognized user gesture is one of the one or more predefined user gestures, and wherein the first matching portion is disposed at the start of the recognized user gesture and the first matching portion comprises all or part of the recognized user gesture;
if the first matching portion of the recognized user gesture is detected, generate command signals for the electronic device based on at least one of the FE Info and the Body Info until the recognized user gesture is no longer detected; and
if the first matching portion is not detected within a waiting period, waiting for detection of a subsequent POLA; and
a first sensor configured to provide at least a portion of at least one of the FE Info and the Body Info.

26. The apparatus of claim 25, wherein the electronic device is worn on the user's body.

27. The apparatus of claim 26, wherein the first sensor comprises a MEMS sensor.

28. The apparatus of claim 25, wherein the generated command signals modify an object of interest (OOI) affected by the electronic device.

29. The apparatus of claim 28, wherein the OOI is a virtual object.

30. The apparatus of claim 25, wherein the generated command signals comprise a selection command.

31. The apparatus of claim 25, wherein the one or more facial expressions of the user comprise at least one of smiling, jaw motion, eyebrow motion, puffing or sucking action, squinting an eye, opening an eye, closing an eye, changing opening of an eye, blinking an eye, opening mouth, closing mouth, pouting, frowning, pulling a corner of the lips, puckering lips, puffing action, sipping action, puffing a cheek, sucking a cheek, inflating nostrils, sticking out the tongue and moving the tongue.

32. The apparatus of claim 26, wherein the apparatus further comprises an eye tracking system.

33. The apparatus of claim 25, wherein the apparatus is in the form of eyewear.

34. The apparatus of claim 26, wherein the apparatus is configured to be a part of the electronic device.

35. The apparatus of claim 25, wherein the specified range has symmetric bounds around zero.

* * * * *